(12) United States Patent
Loftis et al.

(10) Patent No.: US 7,297,256 B2
(45) Date of Patent: Nov. 20, 2007

(54) PRESSURE GRADIENT DOSING SYSTEM FOR FLUID SUPPLY

(75) Inventors: Ted S. Loftis, Cookeville, TN (US); David L. Brisk, Aurora, CO (US); Barry M. Verdegan, Stoughton, WI (US); Harold R. Martin, Jr., Cookeville, TN (US); Peter K. Herman, Cookeville, TN (US); Ismail C. Bagci, Cookeville, TN (US); Abby True-Dahl, Sparta, TN (US)

(73) Assignee: Fleet Guard, Inc., Nashville, TN (US)

( * ) Notice: Subject to any disclaimer, the term of this patent is extended or adjusted under 35 U.S.C. 154(b) by 273 days.

(21) Appl. No.: 11/156,347

(22) Filed: Jun. 17, 2005

(65) Prior Publication Data

US 2006/0180537 A1    Aug. 17, 2006

Related U.S. Application Data

(63) Continuation-in-part of application No. 10/956,408, filed on Sep. 30, 2004, now Pat. No. 7,153,422, and a continuation-in-part of application No. 10/767,513, filed on Jan. 29, 2004, now Pat. No. 7,156,991.

(51) Int. Cl.
*B01D 11/00* (2006.01)
*B01D 12/00* (2006.01)

(52) U.S. Cl. ............... 210/198.1; 137/268; 210/206; 210/209; 210/278; 422/256; 422/261; 422/278

(58) Field of Classification Search ............... 210/209
See application file for complete search history.

(56) References Cited

U.S. PATENT DOCUMENTS 3,272,336 A    9/1966  Humbert, Jr.
3,956,130 A    5/1976  Cunningham et al.
4,075,097 A    2/1978  Paul
4,150,563 A    4/1979  Minarik et al.
4,475,483 A   10/1984  Robinson
5,173,193 A   12/1992  Schembri
5,254,264 A * 10/1993  Armstrong ................ 210/696
5,458,767 A   10/1995  Stone
5,484,462 A    1/1996  Herbstman
5,772,873 A    6/1998  Hudgens et al.
5,827,434 A * 10/1998  Yando ..................... 210/754
5,897,770 A *  4/1999  Hatch et al. ............. 210/101
5,948,248 A    9/1999  Brown
5,980,113 A   11/1999  Grantz
6,045,692 A    4/2000  Bilski et al.
6,068,672 A    5/2000  Watson et al.
6,238,554 B1   5/2001  Martin, Jr. et al.

(Continued)

FOREIGN PATENT DOCUMENTS

EP    0 530 609 A1    3/1993

*Primary Examiner*—Peter A. Hruskoci
(74) *Attorney, Agent, or Firm*—Andrus, Sceales, Starke & Sawall, LLP; J. Bruce Schelkopf

(57) ABSTRACT

A pressure gradient dosing system is provided for a fluid supply system. A flow passage has first and second pressure zones having a pressure gradient therebetween. An additive reservoir in an additive delivery system responds to the pressure gradient to release additive to the flow passage.

36 Claims, 39 Drawing Sheets

U.S. PATENT DOCUMENTS

| | | |
|---|---|---|
| 6,270,664 B1 * | 8/2001 | Tsabari ........................ 210/206 |
| RE37,369 E | 9/2001 | Hudgens et al. |
| 6,325,925 B1 * | 12/2001 | Hansen ..................... 210/198.1 |
| 6,379,564 B1 | 4/2002 | Rohrbach et al. |
| 6,422,266 B1 | 7/2002 | Gouzou et al. |
| 6,423,883 B1 | 7/2002 | Morman et al. |
| 6,502,979 B1 | 1/2003 | Kozyuk |
| 6,523,503 B1 | 2/2003 | Kracklauer |
| 6,537,453 B2 | 3/2003 | Beard et al. |
| 6,550,956 B1 | 4/2003 | Utracki et al. |
| 6,659,128 B2 | 12/2003 | Gilmore |
| 6,659,129 B1 | 12/2003 | Kiel et al. |
| 6,913,691 B2 | 7/2005 | Holler |
| 6,919,023 B2 | 7/2005 | Merritt et al. |
| 7,153,422 B2 * | 12/2006 | Herman et al. .............. 210/206 |
| 7,156,991 B2 * | 1/2007 | Herman et al. .............. 210/206 |

* cited by examiner

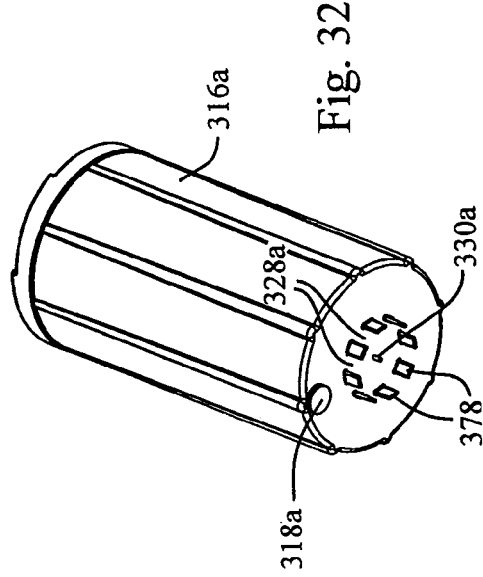
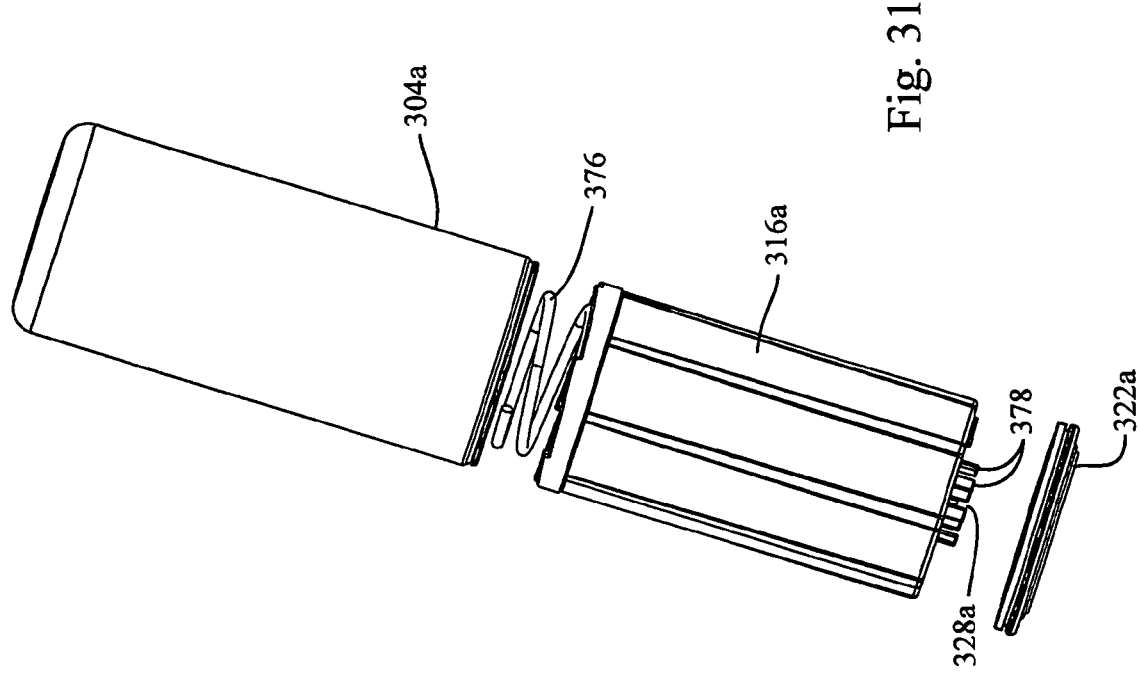

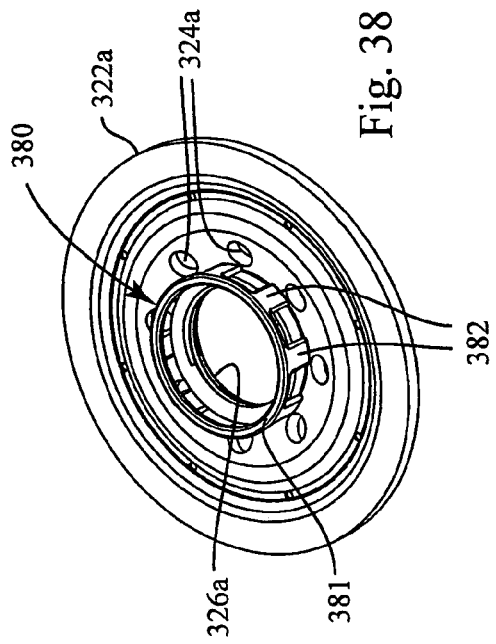
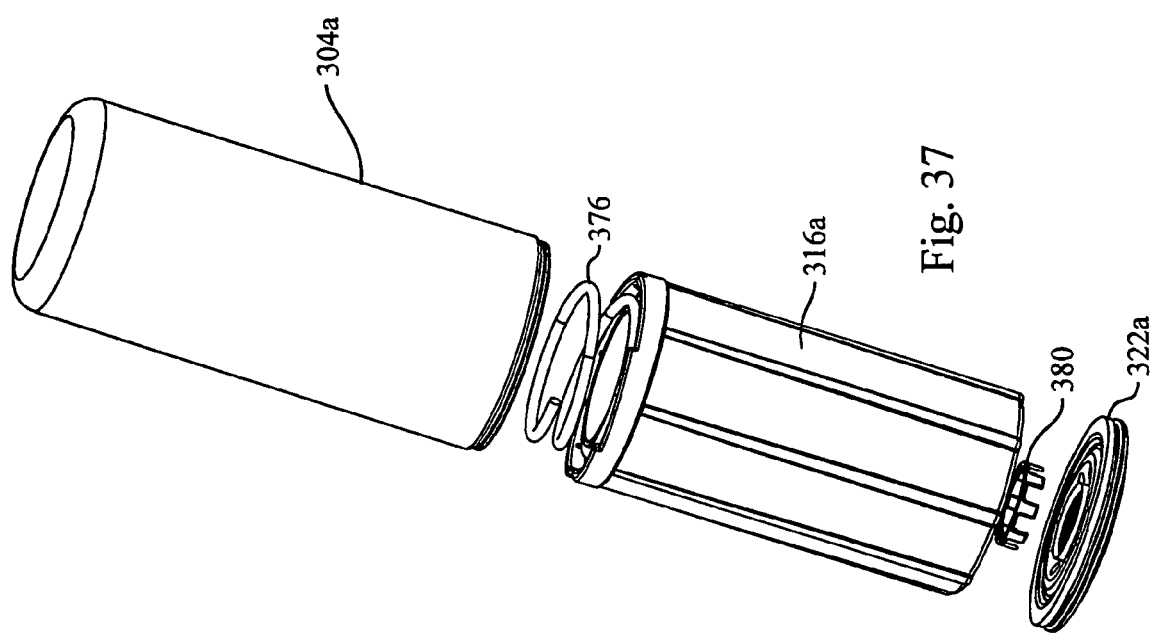

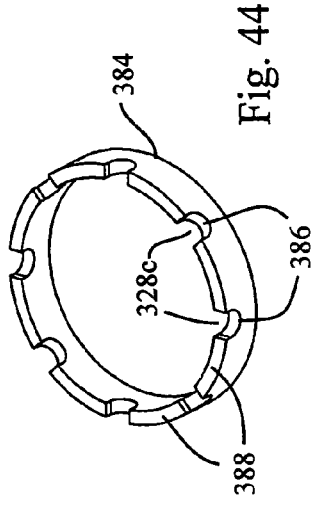
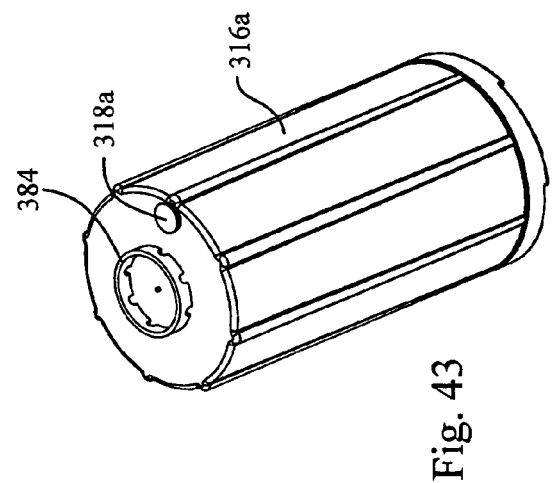
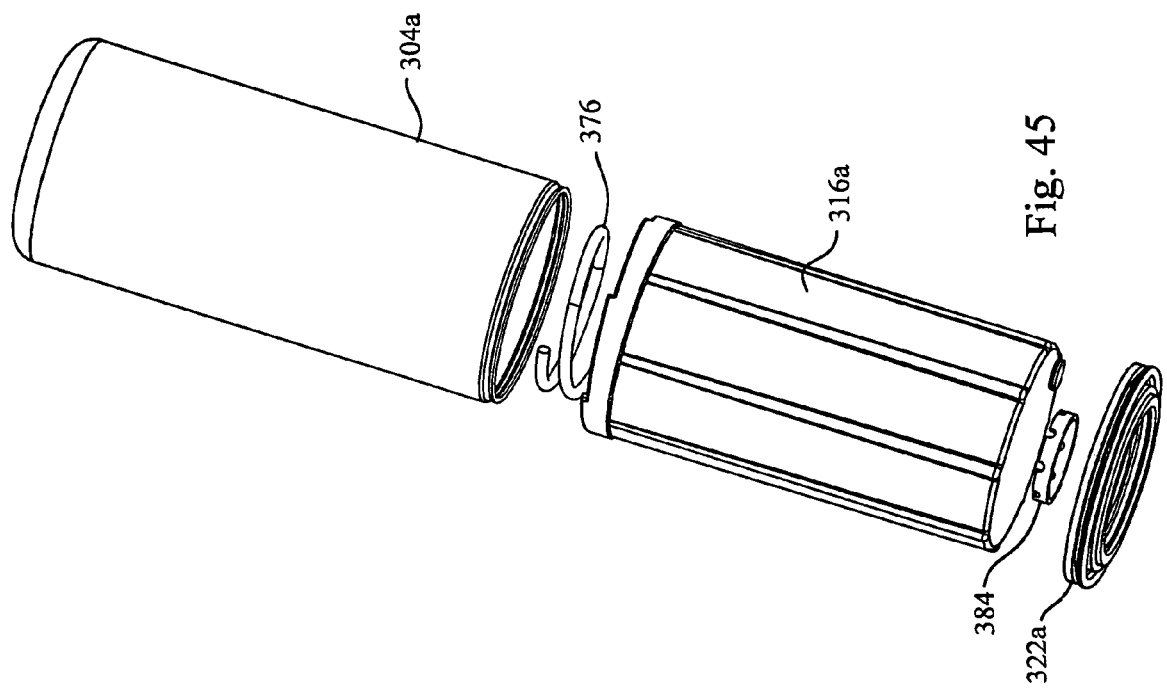

PRESSURE GRADIENT DOSING SYSTEM FOR FLUID SUPPLY

CROSS-REFERENCE TO RELATED APPLICATIONS

This application is a continuation-in-part of U.S. patent application Ser. No. 10/956,408, filed Sep. 30, 2004, now U.S. Pat. No. 7,153,422, and a continuation-in-part of U.S. patent application Ser. No. 10/767,513, filed Jan. 29, 2004, now U.S. Pat. No. 7,156,991. The '408 application is a continuation-in-part of the '513 application.

BACKGROUND AND SUMMARY

The invention relates to fluid supply systems, and more particularly to a pressure gradient dosing system for a fluid supply system.

PARENT APPLICATIONS

The following section is taken from the above noted parent applications.

The parent inventions are directed to a liquid filtration system and to a method of treating the liquid in the enclosed system.

Filter assemblies are commonly used to protect combustion engines by filtering out contaminants and thereby preventing damage to the engine and other downstream components such as valves, fuel injectors, fuel lines, and related other components. To maintain engine performance and reliability, the filter assemblies must be replaced, often as frequently as every 2,000 to 4,000 vehicle miles.

It can be equally important to add agents to the fuel to reduce damage to the engine and related downstream components and/or to enhance the performance of the engine. For example, since the early 1990's diesel fuel producers have significantly reduced the sulfur content in diesel fuel to reduce the environmental harm that was attributed to the burning of high sulfur content fuels. However, the naturally occurring sulfur in the diesel fuel also acted as a lubricant. The resulting low sulfur content diesel fuel caused increased wear on the diesel engine and, in particular, to the fuel pump and injectors, which in turn caused significant harm to the overall operation, performance, and efficiency of the engine and even to the environment. Consequently, various additives were developed to increase not only the lubricity but also to enhance fuel stability, fuel combustion, and engine performance.

It is difficult to maintain a constant or desired level of the additive in the fuel. Typically an operator adds a bottled additive or additive concentrate to the vehicle fuel tank with each fuel fill-up. While many bottled fuel additives are commercially available, often operators do not consistently add the additive with each fill-up—the additive might not be readily available or the operator may forget to include the additive. Combining the additive with fuel in the fuel tank may not reliably provide a homogenous fuel/additive mixture.

Fuel tanks do not include reliable methods for mixing fuel. Generally operators rely upon the turbulence created during a fill-up and by vehicle motion to mix the additive and fuel. Furthermore, the additive concentration in the fuel may vary, depending upon the amount of fuel in the fuel tank—assuming a set amount of additive is added with each fill-up.

Various alternative methods have been developed to add the additives to fuel. One method includes providing a fuel additive in a filter assembly such as disclosed in U.S. Pat. No. 6,238,554 issued to Martin et al., which adds the additive to the fuel under diffusion-controlled conditions.

Another method is disclosed by Davis in U.S. Pat. No. 5,507,942, which includes a filter assembly with a solid fuel additive that dissolves in the fuel as the additive contacts the fuel in the filter assembly.

The parent inventions provide a novel method of treating fuel by capitalizing on the existence of or developing a fluid pressure gradient within the filter assembly. The pressure gradient can then be harnessed to continuously add the fuel additive to the fuel flowing through the filter assembly. Consequently, the parent inventions provide novel advancements and additionally provides a wide variety of benefits and advantages in the relevant subject matter.

While the above discussion has been directed toward filter assemblies, the parent inventions provide a novel filter assembly and method of treating the fluid flowing through that filter, regardless of whether that liquid is a fuel. The principles embodied in the parent inventions apply to filters in general and can be used in filter assemblies, hydraulic filters, lubricant filters, and/or coolant filters.

The parent applications relate to a novel filter assembly, the manufacture and use thereof. Various aspects of the parent applications are novel, nonobvious, and provide various advantages. While the actual nature of the parent applications covered therein can only be determined with reference to the claims appended thereto, certain forms and features, which are characteristic of the preferred embodiments disclosed therein, are described briefly as follows.

In one form, the parent inventions provide a filter that comprises a housing defining an interior chamber and including an inlet, an outlet, and a fluid pathway for a liquid flowing through the interior chamber. Liquid flowing through the fluid pathway generates a pressure gradient within the interior chamber such that in a first region of the interior chamber, the flowing liquid exhibits a first (higher) fluid dynamic pressure and in a second region the flowing liquid exhibits a second (lower) fluid dynamic pressure. The filter also includes a filter element disposed in the interior chamber in the fluid pathway between the inlet and the outlet and a container disposed within the interior chamber. The container has an exterior wall that defines an interior region. The container also includes a first opening with a first capillary tube extending from the exterior wall and a second opening through the exterior wall and spaced apart from the first opening. The first opening and said second opening each provide fluid communication between the interior chamber and the interior region. A liquid additive can be deposited in the interior region. The liquid additive can be selected to provide a benefit to at least one of a fuel, oil, lubricant, and coolant.

In another form the parent inventions provide a filter that comprises a housing defining an interior chamber and including an inlet and an outlet into the interior chamber; and a filter element disposed in the interior chamber between the inlet and the outlet, where the filter element partitions the interior chamber into two regions—an entering region proximate to the inlet and an exiting region proximate to the outlet. The filter also includes a container disposed within the interior chamber and defining an interior region. The container has a first capillary tube extending into the entering region and a second capillary tube providing fluid communication between the interior region and the interior chamber. A liquid additive, which has been selected to provide a benefit to the liquid flowing through the filter, can be deposited in the interior region of the container.

The parent inventions also provide a method of supplying an additive to the liquid flowing through a filter assembly. The method comprises generating a dynamic fluid pressure gradient within the filter housing; providing an additive in a container within the filter housing; positioning an inlet port for the container proximate to an area of a first dynamic fluid pressure within the filter housing; and positioning an outlet port for the container proximate to an area of a second dynamic fluid pressure less than the first dynamic fluid pressure thereby inducing the liquid additive to flow out of the container.

In other forms, the parent inventions provide a filter assembly that comprises a housing defining an interior chamber; a filter element disposed within the housing and that partitions the interior chamber into an inlet region and a filtered region. The container is positioned within the housing and defines a reservoir. The container includes a first opening that allows the fluid from the inlet region into the reservoir and a second opening allowing the additive or a mixture of the additive and the fluid to flow out of the reservoir toward the outlet to the assembly.

In other forms, the parent inventions provide a filter assembly for filtering a fluid. The filter comprises a housing defining an interior chamber, the housing including a nut plate having an inlet and an outlet for the fluid. The filter also includes a filter element that is permeable to the fluid and which is disposed within the housing; and a container that is also positioned within the housing. The container defines a reservoir configured for receipt of a liquid additive. The container also includes a first opening allowing fluid entering from the inlet to flow into the reservoir and a second opening allowing a liquid additive deposited within the reservoir to flow toward the outlet. The first opening and the second opening are configured to allow fluid to flow through the container at a fluid face velocity (and hence corresponding pressure drop) therethrough) of about less than 50% of the fluid face velocity of the primary flow through the filter element.

In still other forms, the parent inventions provide a filter assembly for filtering a fluid. The filter comprising: a housing defining an interior chamber, the housing including a nut plate having an inlet and an outlet for the fluid; a filter element permeable to the fluid and disposed within the housing; and a container positioned within the housing. The container defines a reservoir configured for receipt of a liquid additive and can further include a first opening allowing fluid entering from the inlet to flow into the reservoir and a second opening allowing a liquid additive deposited within the reservoir to flow to the outlet. The second opening is constricted relative to the first opening to attenuate the fluid flow into the container.

Present Application

A pressure gradient dosing system is provided for a fuel supply system.

In one implementation, the invention arose during development efforts directed toward a need in light duty fleets, such as beverage delivery and refuse collection trucks, that are retrofitting aftertreatment devices on vehicles. Some fleets are using a fuel born catalyst to help particulate trap regeneration due to the duty cycles. The preventative maintenance cycles of the fleets may be 12,000 miles or six months, whichever comes first. Pressure gradient slow release filters have a liquid capacity to perhaps treat fuel for 5,000 miles (approximately 600 to 800 gallons of fuel), and hence filter capacity is a limiting factor in drain intervals. A dosing canister capable of holding enough additive to reach 12,000 miles (approximately 1,500 to 2,000 gallons of fuel) would be an advantage. Some fleets are having to go to diesel particulate filters for catalytic aftertreatment for reduction of emissions. Such fleets are typically installing mechanical dosing systems to provide a method of using a liquid fuel born catalyst. In order to achieve a 1,500 hour preventative maintenance cycle, an improved and lower cost option is needed. Current pressure gradient filters are limited for use in low mileage, low hour operating applications, such as beverage delivery trucks, refuse collection trucks, etc., and cannot effectively be used on heavy duty on-highway fleet applications. It is desired to provide a dosing system to treat vehicles that operate on 25,000 to 30,000 mile drain intervals and burn 3,800 to 4,600 gallons of diesel fuel. 2007 engines will likely be using diesel particulate filters with active regeneration, but still may need a way to passively regenerate the diesel particulate filter using a fuel born catalyst. A line of fuel additives that can be packaged in a dosing canister or housing for remote mounting on a heavy duty on-highway truck engine is desirable. A fleet could apply a winter conditioner using a dosing canister on a vehicle when winter is approaching and effectively provide winter gel protection. Furthermore, lubricity currently has a limitation of approximately 500 hours of operation, and a remote mounted dosing canister could double the preventative maintenance cycle.

The present invention also arose during continuing development efforts related to the above noted parent '408 and '513 applications, though is not limited thereto, and may be used as a pressure gradient dosing system for various fluid supply systems. The present invention may be used with or without the filter element of the noted parent applications.

BRIEF DESCRIPTION OF THE DRAWINGS

Parent Applications

FIG. 1 is a cross-sectional view of one embodiment of a filter assembly in accordance with the parent applications.

FIG. 2 is an exploded cross-sectional view of a filter of the filter assembly of FIG. 1.

FIG. 3 is a partial view in full section of the lower portion of the filter illustrated in FIG. 1.

FIG. 4 is a graph illustrating the dynamic pressure of a fluid flowing through a filter measured at varying axial position within the filter housing between the filter and shell.

FIG. 5 is a graph comparing the flowrate of a fluid entering a container with a capillary tube outlet to a container without a capillary tube outlet.

FIG. 6 is a graph comparing the flowrate of a liquid additive (the active ingredient portion of an increasingly dilute mixture) exiting a container with a capillary outlet to a container without a capillary outlet.

FIG. 7 is a partial view in full section of an alternative embodiment of a filter assembly in accordance with the parent applications.

FIG. 8 is a partial view with sections broken away of yet another alternative embodiment of a filter assembly with a flow-directing insert in accordance with the parent applications.

FIG. 9 is a sectional view taken along section line 9-9 of the flow-directing insert illustrated in FIG. 8.

FIG. 10 is a cross-section view of another embodiment of the filter assembly in accordance with the parent applications.

FIG. 11 is a sectional view taken along section line 11-11 of the additive cartridge illustrated in FIG. 10.

FIG. 12 is a perspective view of a replaceable cartridge for use in the parent applications.

FIG. 13 is a cross-sectional view of the replaceable cartridge illustrated in FIG. 12.

FIG. 14 is an elevated view in full section of yet another embodiment of a filter assembly with a replaceable cartridge in accordance with the parent applications.

FIG. 15 is a cross-sectional view of still yet another embodiment of a filter assembly with an extended shroud on the filter element endcap for enhanced liquid velocity at the inlet tube in accordance with the parent applications.

FIG. 16 is a partial view of the extended shroud on the filter element endcap and inlet tube illustrated in FIG. 15.

FIG. 17 is a cross-sectional view of yet another embodiment of a filter assembly in accordance with the parent applications.

FIG. 18 is a cross-sectional view of an additive cartridge for use in the filter assembly of FIG. 17.

FIG. 19 is a perspective view of the additive cartridge of FIG. 17.

FIG. 20 is a partial cross-sectional view of an alternative embodiment of the upper lid for a cartridge for use in the filter assembly of FIG. 17.

FIG. 21 is a perspective view of the additive cartridge illustrating the lower wall portion in accordance with the parent applications.

Present Application

Figure 22:
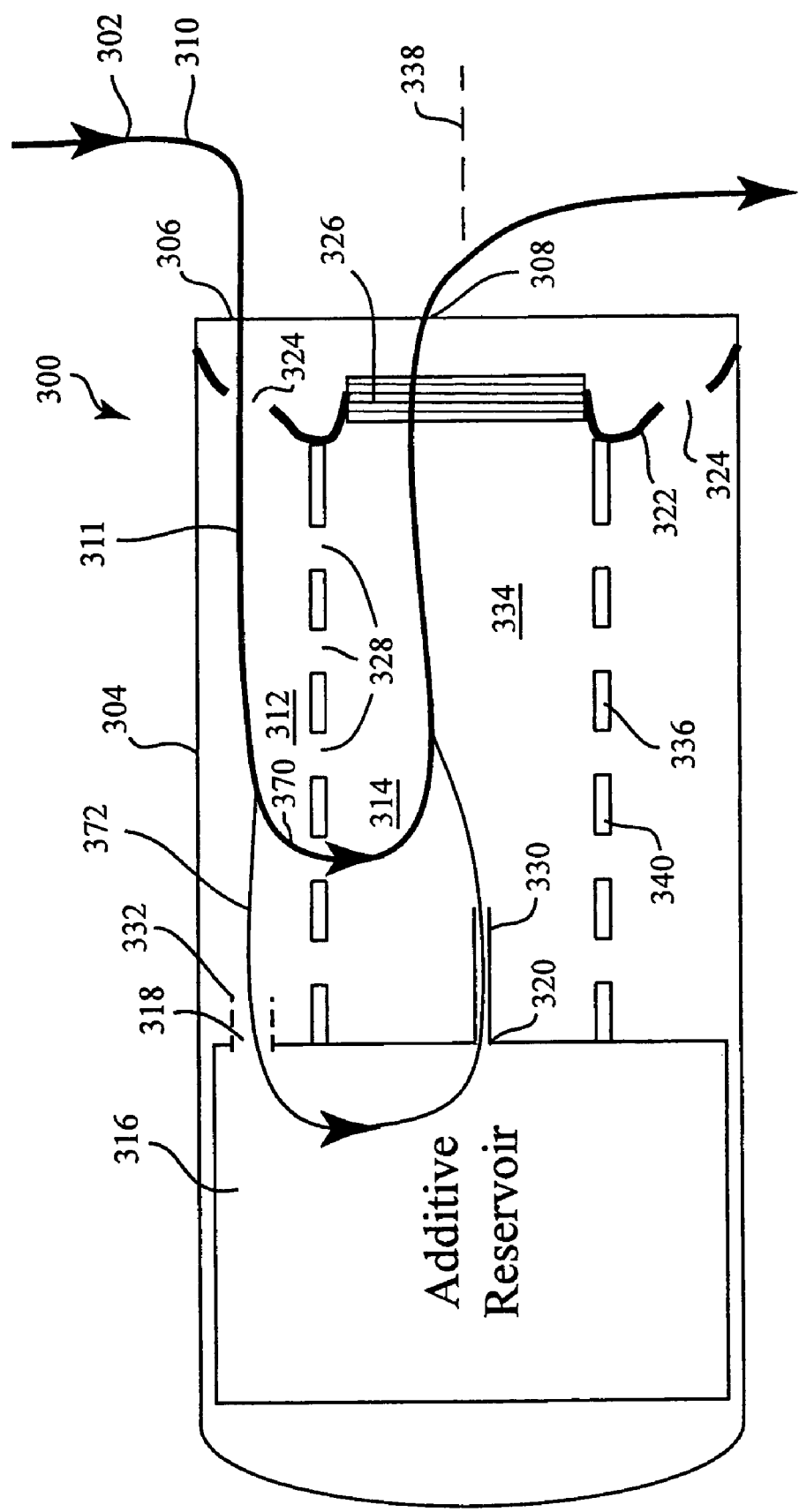

FIG. 22 is a side sectional schematic view of one embodiment of a pressure gradient dosing system for a fuel supply system in accordance with the present invention.

Figure 23:
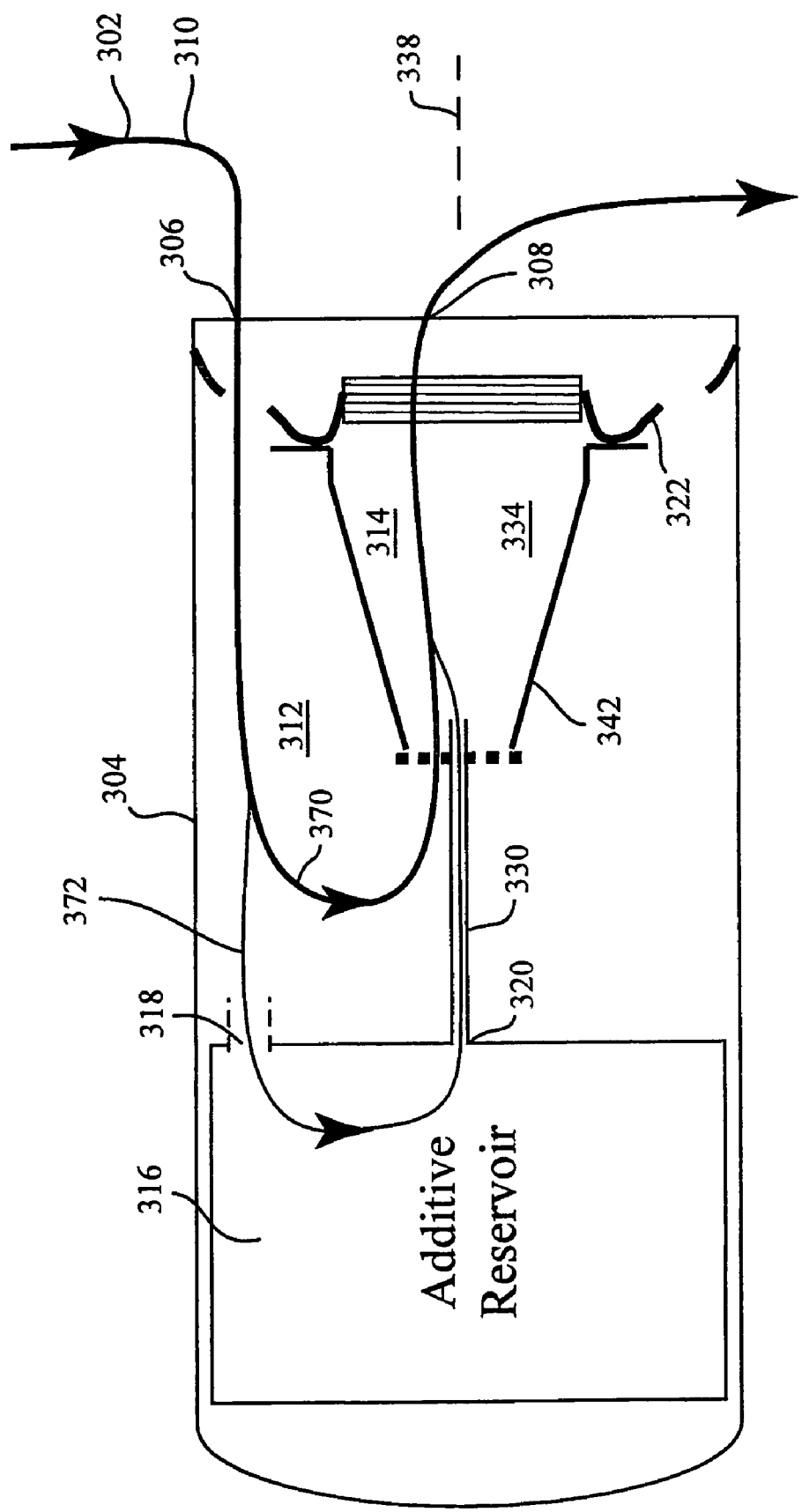
Figure 24:
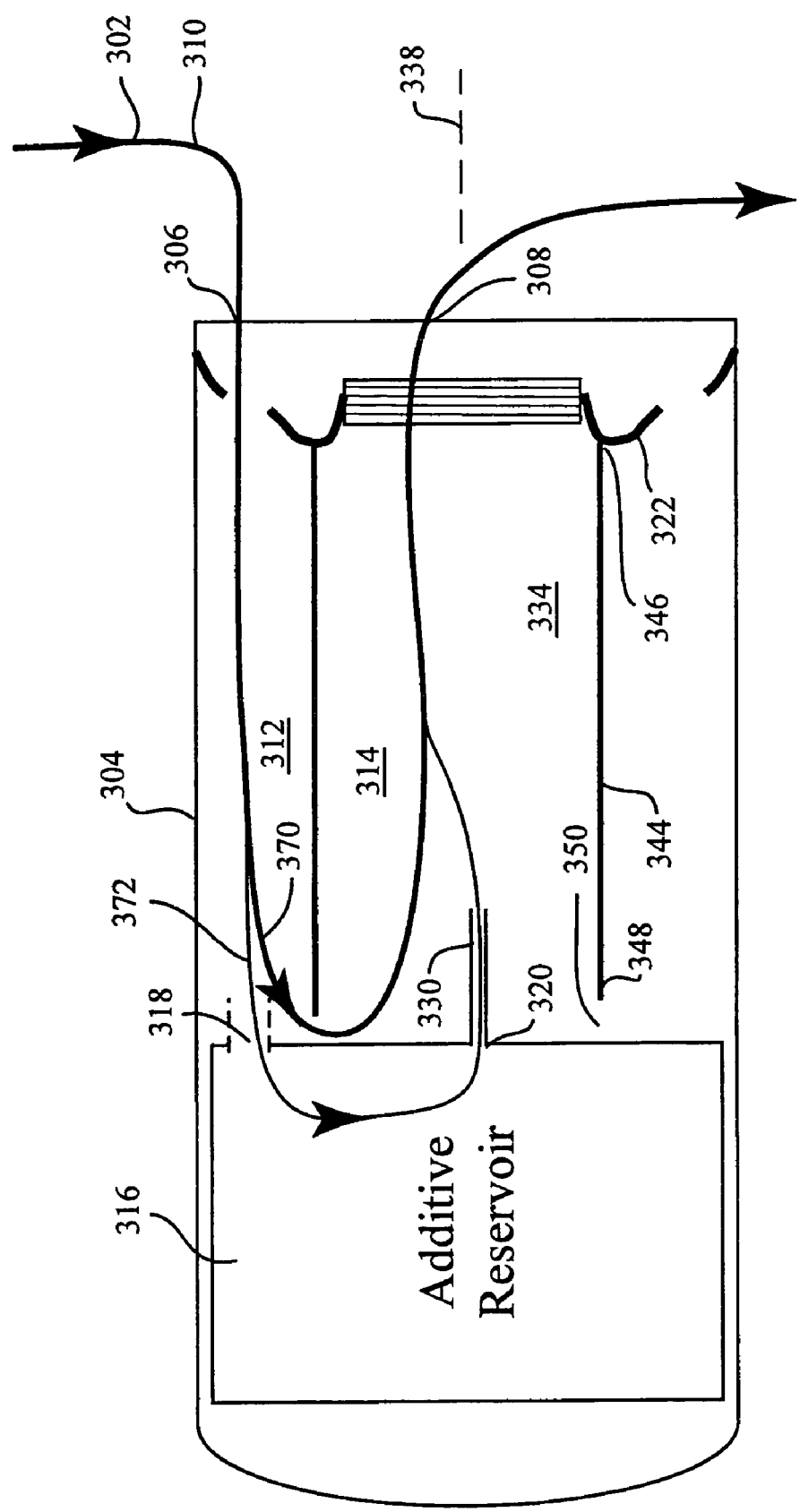
Figure 25:
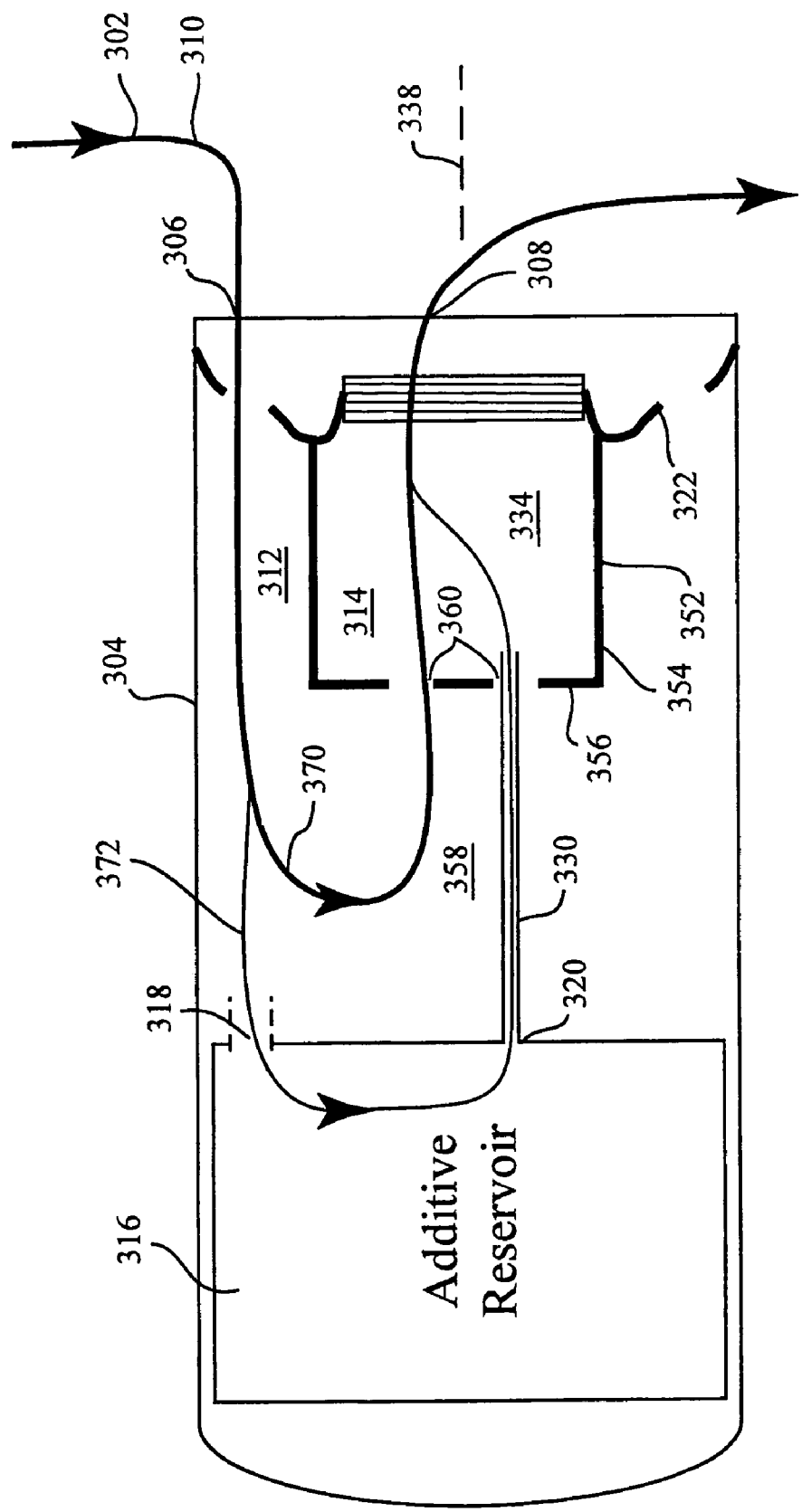
Figure 26:
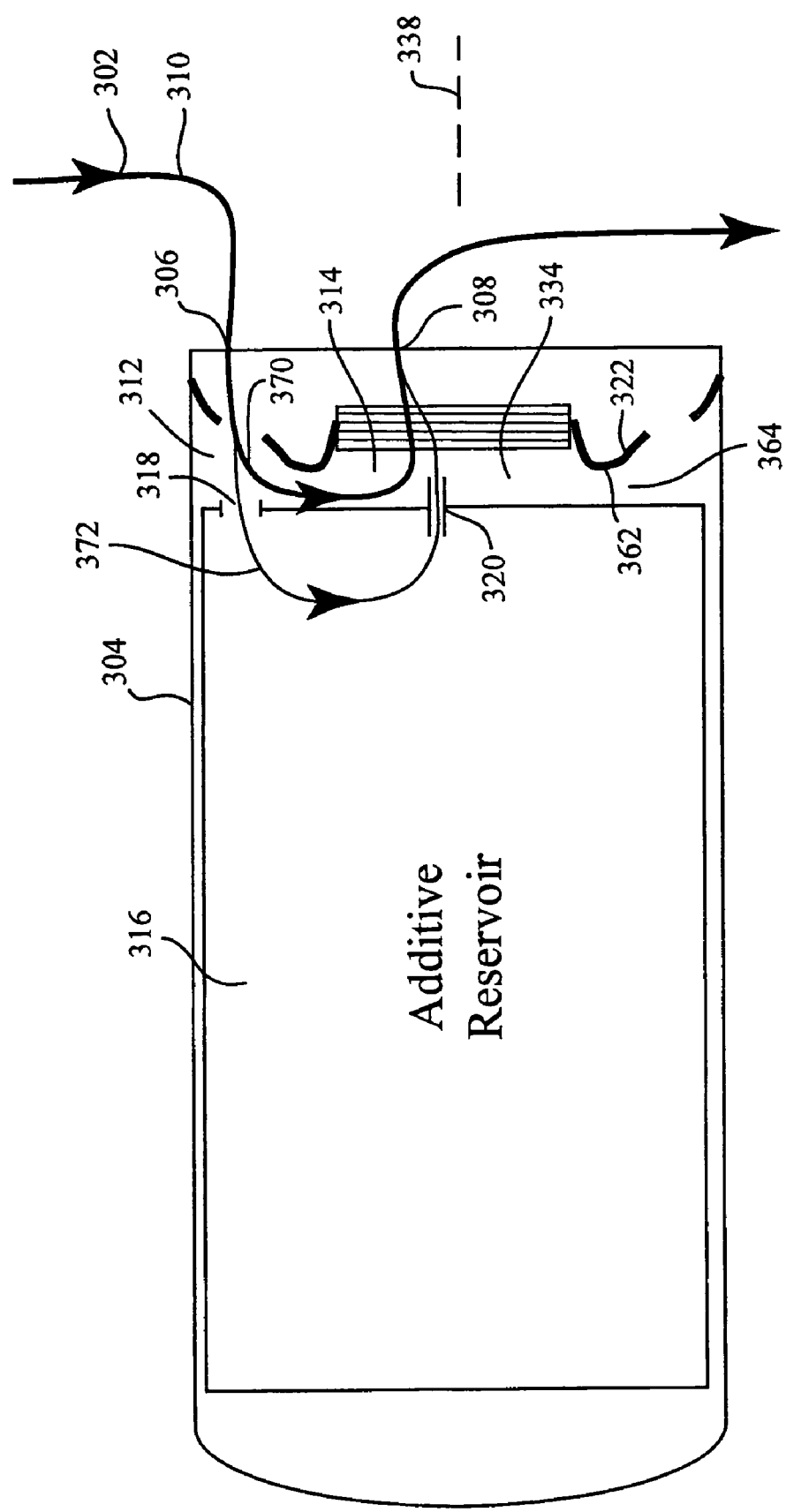
Figure 27:
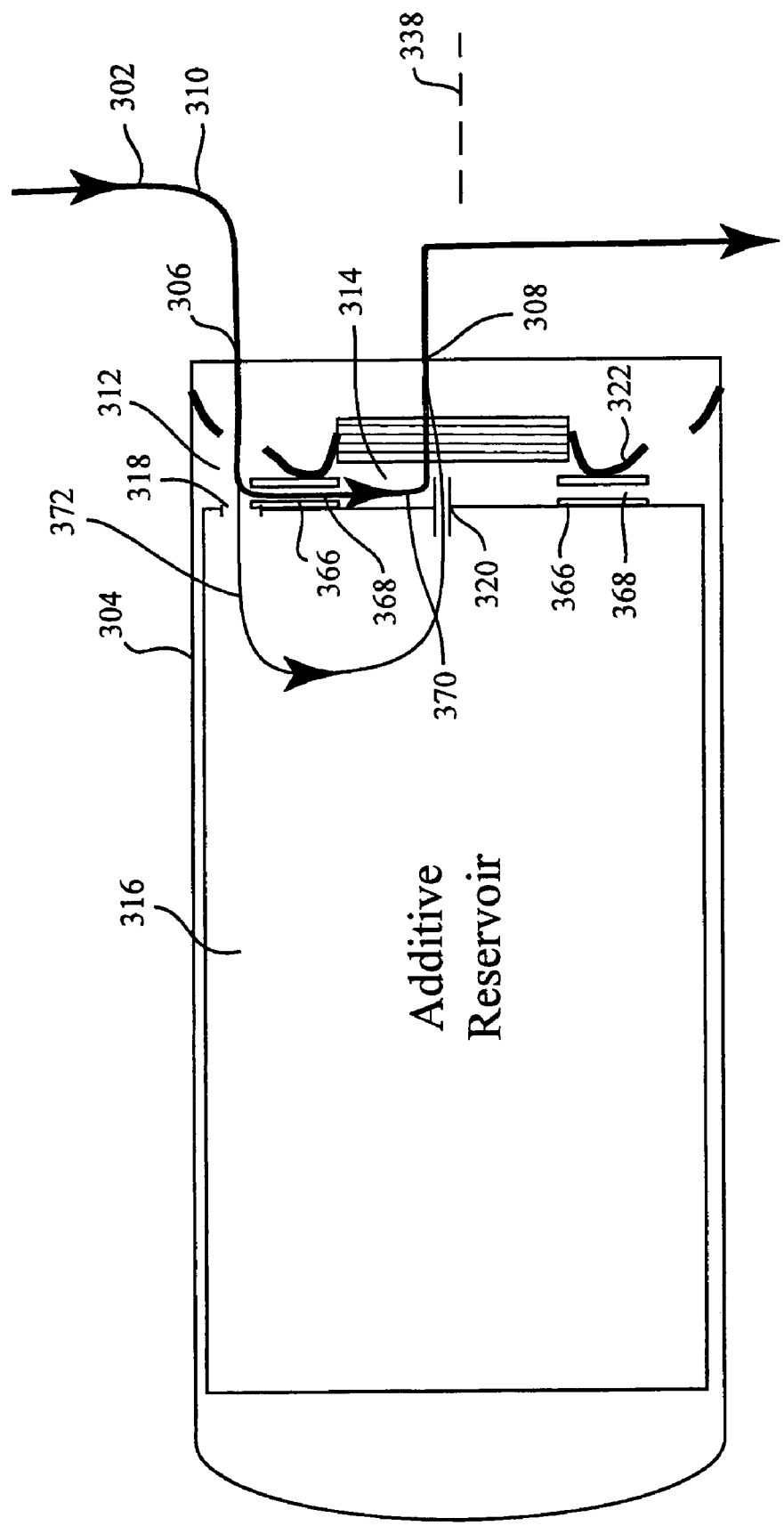
Figure 28:
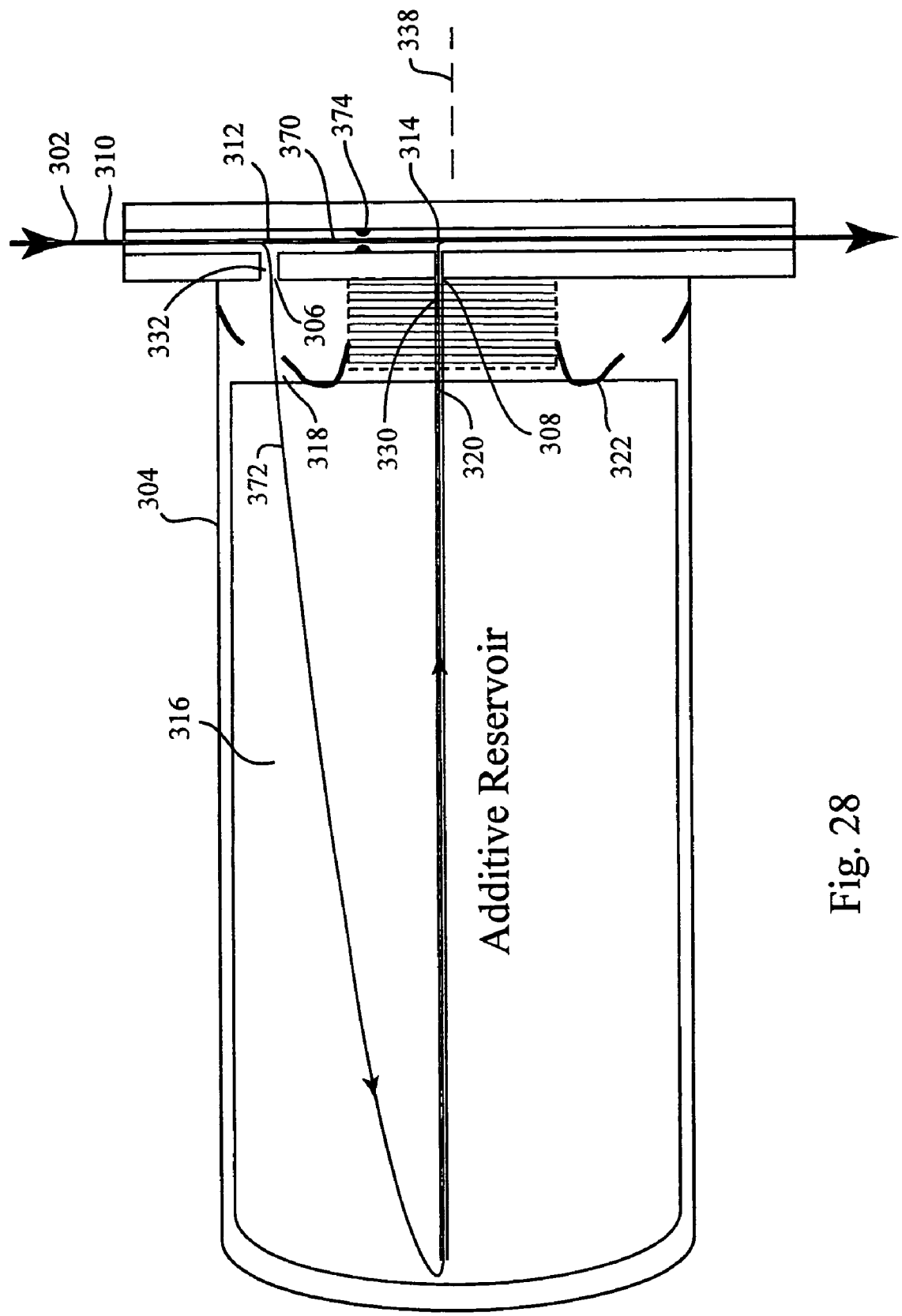

FIG. 23 is like FIG. 22 and shows another embodiment.
FIG. 24 is like FIG. 22 and shows another embodiment.
FIG. 25 is like FIG. 22 and shows another embodiment.
FIG. 26 is like FIG. 22 and shows another embodiment.
FIG. 27 is like FIG. 22 and shows another embodiment.
FIG. 28 is like FIG. 22 and shows another embodiment.

Figure 29:
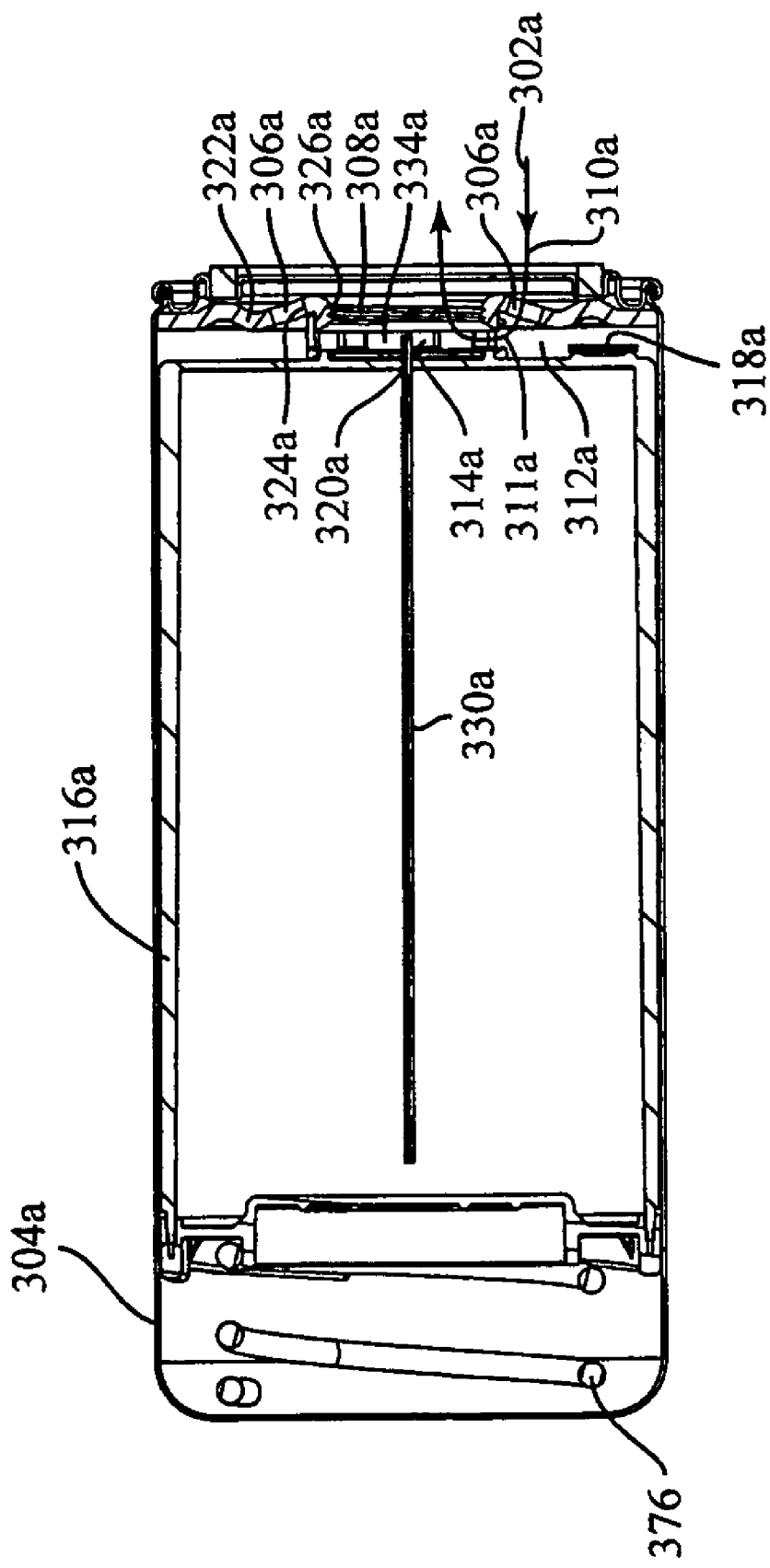

FIG. 29 is a side sectional view showing a further embodiment.

Figure 30:
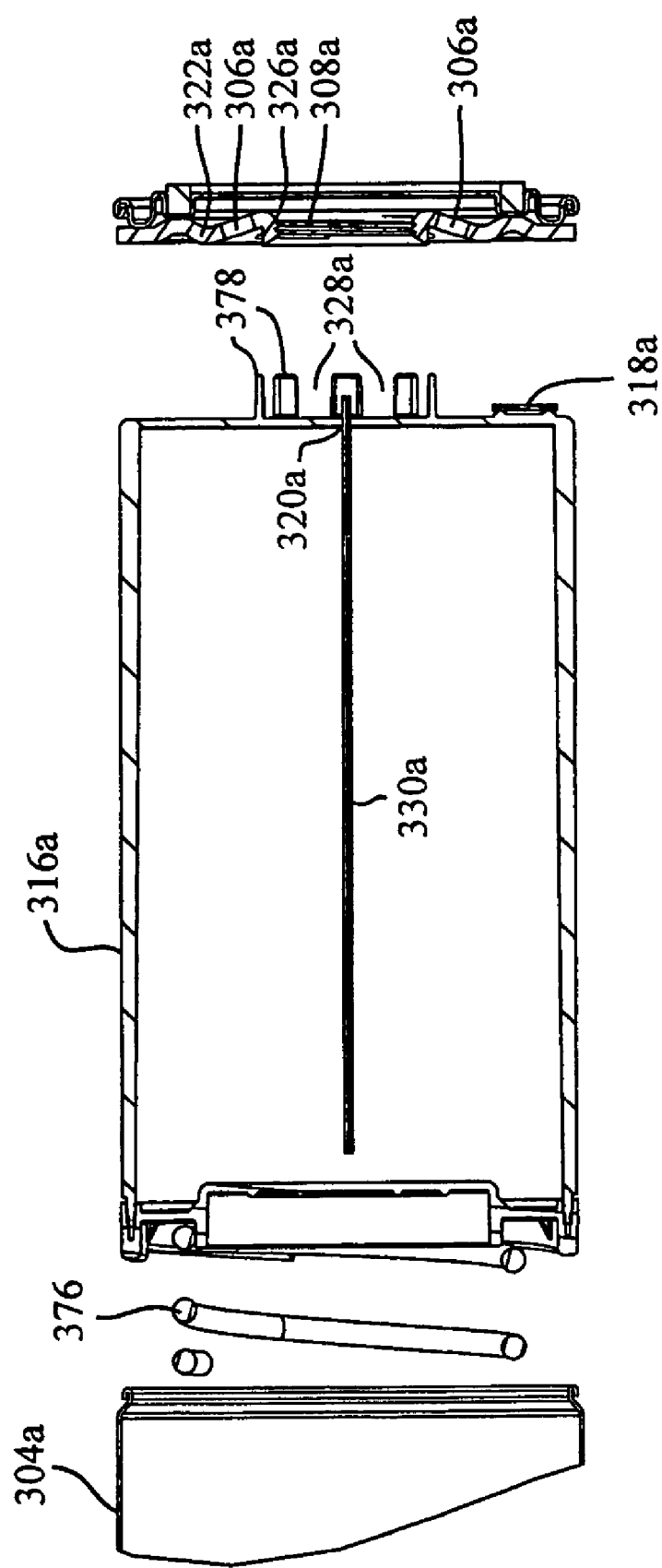

FIG. 30 is a side sectional exploded view of the device of FIG. 29.

FIG. 31 is a side elevation exploded view of the device of FIG. 29.

FIG. 32 is a perspective view of a component of FIG. 31.

Figure 33:
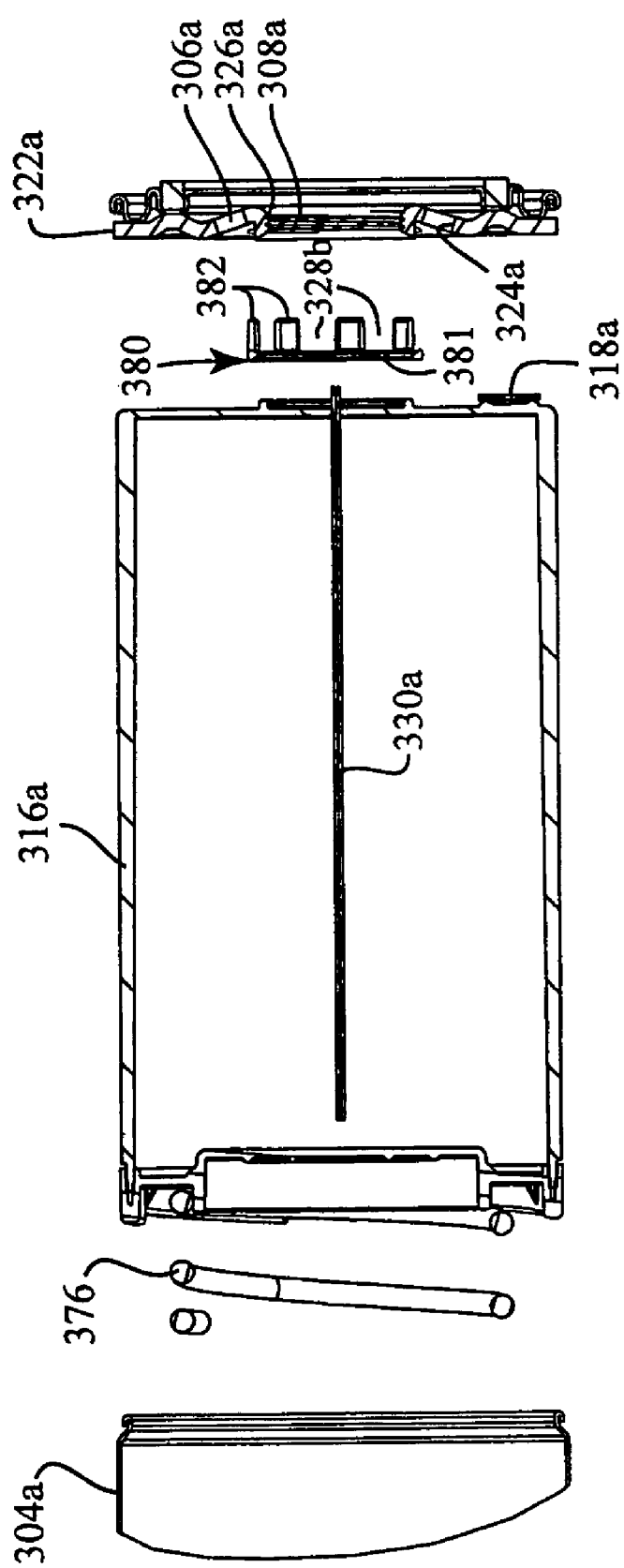

FIG. 33 is a side sectional exploded view showing a further embodiment.

Figure 34:
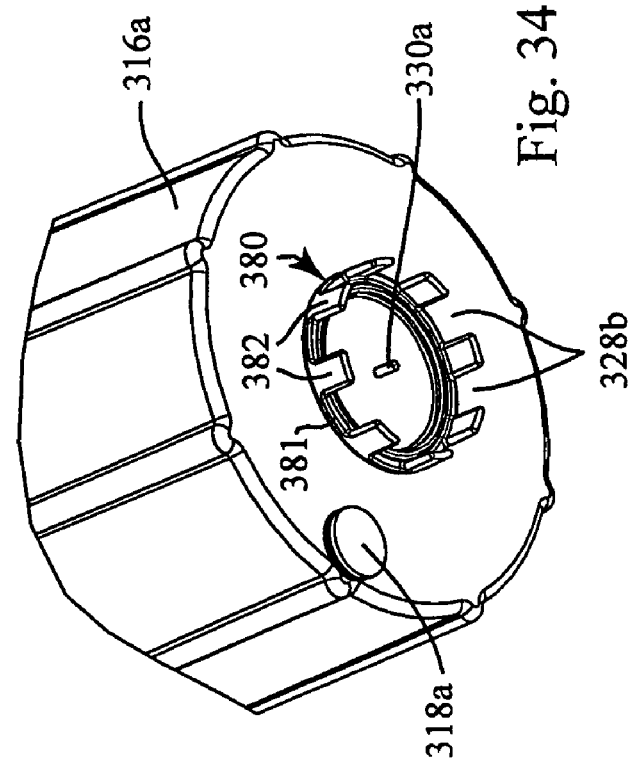

FIG. 34 is a perspective view of a portion of the device of FIG. 33.

Figure 35:
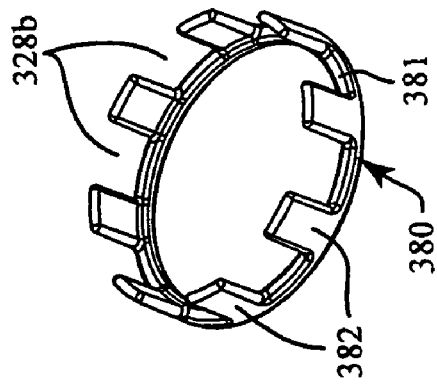

FIG. 35 is a perspective view of a component of FIG. 33.

Figure 36:
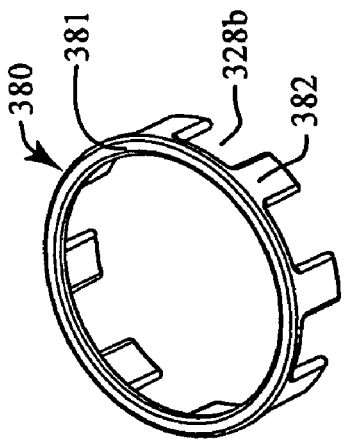

FIG. 36 is a perspective view of the component of FIG. 35 from a different angle.

FIG. 37 is an exploded perspective view of the device of FIG. 33.

FIG. 38 is a perspective view of a portion of the device of FIG. 33.

Figure 39:
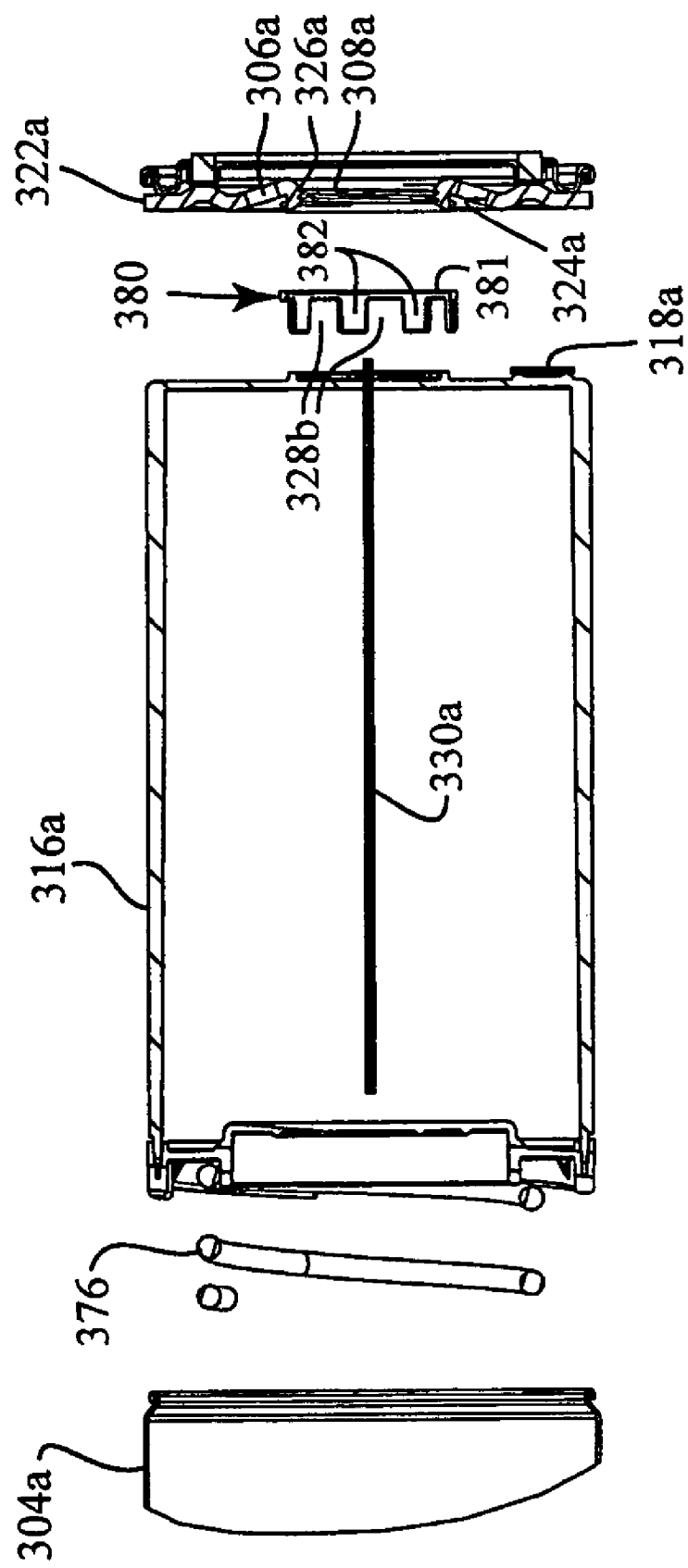

FIG. 39 is a side sectional exploded view showing a further embodiment.

Figure 40:
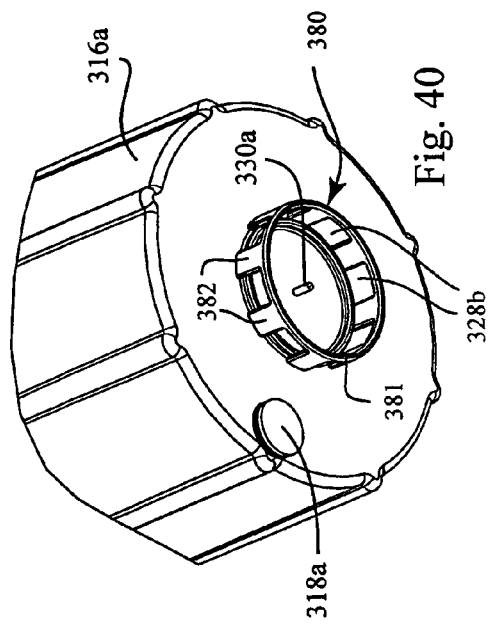

FIG. 40 is a perspective view of a portion of the device of FIG. 39.

Figure 41:
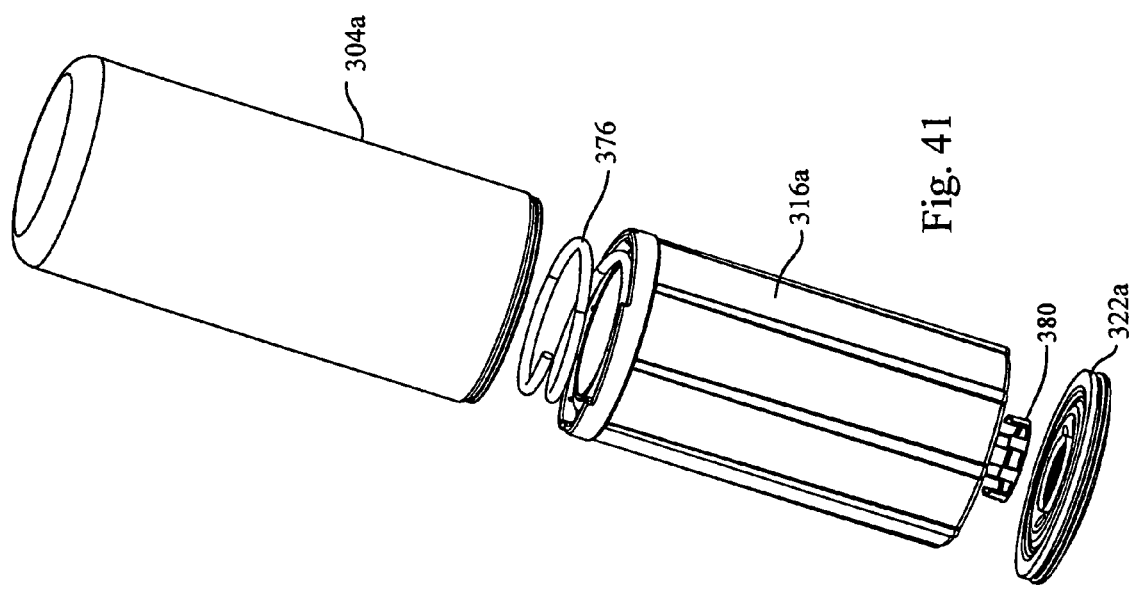

FIG. 41 is an exploded perspective view of the device of FIG. 39.

Figure 42:
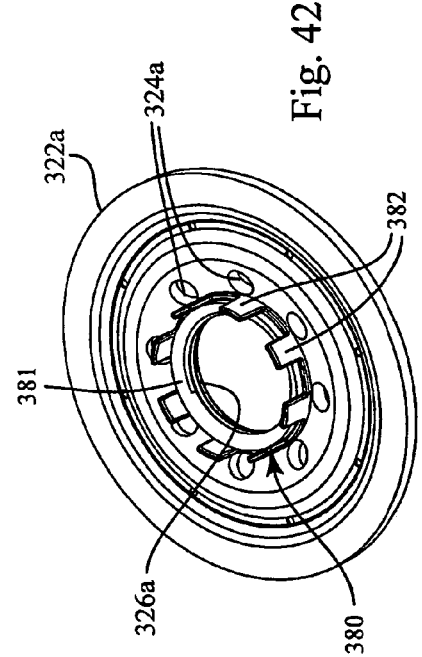

FIG. 42 is a perspective view of a portion of the device of FIG. 39.

FIG. 43 is a perspective view showing a further embodiment.

FIG. 44 is a perspective view of a component of FIG. 43.

FIG. 45 is an exploded perspective view of a device incorporating the components of FIGS. 43 and 44.

Figure 46:
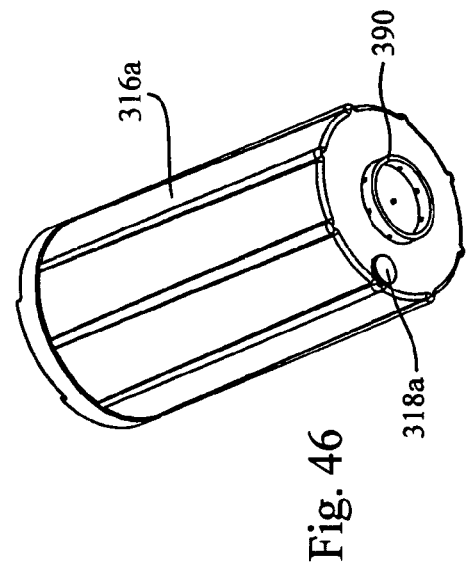

FIG. 46 is a perspective view showing a further embodiment.

Figure 47:
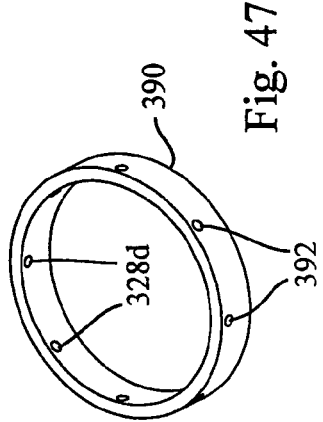

FIG. 47 is a perspective view of a component of FIG. 46.

Figure 48:
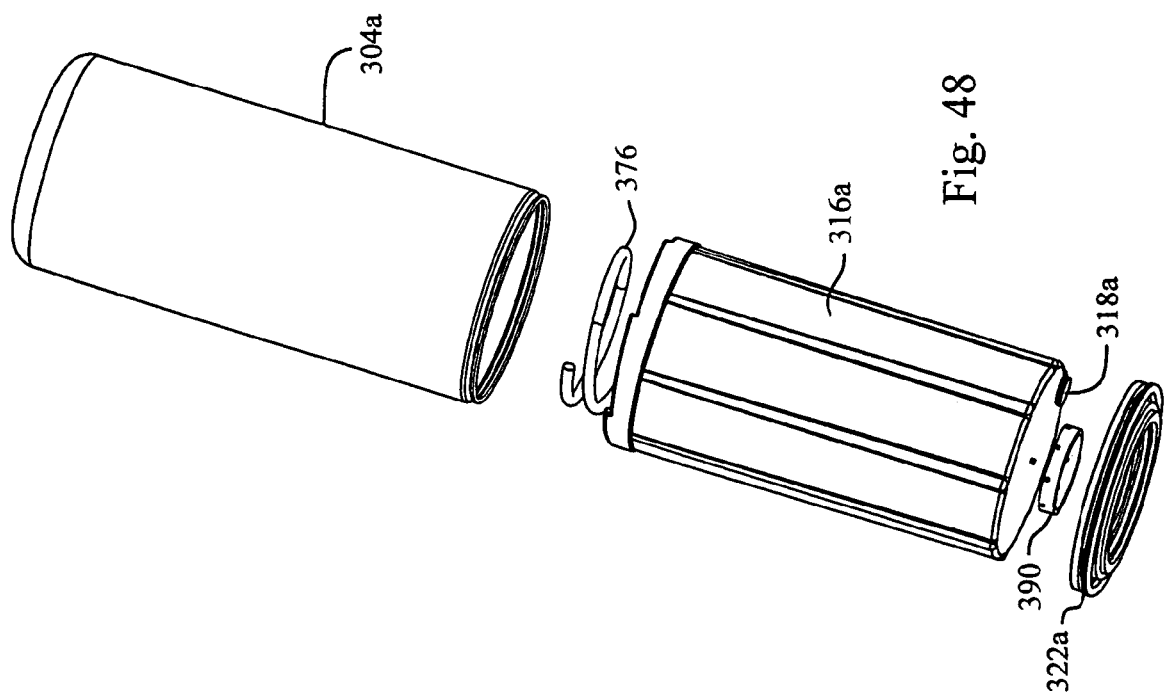

FIG. 48 is an exploded perspective view showing a device incorporating the components of FIGS. 46 and 47.

Figure 49:
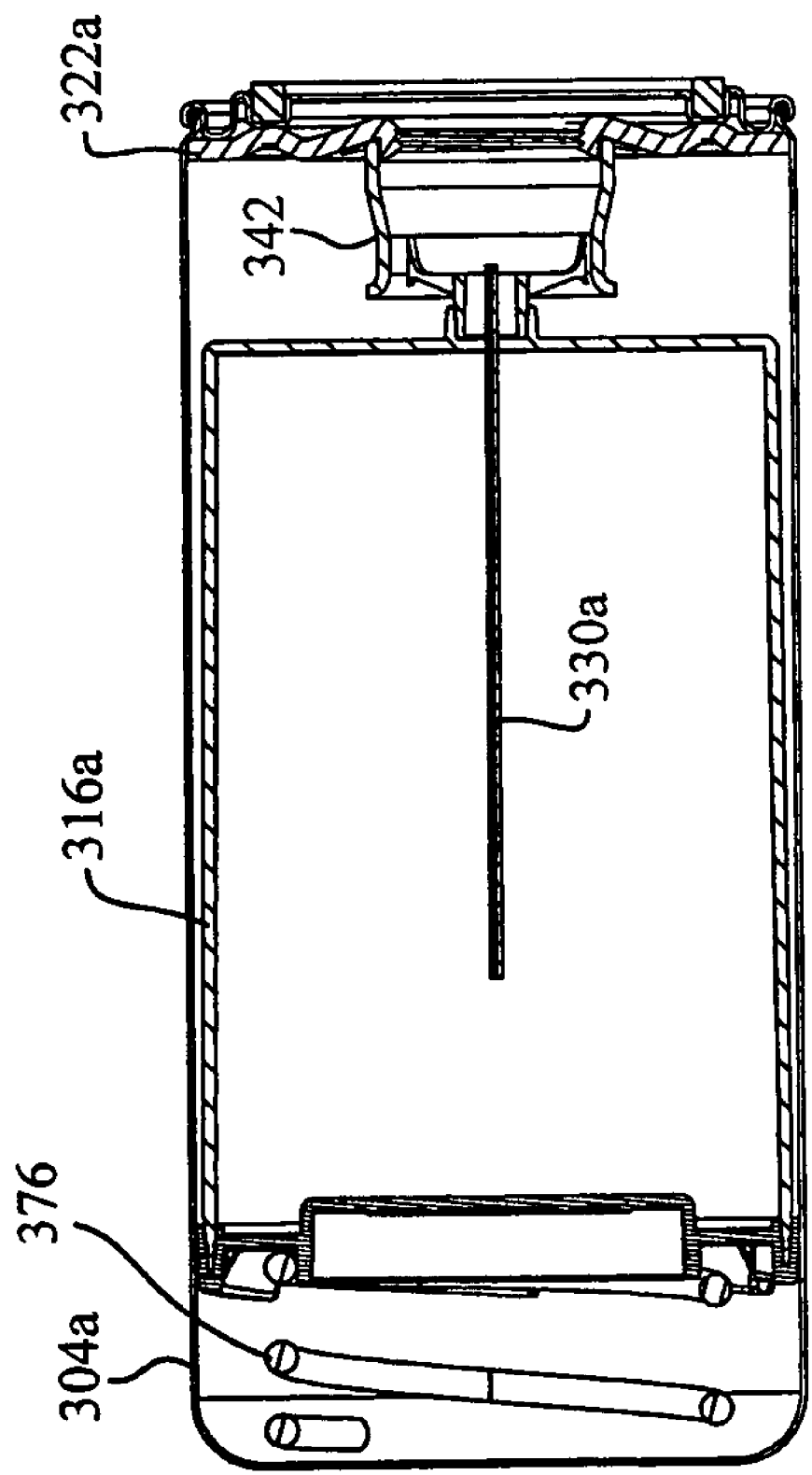

FIG. 49 is a side sectional view showing a further embodiment.

Figure 50:
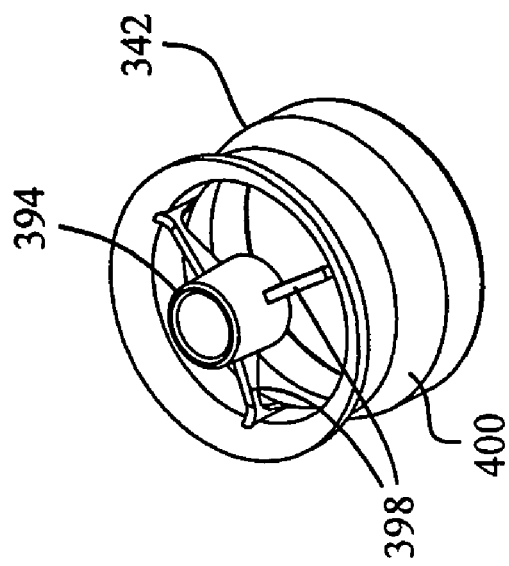

FIG. 50 is a perspective view of a component of the device of FIG. 49.

Figure 51:
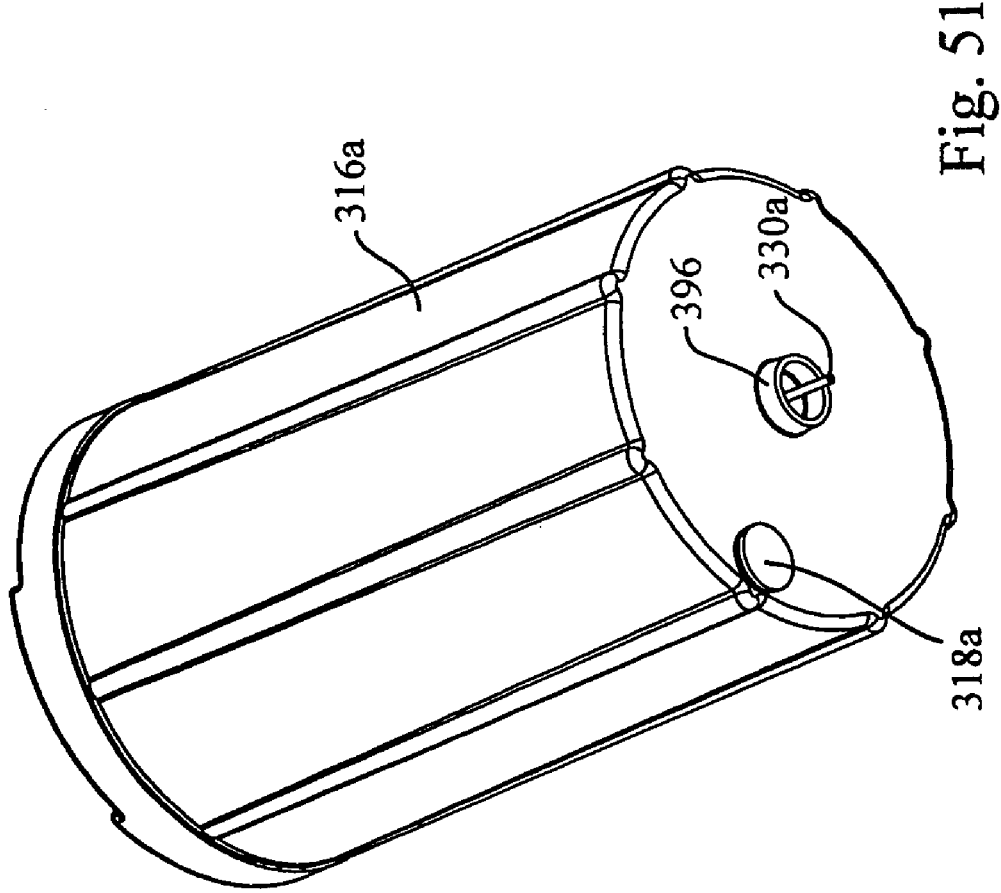

FIG. 51 is a perspective view of a component of the device of FIG. 49.

DETAILED DESCRIPTION

Parent Applications

The following section is taken from the above noted parent applications.

For the purposes of promoting an understanding of the principles of the parent applications, reference will now be made to the embodiments illustrated herein, and specific language will be used to describe the same. It will nevertheless be understood that no limitation of the scope of the parent applications is thereby intended. Any alterations and further modifications of the described filters, cartridges, and processes, and any further applications of the principles of the parent applications as described herein, are contemplated as would normally occur to one skilled in the art to which the parent applications relate.

Figure 1:
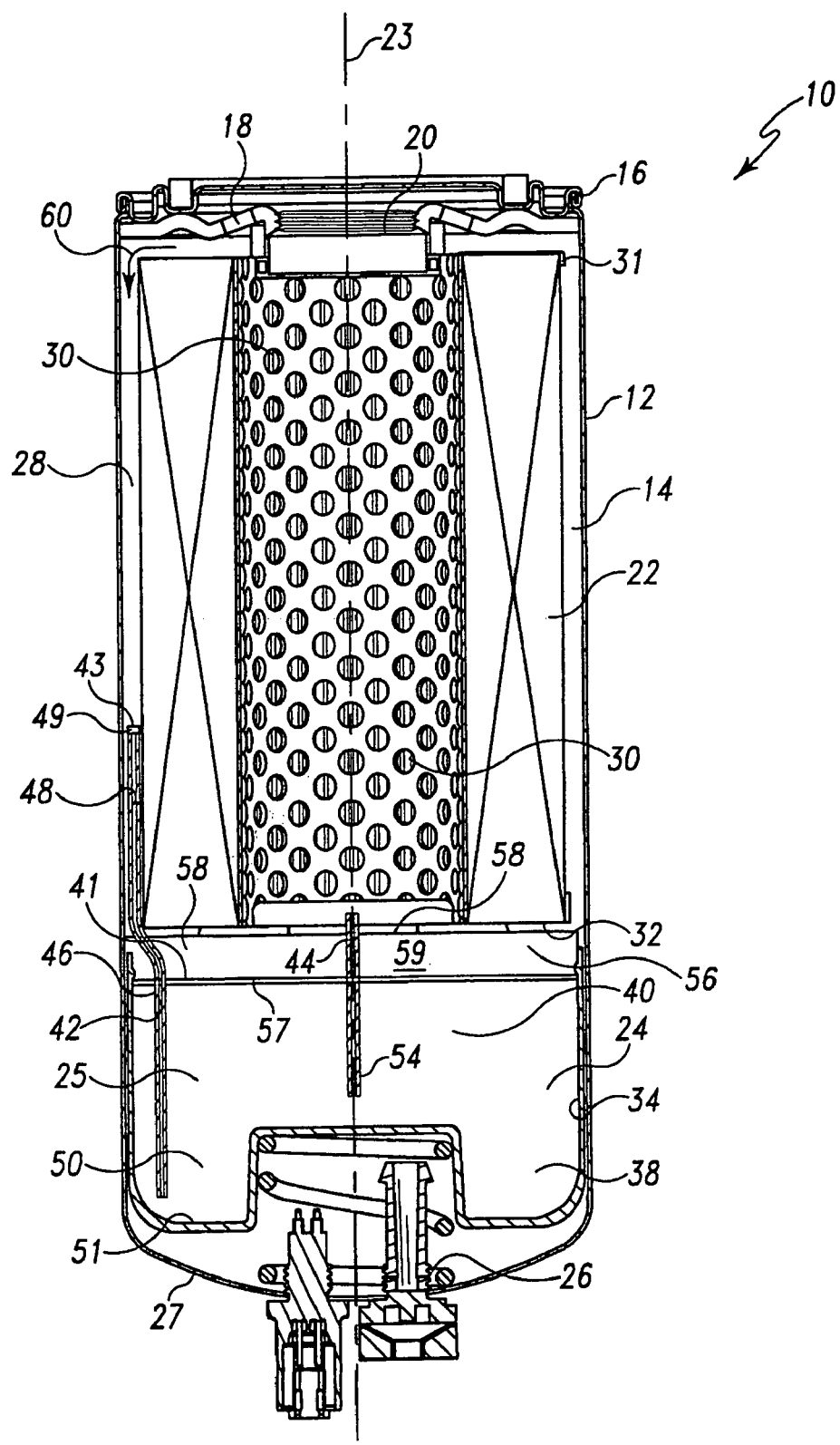
FIGS. 1-21 and the following descriptions thereof are taken from the noted parent applications.
Figure 2:
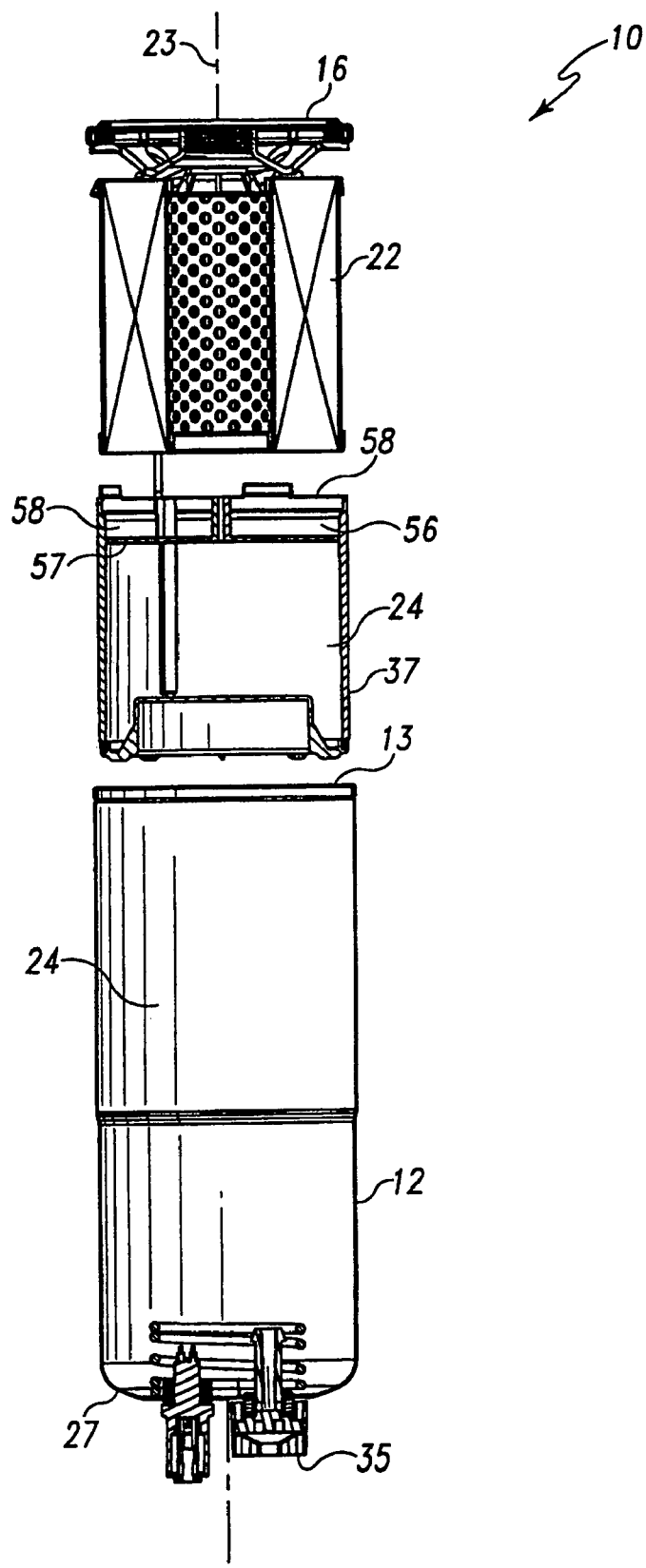

FIG. 1 is a cross-sectional view of a filter assembly 10 provided in accordance with the parent applications. FIG. 2 is an exploded, cross-sectional view of the same filter assembly 10. Filter assembly 10 includes a housing or outer casing 12 defining an interior chamber 14. A nut plate 16 is secured across an open end 13 of casing 12. Nut plate 16 provides at least one inlet 18, preferably a plurality of inlets, and at least one outlet 20. In the illustrated embodiment, nut plate 16 includes a plurality of inlets 18 encircling a centrally-located outlet 20. Both inlet(s) 18 and outlet 20 provide fluid communication with interior chamber 14 to allow a liquid such as, and organic based fuel, lubricant, or oil fluid; or an aqueous based coolant, to flow into and out of interior chamber 14. Additionally, a filter element 22 and a vessel or container 24 and, optionally, biasing element 26, are provided in interior chamber 14.

Filter element 22 is positioned in a fluid pathway between the liquid entering through inlet 18 and exiting through outlet 20. Additionally, filter element 22 can partition interior chamber 14 into a liquid entering region 28 and a liquid exiting region 30. Filter element 22 is provided in the form of any known and commercially available filter material. Examples of a material that can be used as a filter element include paper (cellulose), cloth, polyester, wire mesh, plastic mesh, gradient density melt-blown polymeric materials, and the like. In the illustrated embodiment, filter element 22 is provided as a cylindrical sleeve formed of a pleated sheet of filter material. The cylindrical sleeve defines a centrally-located axis 23. On either end of the cylindrical sleeve, filter element 22 is supported within interior chamber 14 with a first and second filter endcaps 31 and 33 to provide a fluid-tight seal. Consequently, a liquid flowing through filter assembly 10 must pass through filter 22 to flow from entering region 28 to exiting region 30.

Filter assembly 10 can also includes a water in fuel sensor and/or drain valve 35 in outer casing 12. It will be understood that for some applications the filter assembly need not include a drain valve. However, when present, drain valve 35 can be used to drain out any water that has separated from a non-aqueous liquid such as the organic based fuels, oils, and lubricants. The separated water can collect in the bottom of the interior chamber 14. The water droplets can flow down between the inside wall of casing 12 and the exterior wall of container 24, which can have vertically extending spacers 37 to separate and centrally position container 24 in the interior chamber 14.

Figure 3:
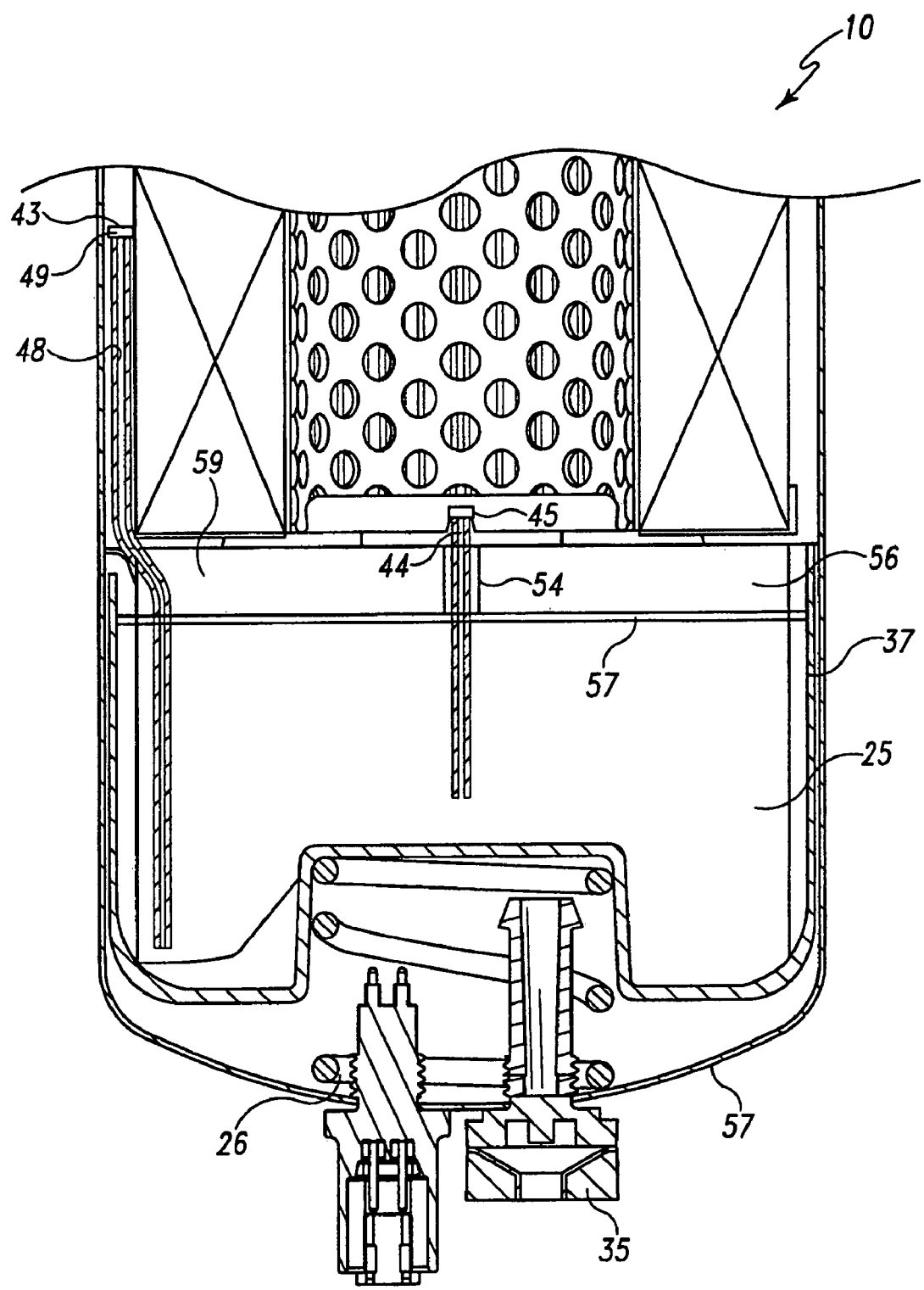

Referring additionally to FIG. 3, which is a partial view in full section of the lower portion of filter assembly 10, container 24 is positioned inside interior chamber 14. A liquid additive 25 can be deposited in the interior chamber 14. In the illustrated embodiment, container 24 is disposed between the closed end 27 of outer casing 12 and the lower endcap 32 of filter element 22. Biasing element 26, which is illustrated as a circular spring, biases container 24 against the lower endcaps 32 of filter element 22, and, consequently, forces endcap 3 of filter element 22 against nut plate 16 or a seal disposed therebetween.

Container 24 includes an exterior wall 34. In the illustrated embodiment, exterior wall 34 includes a plurality of spacers 37 each configured as a small, axially-oriented rib. The spacers 37 provide a gap between the exterior wall 34 of container 24 and the interior wall of casing 12 so that separated water can fall down between the wall 34 where a drain valve 35 can be used to remove the accumulated water. Exterior wall 34 defines an interior region 40. In this embodiment, container 24 defines a cylindrical reservoir or depot concentric about axis 23. Container 24 can be provided as a two-piece (or more) structure(s), which pieces are interconnected via a connection. The connection can be a threaded connection sealed with adhesive, snap-fit, ultrasonic welded, or spin-welded, as desired. In a preferred embodiment, container 24 will be provided as a two-piece structure with a spin-weld connection joining the two structures.

Entrance port 42 provides an opening through exterior wall 34. Similarly, exit port 44 also provides an opening through wall 34. Both entrance port 42 and exit port 44 provide a pathway for liquid in interior chamber 14 to enter and exit, respectively, interior region 40 of container 24. Preferably both entrance port 42 and exit port 44 are located in a top wall portion 41 of container 24.

In a preferred embodiment, entrance port 42 is provided as a small diameter tube or capillary tube 48. In a particularly preferred embodiment, capillary tube 48 has a desired length to extend into interior chamber 14 and adjacent to filter element 22. In this embodiment, capillary tube 48 provides a fluid conduit for liquid in entering region 28 to flow into interior region 40. Preferably the length and/or diameter of capillary tube 48 is selected to take advantage of the fluid pressure generated by the liquid flowing through filter assembly 10 and to induce a portion of the liquid to enter interior region 40 at a desired flowrate.

In one embodiment, capillary tube 48 extends from container 24 towards inlet 18 between casing 12 and filter element 22. In one preferred embodiment, capillary tube 48 extends the length of filter element 22. In other embodiments, the length of capillary tube 48 that extends beyond the exterior of container 24 is selected to be less than or equal to about three-fourths of the length of the filter element; or the length of capillary tube 48 is selected to be less than or equal to about one-half of the length of the filter element; still yet in another embodiment the length of capillary tube 48 is selected to be less than or equal to about one-fourth of the length of the filter element. The capillary tube end 49 can be provided in a variety of configurations including a round, oval, flattened configuration, or it can be configured to conform to the space between the exterior of the filter element and the interior of the housing.

Opposite end of capillary tube 48 can also extend into interior region 40. In the illustrated embodiment, capillary tube 48 extends adjacent to the lower wall portion or bottom of container 24. Tube 48 can extend a desired distance inside container 24 from the top wall portion 41 to the bottom wall portion 51. In one embodiment, this distance is greater than about one half the distance between wall portions 41 and 51, in other embodiments this distance is greater than about three fourths that distance. This prevents the incoming liquid from flowing directly across the top of container 24 toward exit port 44. It is preferable that the incoming liquid mix sufficiently with the additive contained within container 24. One method of promoting adequate mixing of the liquid and additive is to increase the period of time that the liquid remains in container 24 and/or increase the distance that the incoming liquid must flow in the interior region before exiting out exit port 44. It will be understood that in alternative embodiments capillary tube 48 need not extend to the bottom of container 24.

In the preferred embodiment, the difference in liquid density and the additive density can be utilized to achieve a more uniform release rate over time. (See below, FIG. 14.) Generally, the liquid additive is denser than the liquid flowing through the filter assembly (regardless whether the liquid is organic or aqueous based). Consequently, the filtered liquid tends to "float" on the additive phase. Truncating the inlet tube near the top of the additive vessel, and extending the outlet capillary near the bottom of the vessel takes advantage of this property. During operation, the liquid enters the inlet vessel, floats, and remains (largely, with exception of the slow diffusion between phases) at the top of the vessel or layered on the liquid additive. As more of the liquid enters through the inlet vessel, the entering liquid displaces pure additive and pushing it out the outlet tube in nearly full-concentration yielding a very steady injection of active ingredient into the system.

Exit port 44 is provided in an upper wall portion of exterior wall 34 and is spaced apart from entrance port 42. Furthermore, in the illustrated embodiment, exit port 44 is centrally positioned in exterior wall 34 to extend centrally into interior region 40. However, it will be understood that exit port 44 can be positioned as desired in exterior wall 34 to extend into and/or through any portion of container 24. As illustrated in FIG. 1, exit port 44 can be defined by a capillary tube 54 extending into interior region 40. Capillary tube 54 provides a conduit between interior region 40 and interior chamber 14.

In one embodiment, capillary tube 54 provides fluid communication between the liquid and an additive initially located in interior region 40 and entering region 28. From entering region 28, liquid can then flow through filter element 22 and into exiting region 30. From there, the liquid can then flow through outlet 20 and back into the system—either a recirculating fuel, coolant, oil, or lubricant system or a single-pass fuel system.

In an alternative embodiment (see FIG. 14), capillary tube 54 provides an exit for the liquid and additive in interior region 40 to flow to exiting region 30. In this embodiment, capillary tube 54 provides direct fluid communication for a liquid and/or an additive mixture in interior region 40 and exiting region 30 and, ultimately, to outlet 20. Consequently, in this embodiment, the liquid and additive in interior region 40 can bypass filter element 22. This embodiment would offer a high gradient pressure, since the restriction of the filter element is now added to the dynamic pressure gradient (Pdyn). This embodiment can provide particular advantages, for example, for injecting a very viscous additive into the system. If desired, a small filter medium, such as a sintered porous plug, wire-mesh screen, or the like, can be included on the outlet tube to prevent any large particles that have bypassed the filter from causing damage to downstream components. The filter medium can be located on either end of the outlet tube.

Optionally, entrance port 42 and/or exit port 44 can be sealed with a soluble seal 43 and 45, respectively. This allows filter assembly 10 to be storage stable, and in particular, this can inhibit loss of activity and/or volume of the additive in container 24. In use, a liquid flowing through filter assembly 10 dissolves the seal material, allowing the liquid to enter into interior region 40 and mix with the additive therein. Alternatively, the soluble seal can be composed of a low melting material that melts when exposed to the normal operating temperatures of the fuel flowing through the filter.

In one embodiment when the liquid is an organic base fluid such as fuel, oil or a lubricant, the soluble seal is composed of a material such as a wax that is soluble in organic solvents.

Optionally, a separate, second container illustrated as pre-charge reservoir 56 can be included in filter assembly 10. In the illustrated embodiment, pre-charge reservoir 56 is positioned in or on container 24. Pre-charge reservoir 56 is separated from the interior region 40 (and the liquid additive 25 therein) by partition 57 which can be the upper wall portion of container 24. One end 58 of reservoir 56 can be open or alternatively end 58 can be covered with a mesh or other porous structure. An additive 59 can be deposited into pre-charge reservoir 56 and made available for immediate release into the liquid flowing through filter assembly 10. Additive 59 can be the same or different from additive 25. In a preferred embodiment, the additive 59 in the pre-charge reservoir is a solid or semi-solid material that dispenses or disperses into the liquid flowing through the filter assembly.

The liquid additive 25 can be selected from any known and commercially useful composition that can provide beneficial properties to the particular liquid being filtered. The additive can be a liquid at ambient temperature or a solid component that has been dissolved in a suitable solvent. Examples of suitable fuel additives for use in the parent applications but are not restricted to lubricity aids, ignition promoters, and the like. Specific examples of lubricity aids include: alcohols, monohydroxy alkanols such as saturated aliphatic monohydric alcohols having from 1 to 5 carbon atoms, methanol, ethanol, propanol, n-butanol, isobutanol, amyl alcohol and isoamyl alcohol; monocarboxylic acids either saturated or unsaturated fatty acids, such as, caprylic acid, pelargonic acid, capric acid, undecylic acid, lauric acid, tridecoic acid, myristic acid, stearic acid, linoleic acid hypogeic acid, oleic acid, elaidic acid, erucic acid, brassidic acid; organo nitrates, such as, methyl nitrate ethyl nitrate, n-propyl nitrate, isopropyl nitrate, allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, 2-ethylhexyl nitrate, n-heptyl nitrate, sec-heptyl nitrate, n-octyl nitrate, sec-octyl nitrate, n-nonyl nitrate, n-decyl nitrate, cyclopentylnitrate, cyclohexylnitrate, methylcyclohexyl nitrate, isopropylcyclohexyl nitrate and the like. Examples of these fuel additives can be found in U.S. Pat. Nos. 4,248,182, 5,484,462, 5,490,864, and 6,051,039, each of which is incorporated herein by reference in its entirety. Furthermore, it should be understood that the term "fuel" as used herein includes diesel, biodiesel, gasoline, kerosene, alcohol, or other petroleum distillates. Consequently, the additive can be selected to provide a benefit to any of these different fuel compositions.

Additionally, the filter assemblies as described herein can be used with fuel delivery systems for combustion engines, including both diesel and gasoline engines, and/or for any other fuel storage and delivery device or system which may or may not be directly connected to a combustion engine.

The additives for coolants, lubricants, hydraulic fluids, and oil can also be included in either the interior region 40 and/or the pre-charge reservoir 56.

Examples of aqueous coolant additives that can be used in the parent applications include one of more of the following without limitation: anticorrosion additives such as neutralized dicarboxylic acids, mercaptobenzothiazole, benzotriazole, tolyltriazole, and salts of molybdate, nitrite, nitrate, and silicate (preferably with ammonium, tetraalkyl ammonium, or alkali metal as the counter ion); and buffering agents which can be selected from any known or commonly used buffering agents, such as, borate salts and phosphate salts; as well as a variety of other additives, including defoamers, scale inhibitors, surfactants, detergents, and dyes. Examples of defoamers include components (alone or in combination) such as silicon defoamers, alcohols such as polyethoxylated glycol, polypropoxylated glycol or acetylenic glycols. Examples of scale inhibitors include components, either alone or in combination, such as, for example, phosphate esters, phosphino carboxylate, polyacrylates, polymethacylate, styrene-maleic anhydride, sulfonates, maleic anhydride co-polymer, acrylate-sulfonate co-polymer and the like. Surfactants for use in this parent applications include, for example, either alone or in combination alkyl sulfonates, acryl sulfonates, phosphate esters, sulfosuccinate, acetylenic glycol, and ethoxylated alcohols. Detergents include non-ionic and/or anionic components such as, for example, phosphate ester surfactants, sodium alkyl sulfonates, sodium aryl sulfonates, sodium alkyl aryl sulfonates, linear alkyl benzene sulfonates, alkylphenols, ethoxylated alcohols, carboxylic esters, and the like. Examples of the coolant additives are discussed in U.S. Pat. No. 4,717,495, published US Patent Application 20030042208, and pending U.S. patent application Ser. Nos. 09/611,332 and 09/611,413 both filed on Jul. 6, 2000, all of which are hereby incorporated by reference.

Additives for lubricants and oils are discussed in WO 03/018163, which is incorporated by reference herein. Examples include, but are not limited to, one or more viscosity index improvers, antioxidants (also known as oxidation inhibitors), antiwear agents; and detergents. Specific examples include: detergents, such as, sodium, barium, calcium or magnesium salts of salicylate esters, sulfonates, phosphonates, phenates, thiophosphonates; alkoxides, or carboxylates; dispersants, such as, long-chain and/or high molecular-weight ashless organic molecules, such as N substituted alkenyl succinimides, esters and polyesters, amine and polyamine salts of organic acids, Mannich bases derived from alkylated phenols, copolymers of methacrylates or acrylates, ethylene, propylene copolymers containing polar groups or vinyl acetate fumaric acid ester copolymers; antioxidants, such as, zinc dialkyl or diaryl dithiophosphates, phenolic compounds, organic phosphites, metal dithiocarbamates, sulfurized olefins, hindered or aromatic amines, organic selenides, phosphorized or sulfurized terpenes; corrosion inhibitors, such as, zinc dithiophosphates, organic phosphates, metal dithiocarbamates, phosphorized or sulfurized terpenes, sulfurized olefins, aromatic nitrogen compounds, sulfonates, alkenyl succinic acids, propoxylated or ethoxylated alkyl phenols, substituted imidazoles, barium, calcium or magnesium salts of oxides or carbonates; antiwear additives, such as, zinc, calcium, magnesium, nickel, cadmium or tetralkyl ammonium salts of dithiophosphoric, various molybdenum sulfur compounds, organic phosphites, sulfurized olefins, various triazoles, fatty acid derivatives, dicarbamate derivatives, and alkaline compounds as acid neutralizers; viscosity index improvers, such as, high molecular-weight polymers, for example olefin copolymers, ethylene-propylene copolymers, and polyisobutylenes, various styrene copolymers, for example, styrene and butadiene or isoprene; pour point depressants, such as, alkylated naphthalene, polymethacrylates, crosslinked alkylated phenols, vinyl acetate, fumaric acid ester copolymers, alkyl fumarate, vinyl ester copolymers, styrene-ester copolymers, derivatized alkyl methacrylate/acrylate copolymers, olefin copolymers, alkylated polystyrene; anitfoamants, such as, silicones, polyethers; emulsifiers, such as, metal salts of carboxylic acids to name a few examples.

In use, the liquid to be filtered flows in through one or more of inlets 18 in nut plate 16, and from there into interior chamber 14. In the illustrated embodiment, a liquid flows into entering region 28 in the direction indicated by inflow arrows 60. It has been observed that the liquid flowing through a filter such as filter assembly 10 illustrated in FIGS. 1 through 3 exhibits a dynamic fluid pressure gradient within the interior chamber.

Figure 4:
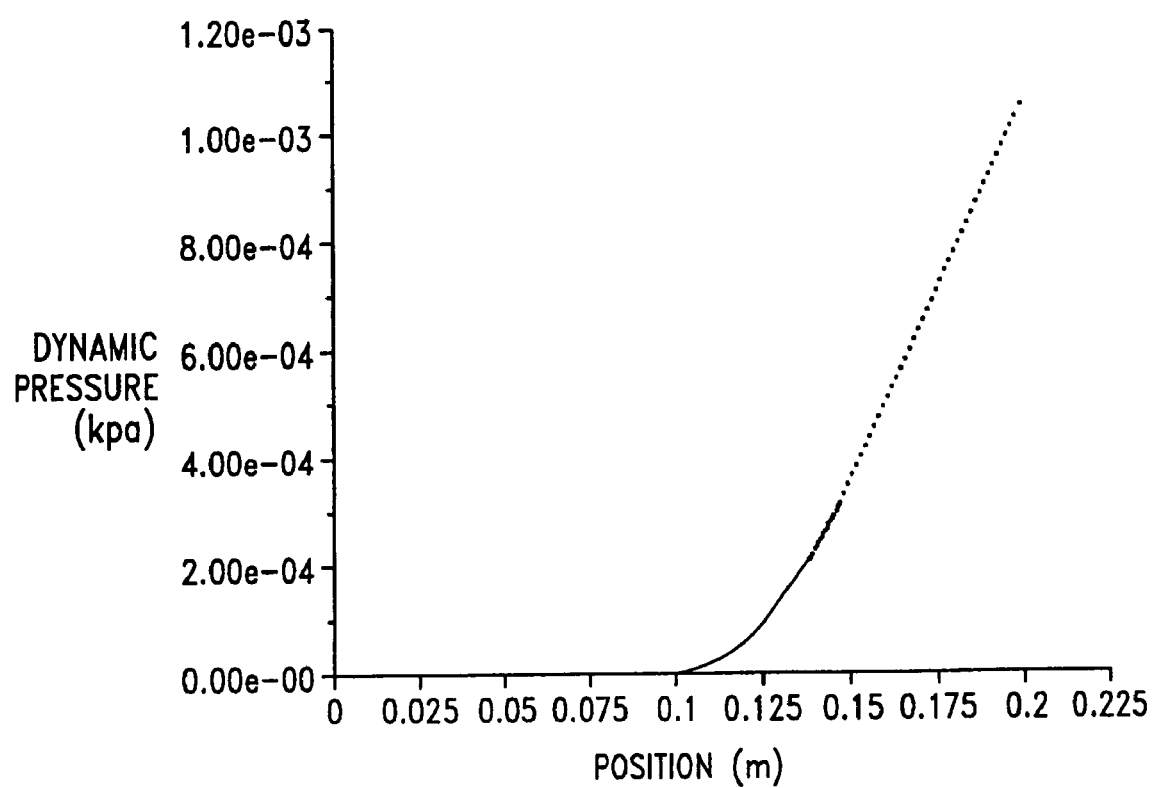

FIG. 4 is a graph illustrating the dynamic fluid pressure predicted by a computational fluid dynamics (CFD) model at varying axial positions within a filter [all points taken at radial position midway in gap between filter shell ID (12) filter element pleat OD (22)]. The graph indicates that the fluid dynamic pressure is greatest near the top of the filter element endcap 31 where the axial velocity is highest. The dynamic pressure below the top endcap begins to diminish since the axial velocity decreases as fluid is carried inward through the filter. The y-axis on the graph is the CFD-predicted dynamic fluid pressure, in Kpa. The x-axis corresponds to the axial position in the filter measured with respect to the filter element at which the dynamic fluid pressure was reported via CFD. In the graph illustrated in FIG. 4, the bottom endcap of the filter element is at 0.1 m and the top is at ~0.225 m. The absolute value of the dynamic fluid pressure within the filter can vary depending upon a variety of factors that affect flow velocity in the gap between filter and housing, including: the overall length of the filter housing and/or filter element, the size of gap (annulus area) between the filter element and housing shell, the overall length of the filter housing and/or filter element, the configuration of the filter element (number of pleats, outer diameter of pleats, inner diameter of pleats, media thickness), the flowrate or volume of flowing through the filter casing and/or filter element, and the density of the flowing liquid. The dynamic pressure, Pdyn, can be calculated according to Equation 1:

$$P_{dyn} = 1/2 \times density \times velocity^2 \qquad (1)$$

where density is the liquid density and velocity is the velocity of the liquid flowing through the filter.

The parent applications take advantage of this observation by positioning entrance port 42 where Pdyn is at a relatively high pressure and locating exit port 44 in an area within the interior chamber that exhibits lower fluid pressure. Since the entrance port is aligned perpendicular with the direction of flow-(like a pitot tube), a stagnation zone forms in front of the tube causing the dynamic pressure to be converted to a static pressure which is harnessed to drive flow slowly into the tube and through the vessel.

In the illustrated embodiment, entrance port 42 is defined by the open terminal end of capillary tube 48. Capillary tube 48 extends from interior region 40 through wall 34 and up between filter element 22 and the interior wall of outer casing 12. Placing the entrance port 42 at the terminus of capillary tube 48 in an area of relatively high fluid pressure induces the liquid flowing through the liquid filter to enter interior region 40. In interior region 40, the liquid can mix with the liquid additive. Thereafter, the liquid and additive mixture can exit through exit port 44.

In one embodiment, exit port 44, as noted above, allows the liquid and additive mixture to re-enter the entering region 28 albeit in an area where the dynamic fluid pressure is less than the pressure in the area adjacent entrance 42 to capillary tube 48. In this embodiment, the liquid and additive mixture from the interior region 40 flows through the filter element 22 before exiting the filter assembly through outlet 20.

In an alternative embodiment, exit port 44 provides direct fluid communication between interior region 40 and exiting region 30. This allows the liquid and additive mixture from the interior region 40 to exit into exiting region 30 and from there be mixed with the bulk liquid in exiting region 30 into the fuel conduit (not shown) without passing through filter element 22. In this embodiment, as noted above, a separate filter element can be included with exit port 44, if desired.

Providing entrance port 42 in an area of relatively high fluid pressure and positioning exit port 44 in an area of lower fluid pressure provides substantial benefits for adding additives to flowing liquid. The release rate of a liquid additive in container 24 can be tailored as described. In one preferred embodiment, the desired release rate remains relatively constant over a long time period. This effect can be modified by varying the initial viscosity of the liquid additive in container 24. For example, if the initial viscosity of the liquid additive is substantially higher than that of the liquid flowing through filter assembly 10, then as the liquid begins to mix with and dilute the additive in the interior of container 24, the initial viscosity of the liquid and additive mixture slowly begins to decrease. The high viscosity inhibits rapid initial release of additive from container 24 due to the controlling restriction provided by the outlet capillary tube. The inlet capillary tube may also have a restriction, but since the liquid viscosity is much lower than that of the additive and the inlet tube is filled only with the liquid, the outlet capillary restriction largely controls/sets the flowrate that results from the fixed gradient pressure. However, over time, the relative amount of liquid in the liquid and additive mixture in container 24 increases. As the relative amount of the liquid component in the liquid and additive mixture increases, the viscosity of the resulting liquid and additive mixture decreases. The resulting decrease in viscosity causes the outlet capillary tube restriction to decrease which leads to corresponding increase in flowrate (of diluted fuel/additive mix), hence giving a more stable release of actual active ingredient (additive). At a given pressure gradient, the flowrate through the additive vessel having two capillary tubes in series (an inlet and an outlet) with differing viscosity in each tube (and neglecting any contribution of viscous drag offered by the vessel) can be modeled according to the following Equation 2:

$$Q = \frac{P \pi D_2^4 D_1^4}{128 (\mu_2 L_2 D_2^4 + \mu_1 L_1 D_1^4)} \quad (2)$$

where Q=flowrate, P=gradient pressure, $D_1$=inlet tube diameter, $D_2$=outlet tube diameter, $\mu_2$=additive viscosity, $L_2$=outlet tube length, $L_1$=inlet tube length, and $\mu_1$=liquid viscosity. According to Equation 2, the desired flowrate can be easily adjusted by varying the tube geometries—especially the tube diameters, $D_1$ and $D_2$, since flow varies inversely with the tube diameters to the fourth power. In use, the additive viscosity $\mu_2$ will slowly decrease and the flowrate will increase. This effect will be more pronounced if the outlet tube provides the largest restriction to flow, for example, if $D_1$ were small. It has been determined that it is typical to achieve a ~three-fold increase in flow over the life of the filter/additive vessel when working with a ten-fold additive/fuel viscosity ratio. This three-fold increase in flow helps to counteract the decreasing active ingredient release rate due to the exponentially decaying concentration of active ingredient in the vessel.

Figure 5:
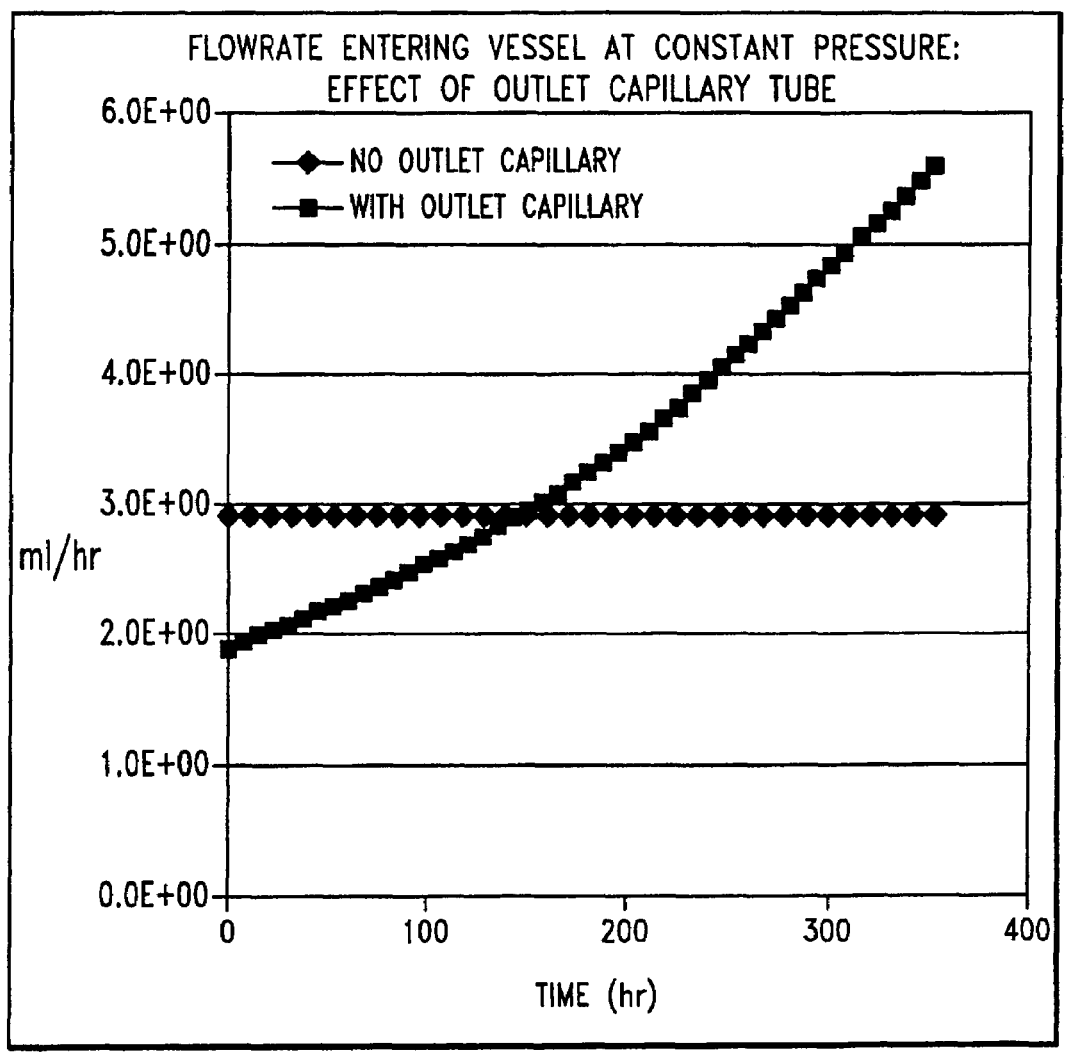
Figure 6:
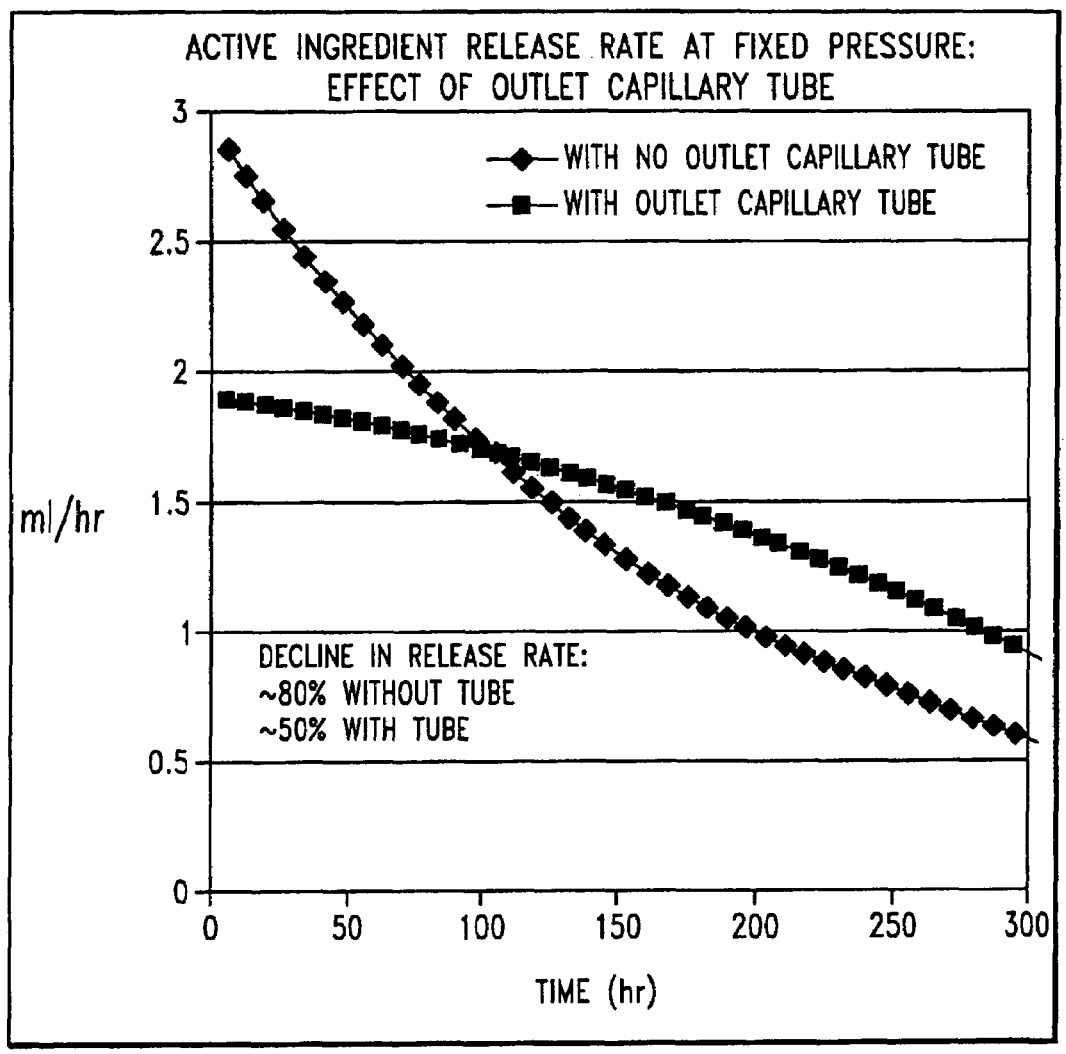

FIGS. 5 and 6 are graphs which illustrate this effect for two cases where all other factors are equal, including additive vessel volume and total additive released in a 300-hour period. Only the inlet tube diameter is adjusted to achieve the correct total additive release. The first graph in FIG. 5 shows how the flowrate is constant for the case of a vessel that lacks an outlet capillary (since inlet pressure is constant and viscosity in the inlet tube is constant). When a capillary tube is added to outlet of the container, the initial flowrate is reduced—but the final flowrate has increased almost three-fold due to declining viscosity.

The graph illustrated in FIG. 6 shows the "active ingredient" or additive injection rate for these same two cases. When the container does not include a capillary tube outlet, an exponential decay (about 80% decrease in this case) in the release rate of the additive is anticipated. When the container contains a capillary tube outlet, the injection rate curve is significantly flattened (~50% decrease in the release rate of the additive) due to the rising flowrate offsetting the decreasing additive concentration of the diluted vessel mixture. For both cases, the total amount of additive released in the 300-hour time period is about equal. However, the case where the container includes a capillary outlet tube provides a more constant release rate over time. This can translate into better protection for the fuel system.

In addition, the rate that liquid enters into container 24 can be varied. Increasing the pressure differential between entrance port 42 of exit port 44 will induce a more rapid in-flow and escape of the liquid and additive mixture from the interior region 40 of container 24. Extending end 49 of capillary tube 48 closer to inlet 18 can increase the dynamic pressure. Similarly, terminating end 55 of capillary tube 54 in an area at lower pressure such as the area proximate to exiting region 30 can decrease the dynamic fluid pressure at exit port 44.

In another embodiment, varying the configuration and/or size of capillary tube 48 and/or capillary tube 54 can vary the pressure difference between the fluid entering and exiting container 24. For example, the diameter of one or both of capillary tubes 48 and 54 can be varied.

Conversely, placing entrance port 42 and exit port 44 such that the relative pressure differential between the two is small provides for a low flow rate through container 24.

Figure 7:
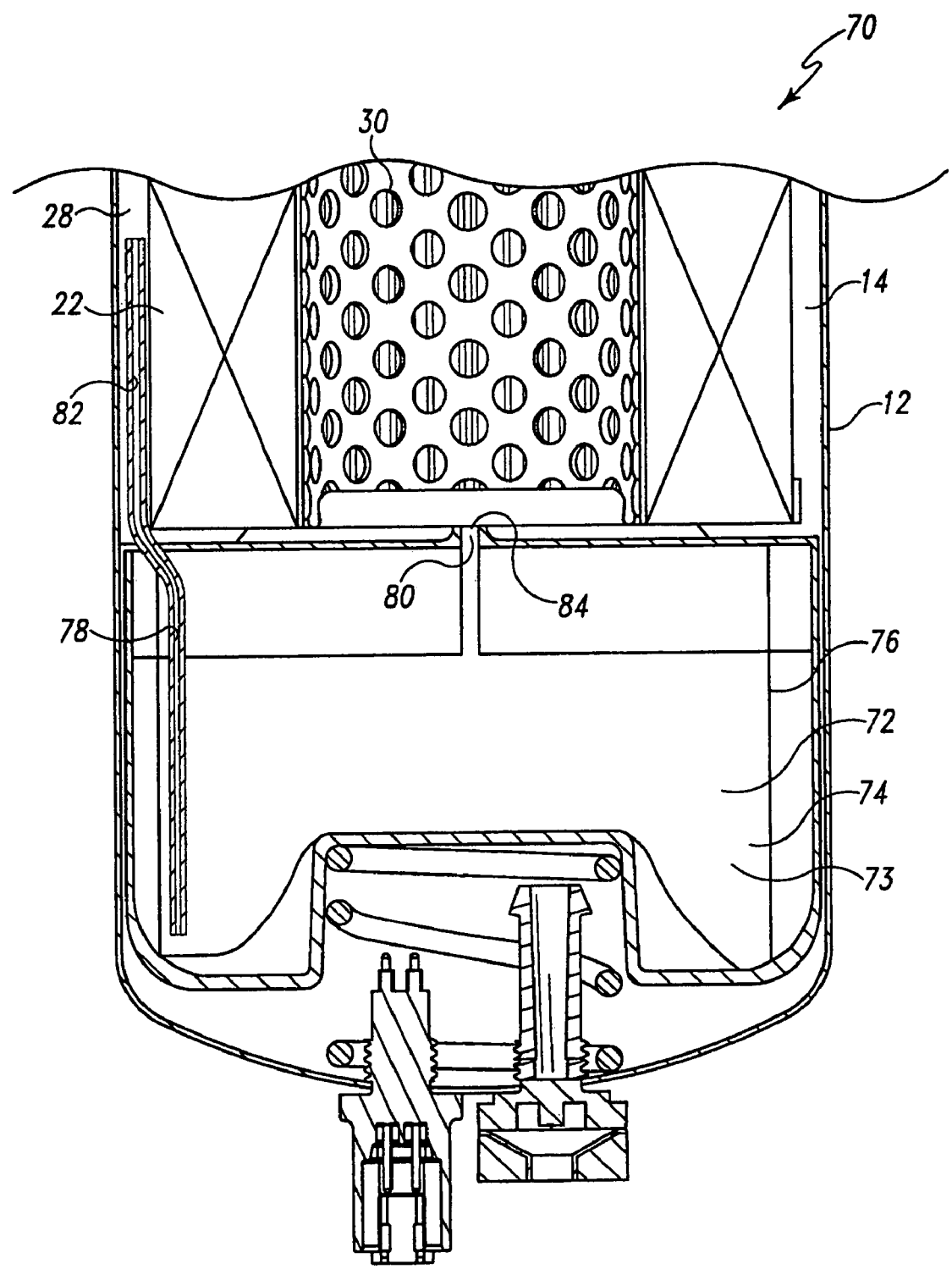

FIG. 7 is a partial view in full section of an alternative embodiment of filter assembly 70 in accordance with the parent applications. Filter assembly 70 is formed similarly to filter assembly 10. Consequently, like reference numbers will be used to denote like components.

Filter assembly 70 includes an outer casing 12 defining an interior chamber 14. A filter element 22 and container 72 are provided in the interior chamber. Container 72 provides a reservoir for a liquid fuel additive 74. Container 72 includes an exterior wall 76, an entrance port 78, and an exit port 80. In the illustrated embodiment, entrance port 78 is provided substantially as has been described for entrance port 42 and can include capillary tube 82. Opening 84 defines exit port 80. Opening 84 can be provided as a substantially small diameter opening or a capillary-sized opening. Opening 84 provides direct fluid communication between interior chamber 14 and interior region 73. In one embodiment, opening 84 can open directly into entering region 28 by locating opening 84 in a portion of exterior wall adjacent entering region 28, such as a position diametrically opposite that of capillary tube 82. Alternatively, opening 84 can open directly into exiting region 30 by locating opening 84 adjacent the exiting region.

Figure 8:
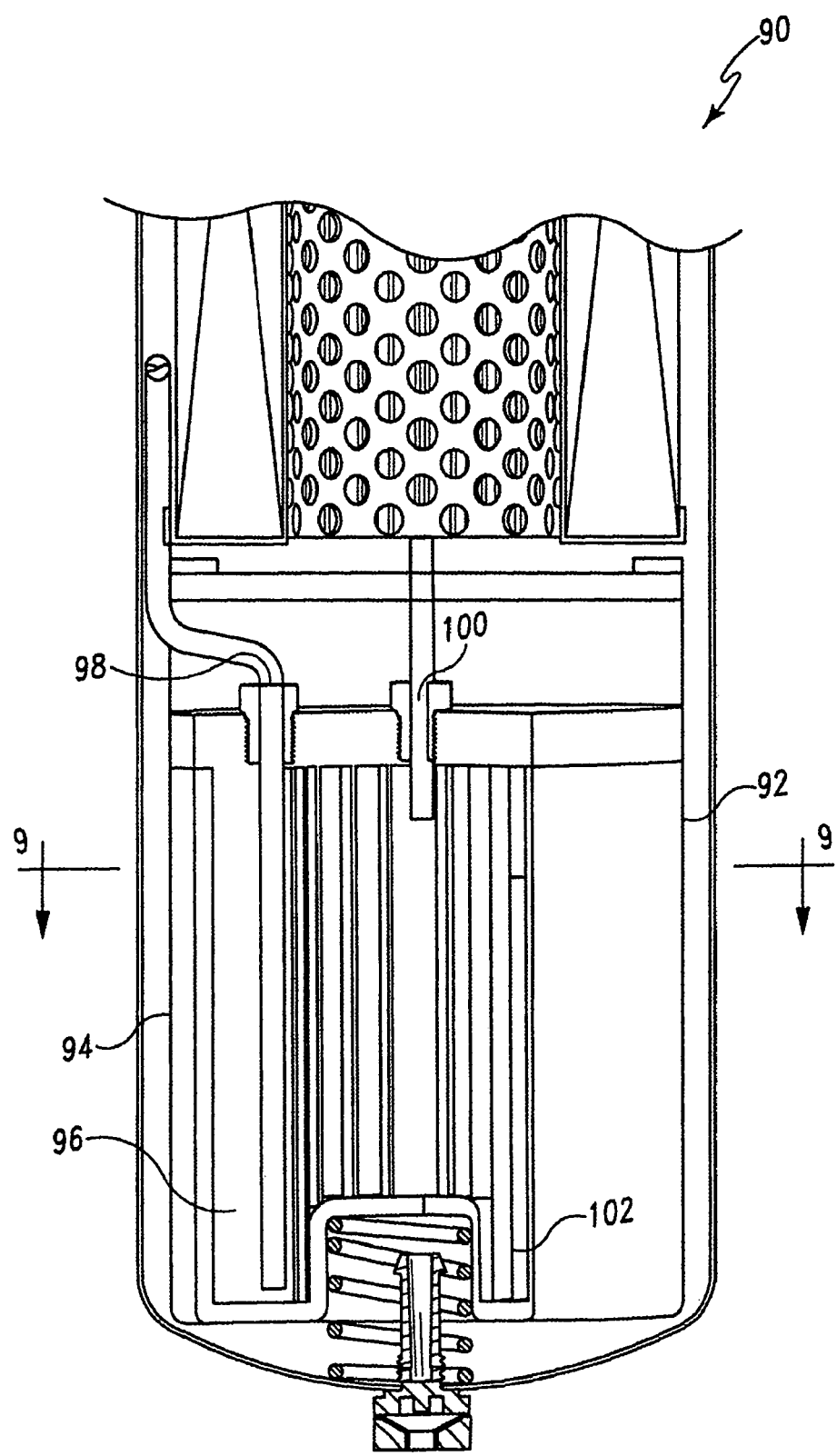

FIG. 8 is a partial view with sections broken away of yet another embodiment of filter assembly 90 in accordance with the parent applications. Filter assembly 90 is provided similarly as filter assembly 70 and filter assembly 10. Consequently, like reference numbers will be used to denote like components. Filter assembly 90 includes container 92 positioned in interior chamber 14. Container 92 includes exterior wall 94 defining interior region 96. Entrance port 98 and exit port 100 extend through exterior wall 94. Entrance port 98 can be provided substantially as described above for entrance port 42 including capillary tube 48 and/or entrance port 78 (and capillary tube 82), and exit port 100 can be provided substantially as has been described for exit port 44 including capillary tube 54 and/or exit port 80.

Container 92 also includes one or more interior partitions 102 defining a fluid pathway or channel 104 coursing through the interior region 96.

Figure 9:
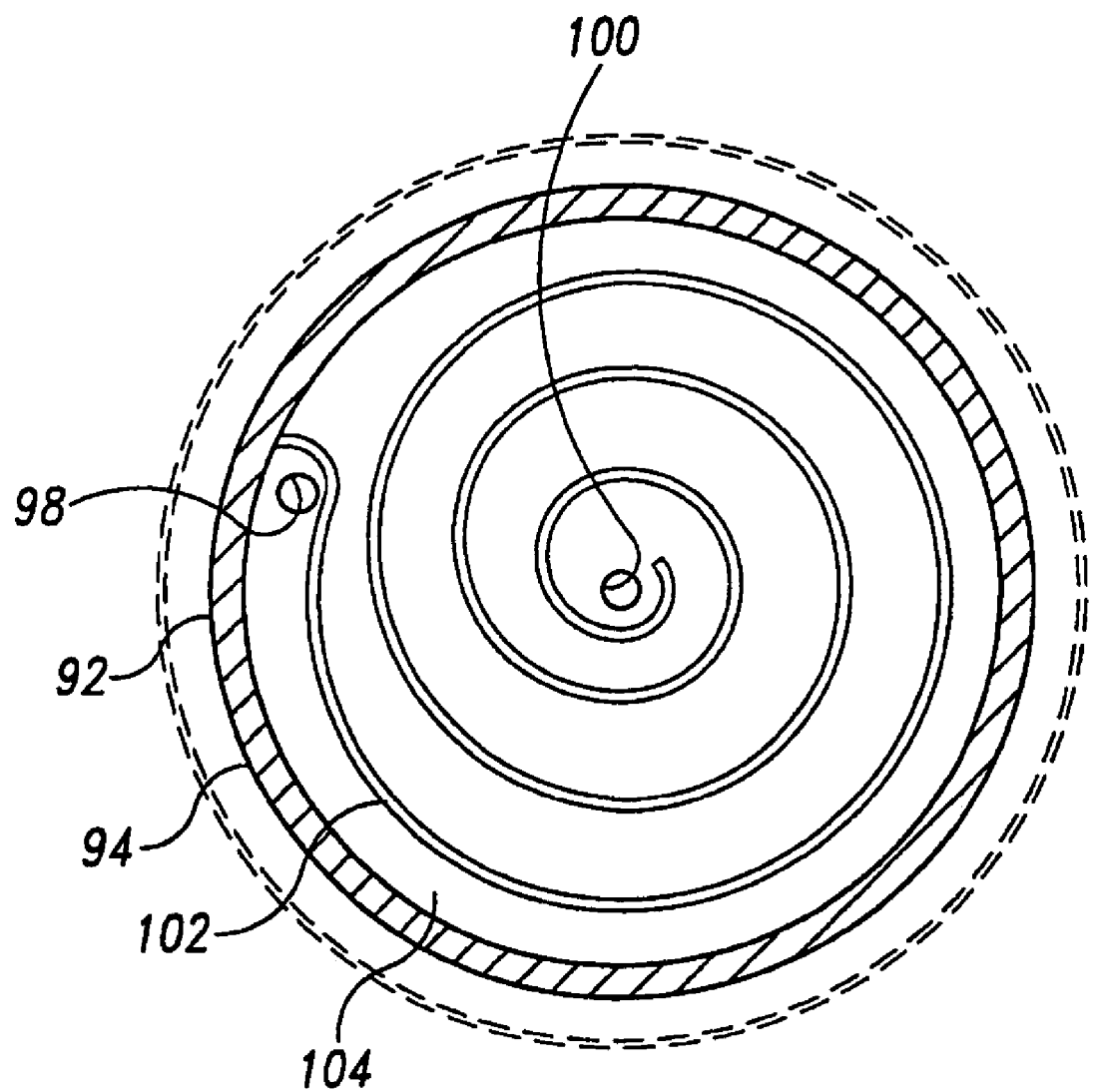

FIG. 9 is a sectional view of the container illustrated in FIG. 5 taken along section line 9-9. It can be seen in the illustration that container 92 contains a partition 102 provided substantially as a spiral wall 106 that defines a curving pathway 108 coursing through interior region 96. In a preferred embodiment, partition 102 is provided as a solid portion or wall portion extending the full depth of container 92, i.e., from the upper surface 110 to the lower surface 112. In other embodiments, partition 102 need not extend the full depth of container 92 but may be attached to either upper surface 110 or lower surface 112 or even as an unattached insert within the interior of container 92. In still other embodiments, partition 102 need not be a solid wall or an imperforate structure but can include openings therethrough.

In the illustrated embodiment, the liquid enters through port 98 and mixes with the liquid additive that is contained within container 92. Consequently, the liquid and additive mixture must course its way through the channel 104 defined by partition 102 before the mixture can exit through port 100.

Figure 10:
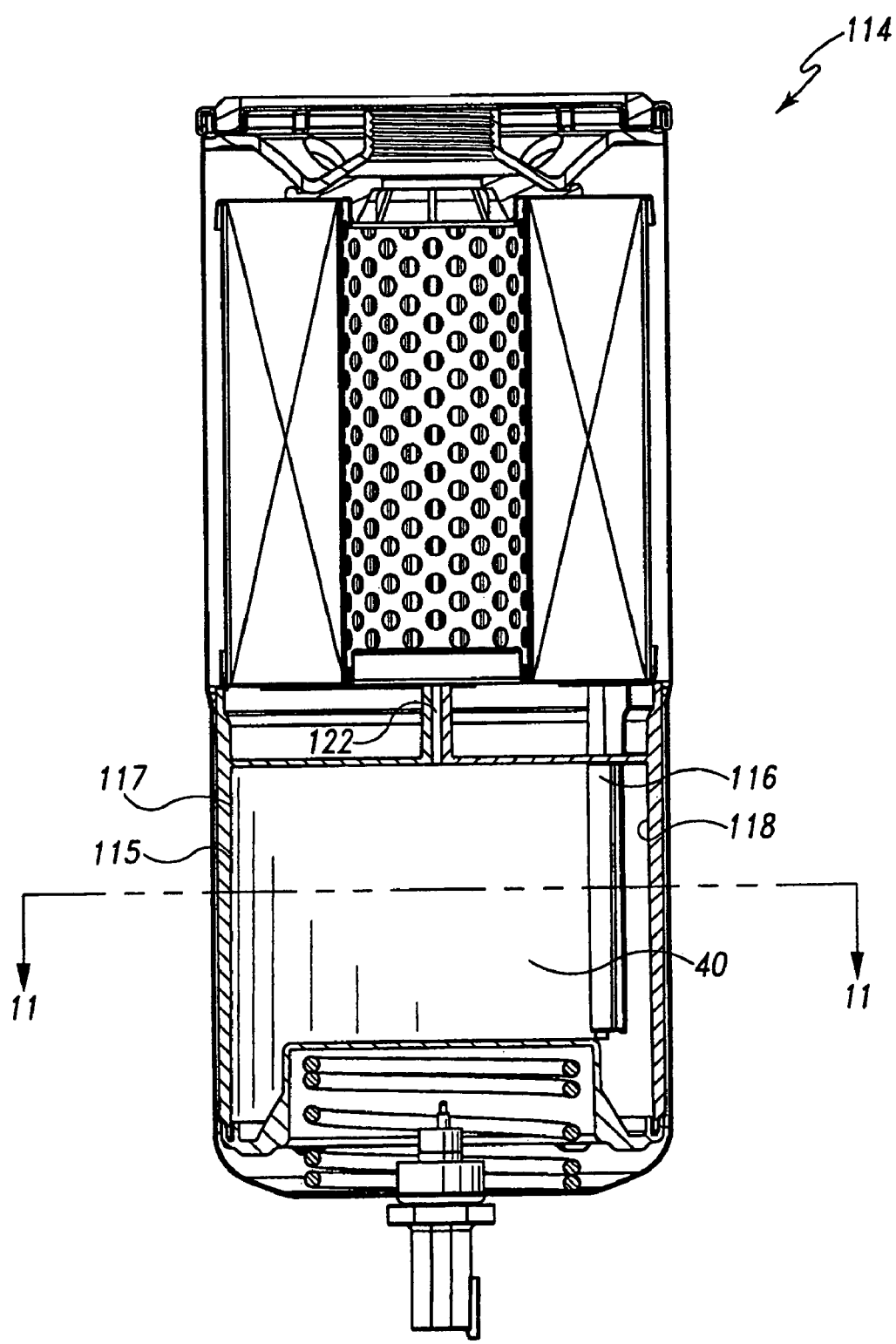

FIG. 10 is a cross-sectional view of another embodiment of a filter assembly 114 in accordance with the parent applications. Filter assembly 114 is configured similar to filter assemblies 90, 70, and 10; consequently, the same reference numbers will be used to refer to the same components. Filter assembly 114 includes a container 115 defining an interior region 40 for an additive.

Container 115 includes a first capillary tube 116 defining an inlet and an outlet 122 that provides an opening directly downstream (or the filtered side) of the filter element. Outlet 122 includes a capillary tube 123 extending upwardly through a second reservoir 127. Consequently, capillary tube 123 can provide a dam to inhibit inadvertent introduction of a secondary additive from the second container 127 into the container 115. In one embodiment, capillary tube 123 is molded directly into the upper wall portion 129 of the first container 115.

Figure 11:
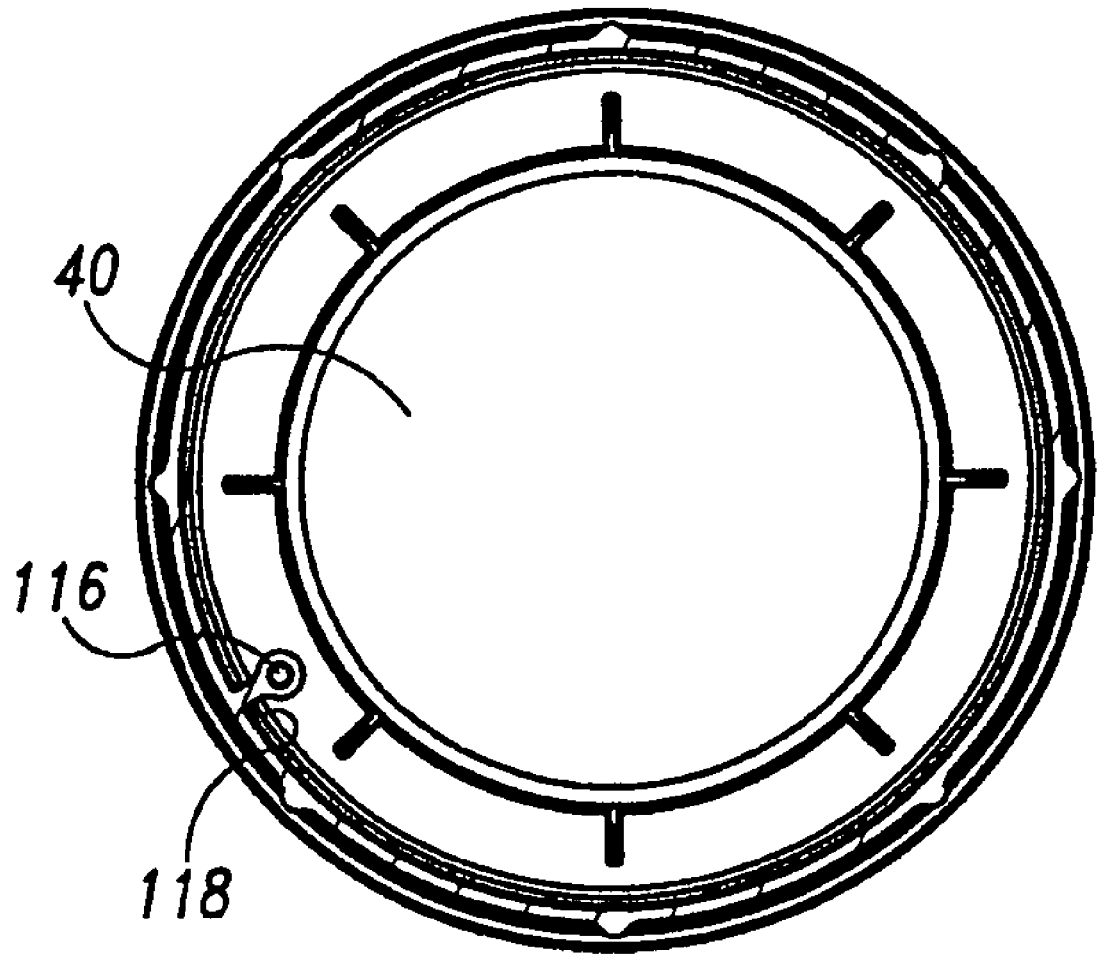

Referring additionally to FIG. 11, it can be seen that the first capillary tube 116 is located proximate to the internal wall portion 118 of container 115. In this embodiment, outlet 122 is centrally located in the upper wall portion 129 of container 115 and therefore radially spaced from first capillary tube 116.

Figure 12:
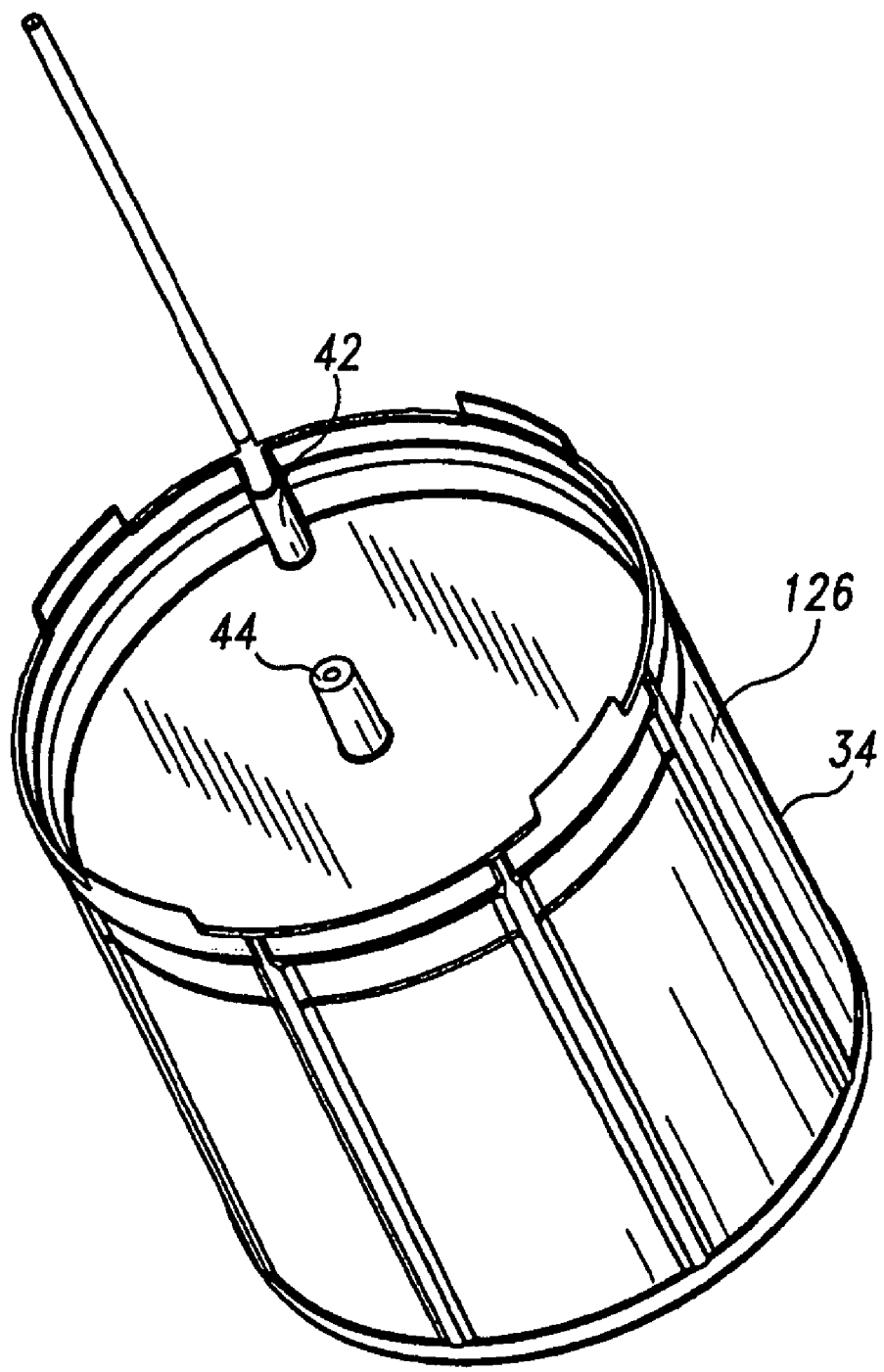
Figure 13:
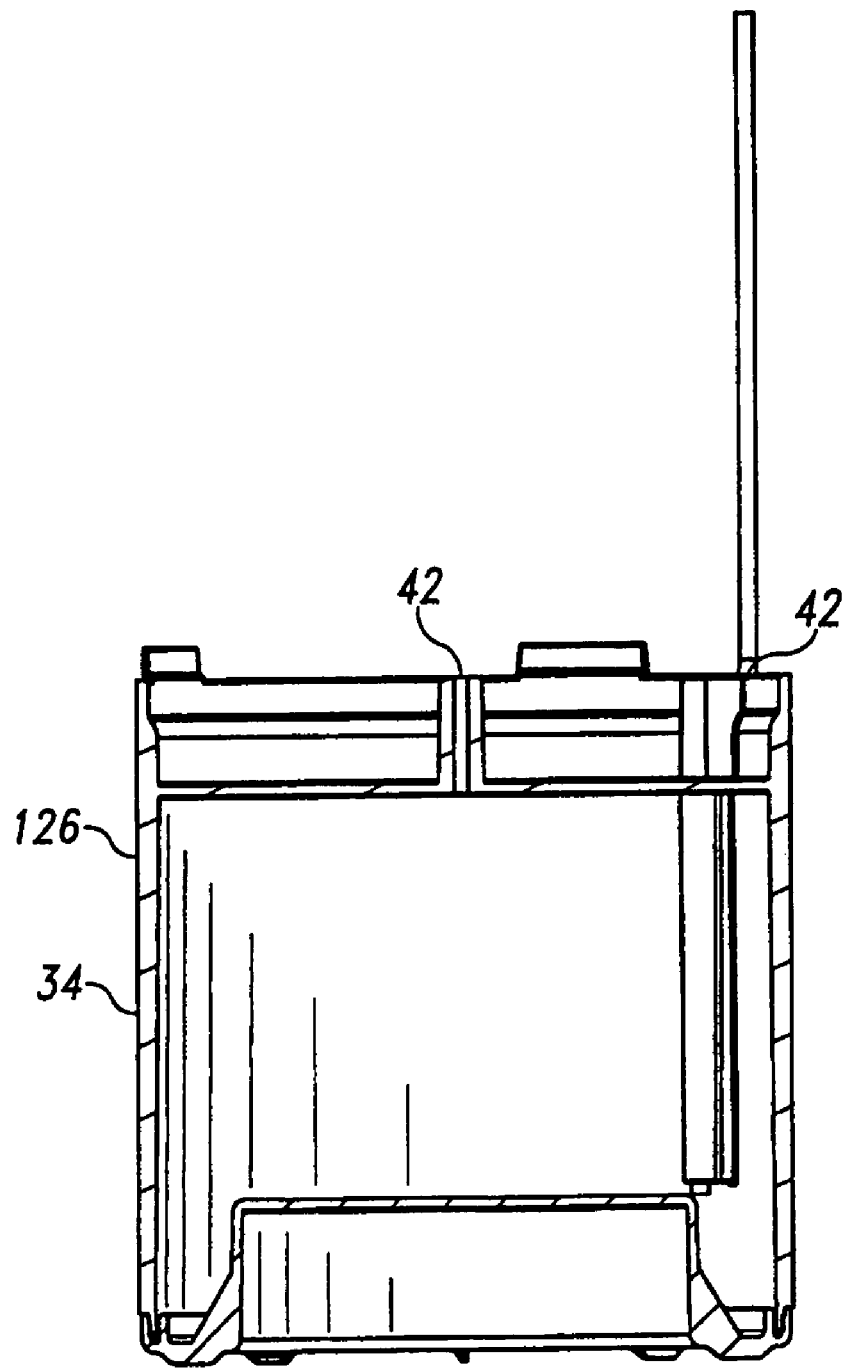

FIGS. 12 and 13 illustrate one embodiment of a replaceable cartridge 126 for use in the parent applications. Replaceable cartridge 126 can be configured substantially as has been described for containers 115, 92, 72, and/or 24. Consequently, the same reference numbers will be used to denote like components. Replaceable cartridge 126 includes an exterior wall 34 having an entrance port 42 and an exit port 44. Replaceable cartridge 126 provides the added advantage in that it can be readily placed in existing filters and/or replaced when the additive contained in the interior chamber has been exhausted. In the illustrated embodiment, cartridge 126 does not include any inserts to direct fluid flow therethrough. However, it will be understood that any of the inserts described above can be included inside container 126 as desired. Such assemblies are intended to be included within the scope of the parent applications.

Figure 14:
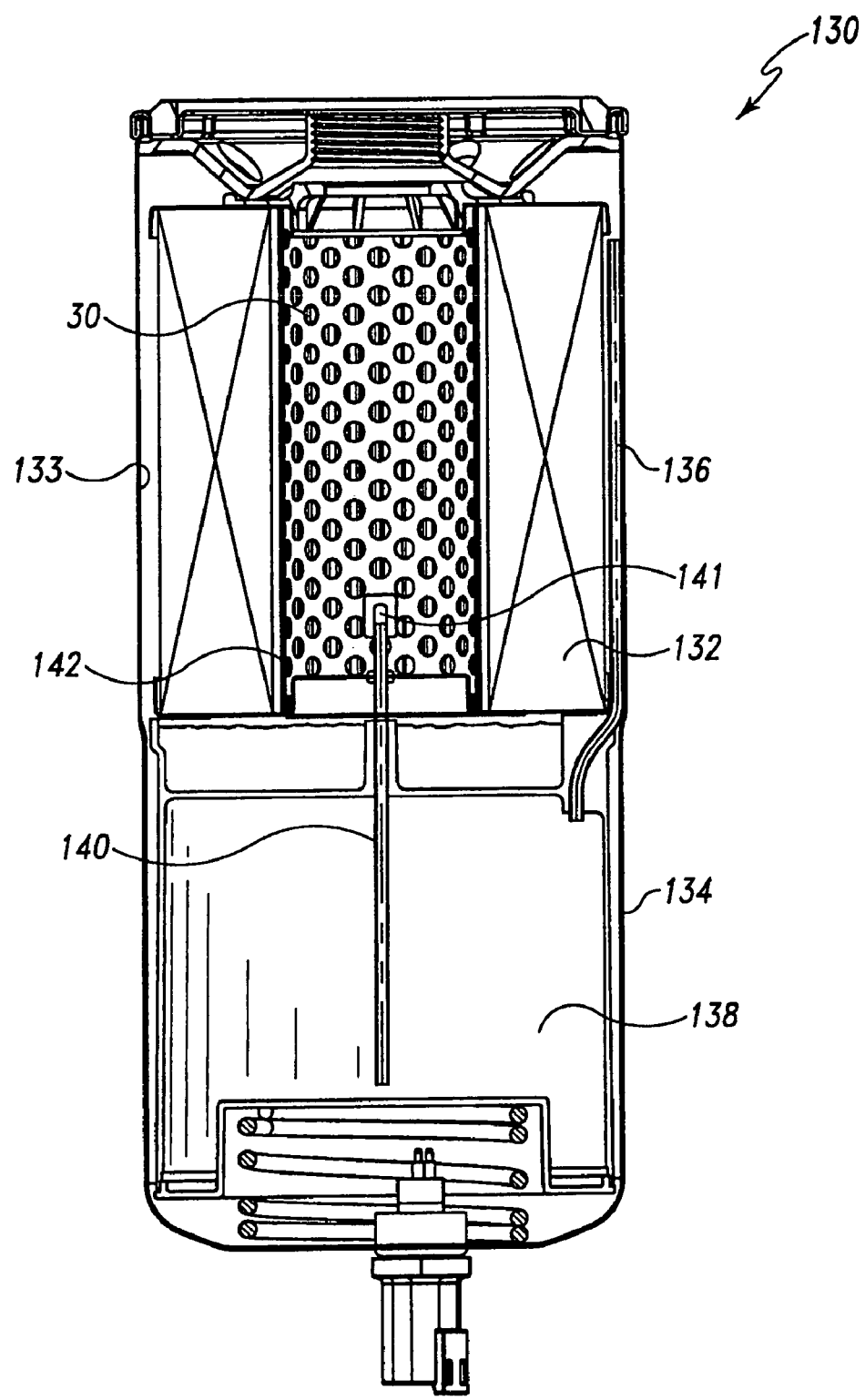

FIG. 14 is a cross-sectional view of yet another embodiment of a filter assembly 130 prepared in accordance with the parent applications. Filter assembly 130 is configured substantially as has been described for filter assemblies 10, 70, and 90. Consequently, the same reference numbers will be used to denote like components. Filter assembly 130 includes container 134 axially spaced from a filter element 132 in interior chamber 133. In this embodiment, it can be observed that container 134 can be configured substantially as described above for any of containers 24, 72, 92, and 126. Container 134 can be a removable cartridge and/or include flow directing channels if desired. Container 134 can be removed from the interior region by separating lower housing 138 from an upper housing or nut plate 140. After lower housing 138 has been separated from upper housing 140, either one or both of filter element 132 and/or container 134 can be replaced and/or refurbished. For example, container 134 can be replaced with a new container or cartridge filled with an additive. Alternatively, existing container 134 be refilled with a fresh charge of an additive.

Capillary tube 136 defines an inlet into the interior region 138 of container 134. It can be observed from the illustration that capillary tube 136 extends substantially the full length of filter element 132. However, capillary tube 136 only extends a short distance through the upper wall portion inside container 134. The terminus of capillary tube 136 can include one or more of a seal (such as a seal soluble in the liquid flowing through the filter), a filter element, or a porous or other mesh covering as discussed above.

Capillary tube 140 defines an outlet port 142 from container 134. Capillary tube 140 extends up into the exiting region 30. Optionally, capillary tube 140 can also include one or more of a seal, such as a soluble seal, a filter element or a porous or other mesh covering 141 over either terminus. The opposite end of capillary tube 140 extends nearly to the lower wall portion or bottom of container 134.

In this embodiment, the liquid enters container 134 through capillary tube 140. Since the liquid typically is less dense then the additive in container 134, the liquid will first layer on top of the additive and force substantially pure additive out through capillary tube 140 and into the portion of the liquid flowing through the exiting region 30.

In the preferred embodiment, the difference in liquid density and the additive density can be utilized to achieve a more uniform release rate over time. Since the liquid is less dense than the liquid additive, the liquid tends to "float" on the additive phase and the inlet tube is truncated near the top of the additive vessel, whereas the outlet capillary extends to near the bottom of the vessel. During operation, as the liquid enters the inlet vessel and "floats" and remains (with exception of the slow diffusion between phases) on the top of the vessel, displacing pure additive and pushing it out the outlet tube in nearly full-concentration yielding a very steady injection of active ingredient into system.

Figures 15, 16:
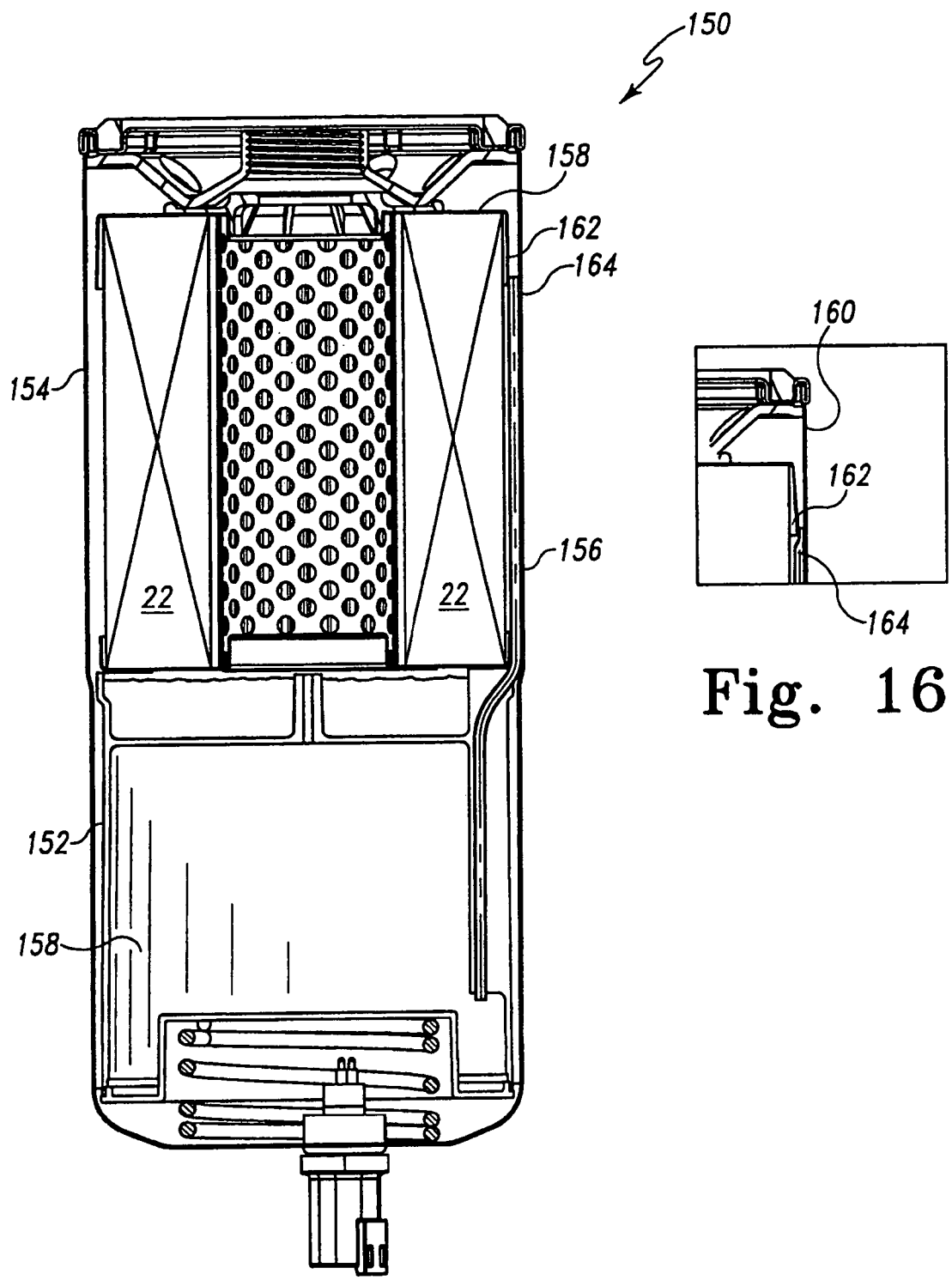

FIG. 15 is still yet another embodiment of a filter assembly 150. Filter assembly 150 can be provided substantially as has been described for filter assemblies 10, 70, 90 and 130. Consequently, the same reference numbers will be used to denote like components. Filter assembly 150 includes a container 152 in an interior chamber 154. Capillary tube 156 provides an inlet into the interior region 158 of container 152. In this embodiment, capillary tube 156 extends in a direction parallel to and substantially along the entire length of filter element 22. Upper endcap 158, shown in an enlarged view in FIG. 16, includes a shroud 160 that extends downwardly and in a radially direction toward the upper end 162 of capillary tube 156.

In this embodiment, the endcap shroud 161 cooperates with filter shell 164 to constrict the flow and hence increase the velocity in close proximity to entrance of capillary tube 158. This in turn increases the dynamic fluid pressure at end 162. Consequently, the pressure difference between the entrance and exit from container 152 is greater than would be observed if the fuel were not constricted between filter endcap shroud and shell.

Figure 17:
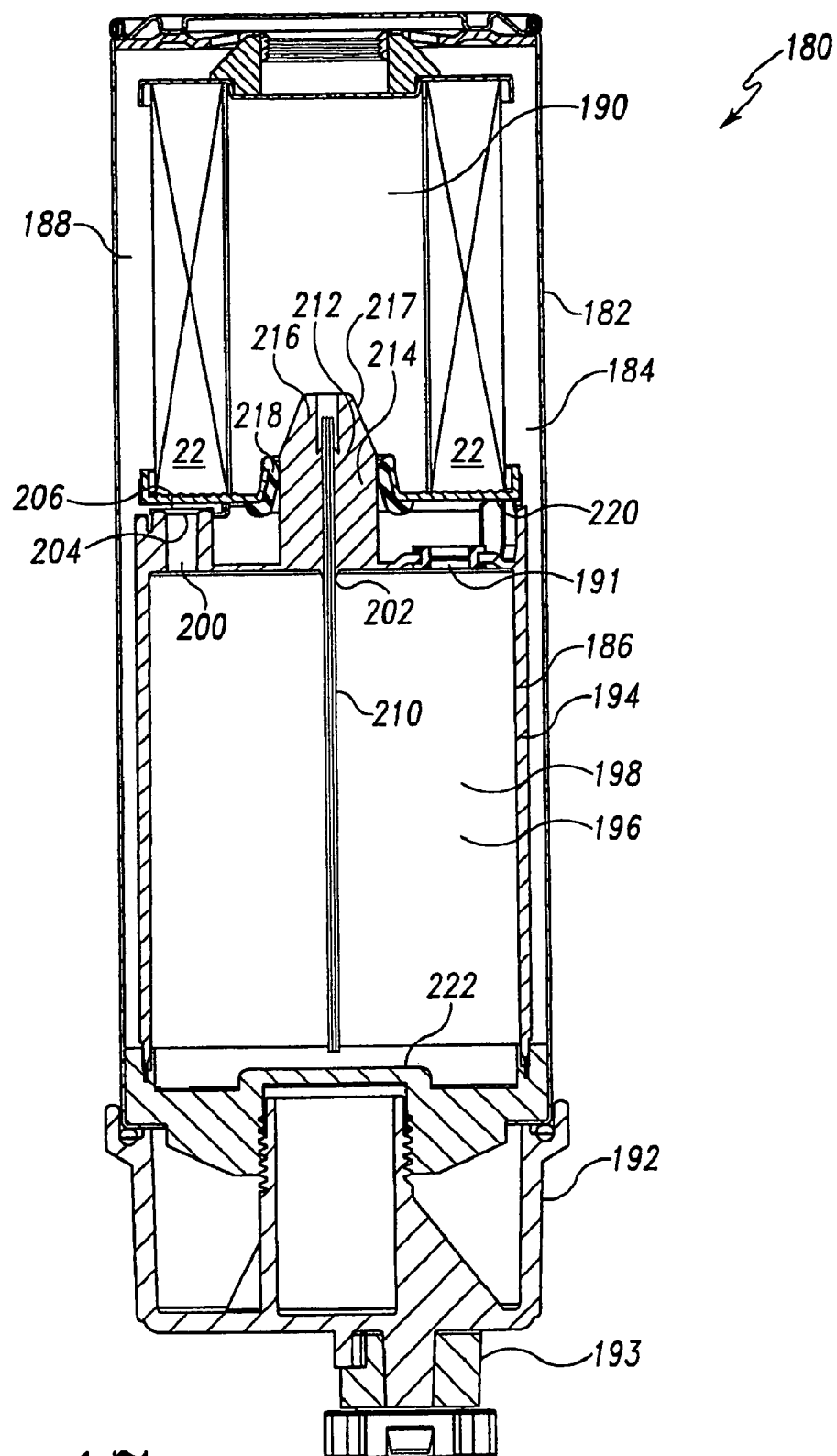

FIG. 17 is a cross-sectional view of yet another embodiment of a filter assembly 180 in accordance with the parent applications. Filter assembly 180 includes some of the same or similar components as discussed for filter assembly 10; therefore, the same reference numbers will be used for the same components. Filter assembly 180 includes an outer casing or housing 182 that defines an interior chamber 184. A filter element 22 and a vessel or container 186 are positioned in the interior chamber. Filter element 22 can partition the interior chamber 184 into a fluid entering region 188 and a fluid exiting region 190. Additionally, filter assembly 180 can include a separable lower bowl 192 for water collection with a drain valve 193 to expel the collected water.

Container 186 includes an exterior wall 194 that defines an interior region 196. An additive 198 such as has been described above is disposed in interior region 196. A first, inlet 200 allows fluid to flow into interior region 196. An outlet 202 allows the additive and/or a mixture of the fluid and additive to flow out of interior region 196. In the illustrated embodiment, it can be observed that inlet 200 allows fluid from the fluid entering region 188 to flow into interior region 196 while the outlet 202 allows the additive and/or fluid additive mixture to flow out of the interior region and into the fluid exiting region 190. Container 186 can be charged with the liquid additive through a closable or sealable opening 191 prior to final assembly.

Inlet 200 is surrounded by a short, cylindrical boss covered by a filter element or filter media 204. In this particular embodiment, inlet 200 need not be a capillary tube and need not extend into the interior region 196. Rather inlet 200 is configured as a short, cylindrical opening having a diameter of approximately between 1 mm and about 10 mm. Filter media 204 can be formed of the same material as used for the filter element 22 or a different material as desired. The filter media 204 can be supported by cross ribs extending across the opening. The filter media 204 can be formed of a material or configured and/or sized to minimize the pressure drop across the inlet 200. In one embodiment, the fluid face velocity (and hence pressure drop, since restriction to flow across porous media is proportional to the velocity of flow) through inlet 200 is about 50% of that through filter element 22; more preferably, less than about 25%; and still more preferably less than about 10% lower than that observed to flow through filter element 22.

As used herein the term fluid face velocity is defined as the "approach velocity" of a liquid flowing normal to the surface of the filter material according to Equation 3:

$$FV = \text{volumetric flowrate/area [m/s]} \qquad (3)$$

where FV is the fluid face velocity and volumetric flowrate is the volumetric flowrate of the fluid approaching the filter material.

Additionally, if desired, filter element 204 can be covered or sealed with a fluid soluble seal 206. Seal 206 can be provided to inhibit accidental leakage of the additive 198 during storage and shipping and/or prevent contact of the additive to air prior to use.

Outlet 202 in this illustration includes a capillary tube 210. Capillary tube 210 can operate to control the rate of release of the additive (or a mixture of fluid and additive) out of container 186. Capillary tube 210 extends from the interior region 196 through outlet 202. An exterior portion 212 of capillary tube 210 is surrounded by a support structure 214. In the illustrated embodiment, support structure 214 is provided as a conical boss 216 which provides support and minimizes the risk of damage to the exterior portion 212 of capillary tube 210. To further support and reduce the risk of plugging during assembly, the terminal end of capillary tube 210 be recessed in conical boss 216. In one embodiment, support structure 214 includes a plurality of radially extending ribs 217, which can extend beyond the terminal end of capillary tube 210. While boss 216 is illustrated as a conical or a frustum conical configuration other configurations are contemplated. Boss 216 bears against a seal 218 about an inner portion of end cap 220, which supports filter element 22. Engagement between boss 216 and seal 218 provides a fluid-tight seal to prevent fluid flowing though the assembly from bypassing both filter element 22 and container 186. In the illustrated embodiment, capillary 210 and boss 216 are centrally located in the top wall portion of container 186.

Capillary tube 210 extends into interior region 196. In preferred embodiments, capillary tube 210 extends to a position in close proximity to the bottom wall portion 222 of container 186. The length of capillary tube 210 can be varied as desired to control or limit the additive release rate. The capillary tube 210 defines a flow path for the additive and/or additive/fluid mixture in container 186. In one embodiment, capillary tube defines a flow path that has a length greater than the depth of container 186, measured from the upper wall portion to the lower wall portion.

The present embodiment of a filter assembly 180 provides distinct advantages. The illustrated embodiment provides particular advantages for additives, which are denser than the fluid flowing through the assembly. In the illustrated embodiment, the inlet 200 is provided as a cylindrical opening. This reduces the variation in the additive release rate of flow since the majority of the pressure gradient developed between the inlet 200 and the outlet 202 is across the capillary tube 210. Thus, the capillary tube configuration can be tailored to control the release rate of the additive. This can include varying the length and/or diameter of capillary tube 210 to fine tune the release rate of the additive into the fluid. Increasing the diameter of capillary tube 210 increases the rate of release by a factor proportional to the (capillary internal diameter) 4. Increasing the length of capillary tube 232 decreases the rate of release by a factor inversely proportional to the capillary length.

Additionally typically during use the filter media retains particles from the fluid. Eventually near the end of the filter assembly's useful life span, the filter media may become sufficiently clogged with the particles that the pressure differential between the entering region 188 and the exiting region 190 significantly increases. This greater pressure differential forces any remaining liquid additive out of container 186 into the fluid where it can provide a benefit to the fluid rather than being disposed of when the filter assembly is replaced.

Figure 18:
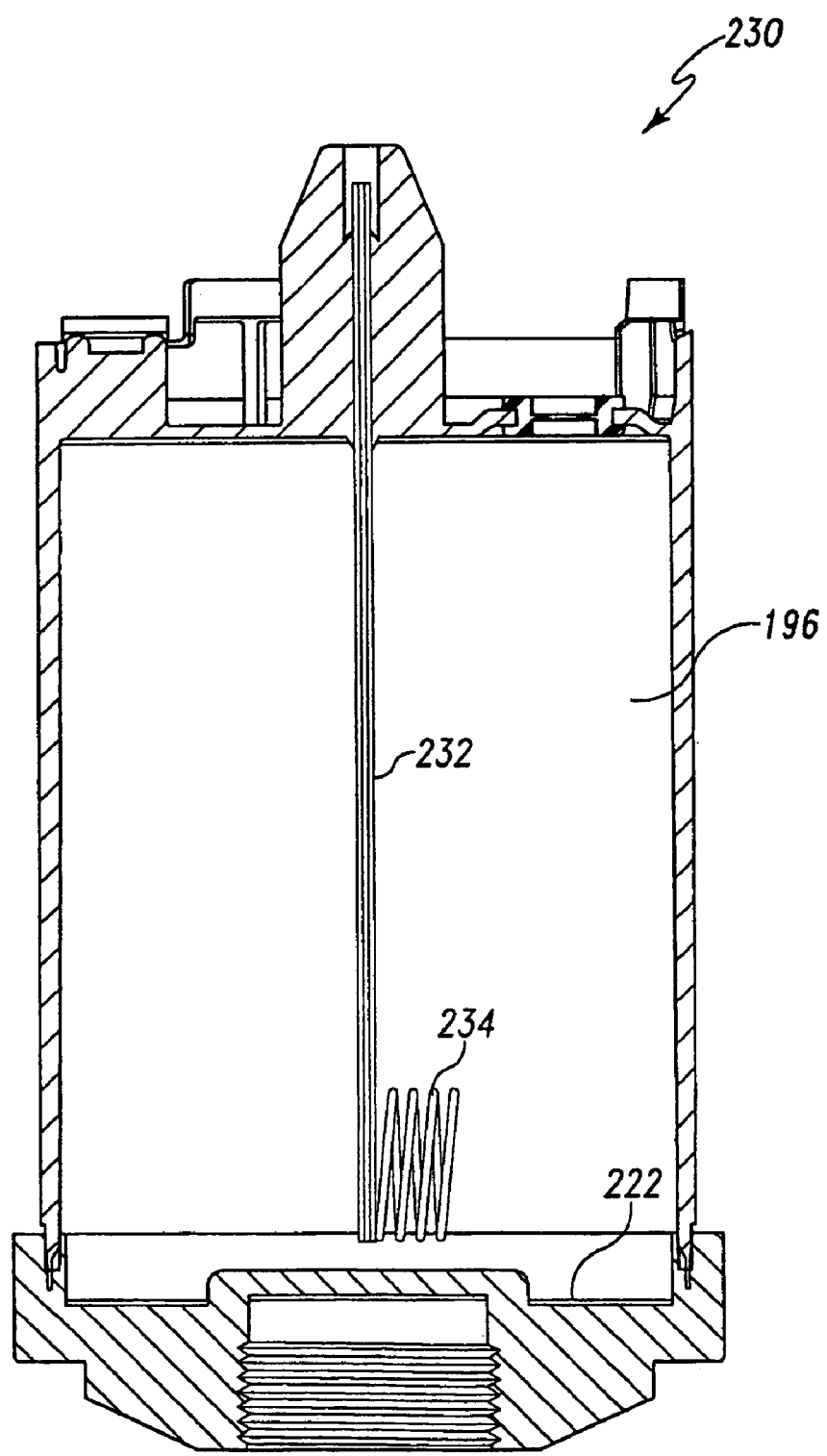

Referring additionally to FIG. 18 which illustrates a cross-sectional view of another embodiment of a container 230. In container 230, capillary tube 232 is illustrated as extending all the way to the bottom wall portion 222 terminating in a spiral winding 234. This, in effect, lengthens capillary tube 232 to accommodate a greater pressure differential while still maintaining the desired flowrate of the additive out of the interior region 196. It should be understood that the spiral winding 234 can extend or spiral in any direction. However, it is preferred that the end of capillary 232 be positioned proximate to the bottom wall portion 222. As noted above, typically the liquid additive is denser than the fluid flowing through the assembly. Consequently, positioning the end of the capillary tube near the bottom wall of container 230 ensures that all of the additive is released into the fluid.

Figure 19:
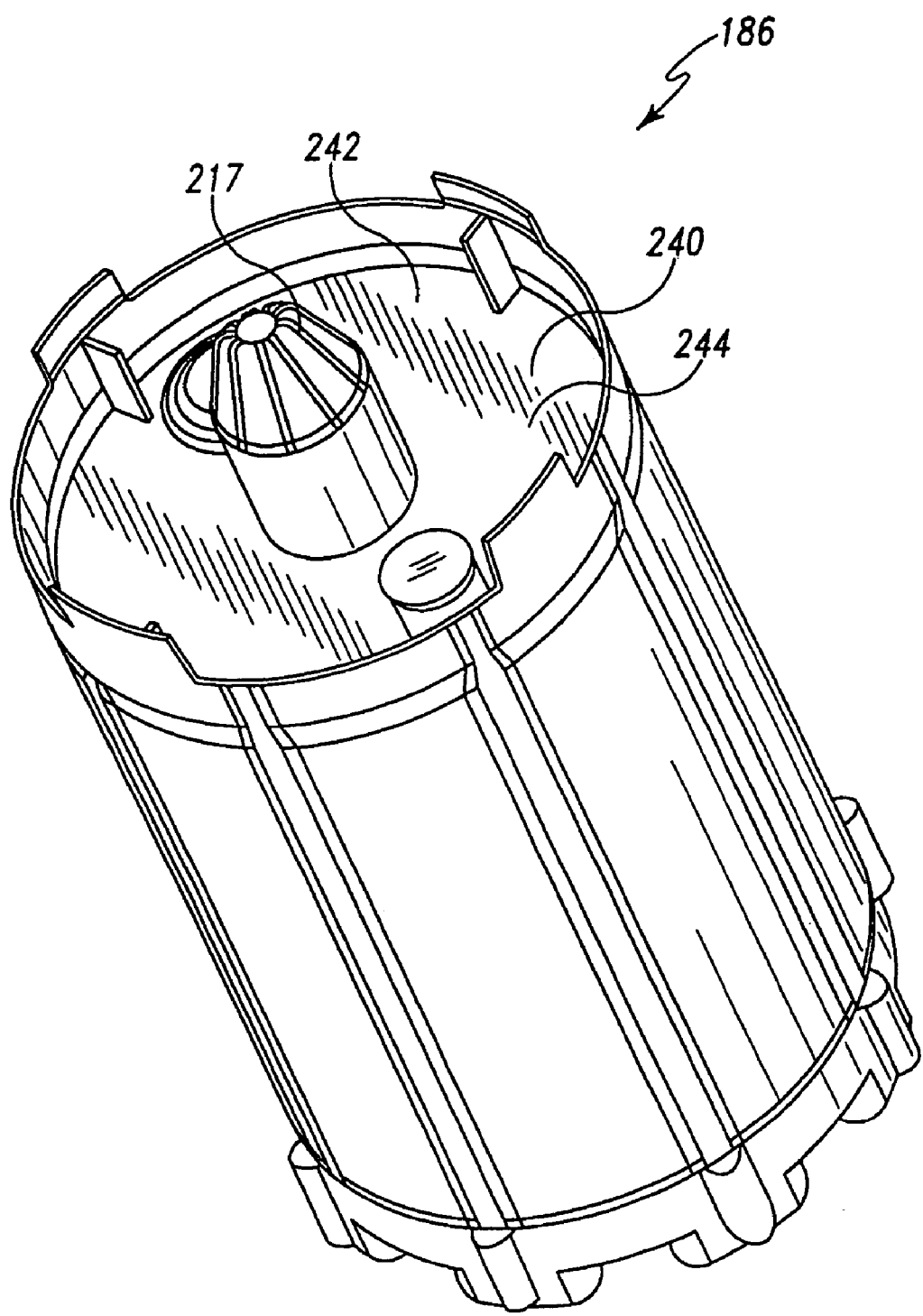

FIG. 19 illustrates a perspective view of a container 186 for use in filter assembly 180. In this embodiment, container 186 includes a reservoir 240 formed in the upper wall portion 242. A pre-charge additive can be deposited in reservoir 240 to be directly added to the fluid in filter assembly 180. This provides an additional "additive boost" upon initial employment of the filter assembly 180. As discussed above, the additive pre-charge deposited in reservoir 240 can, if desired, also be coated with a fluid soluble seal or seal material such as a wax for organic fluids or a water-soluble polymer for aqueous based fluid.

Figure 20:
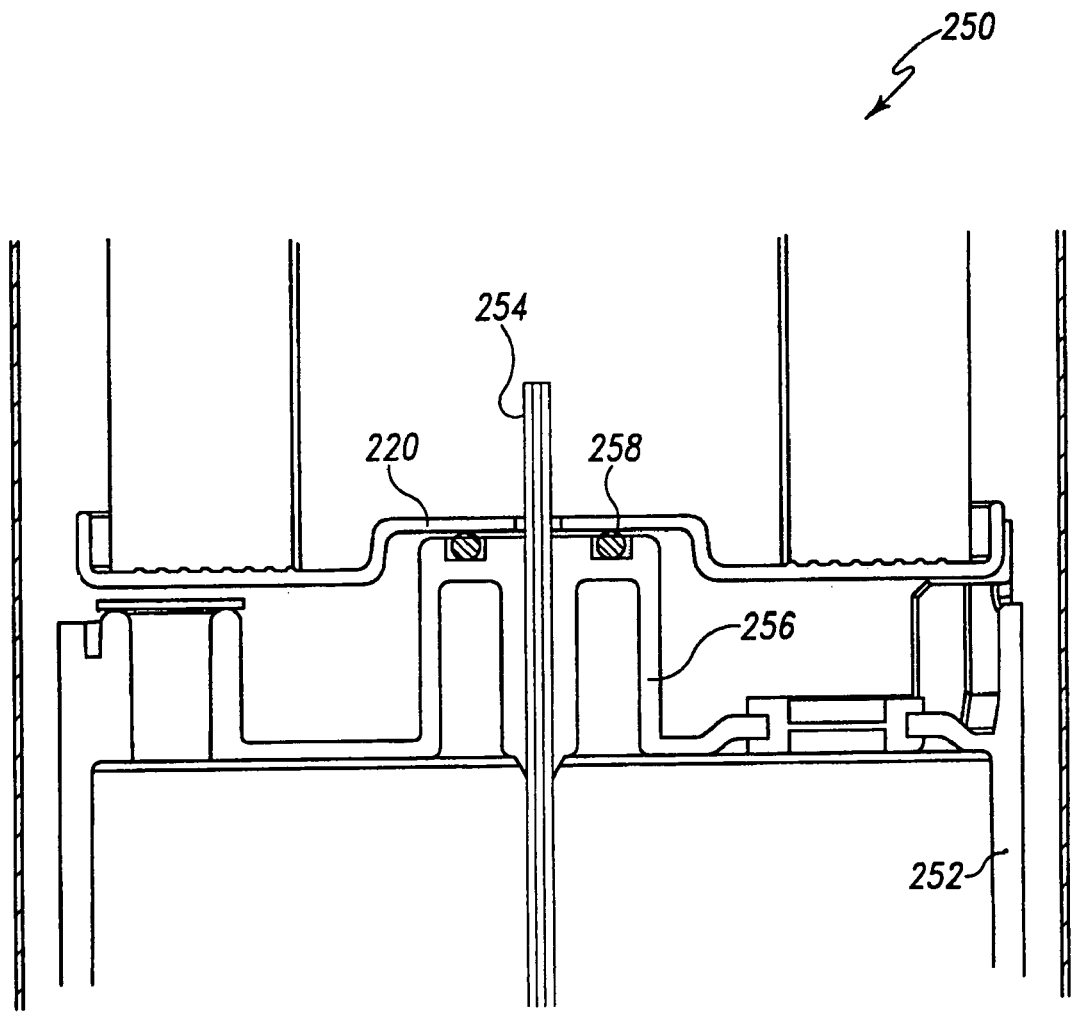

FIG. 20 is a partial view, in cross-section of an alternative embodiment of a filter assembly 250. In this embodiment, a container 252 is illustrated which includes a capillary tube 254 extending through a cylindrical boss 256. An O-ring seal 258 on top of boss 256 seals against the lower end cap 220 to ensure a fluid-tight seal and prevent any fluid from bypassing both filter element 22 and container 252.

Figure 21:
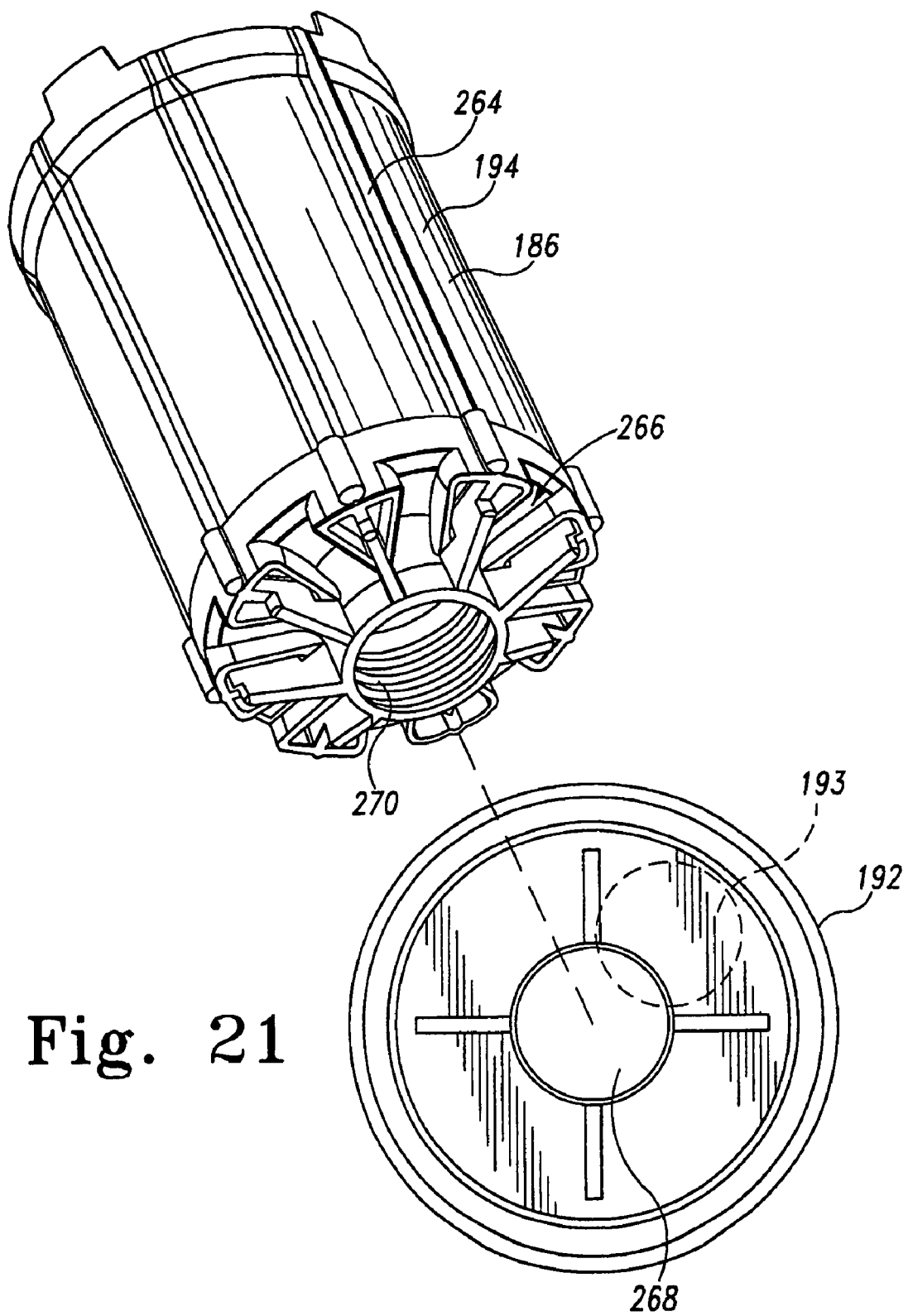

FIG. 21 is an exploded, perspective view of the lower portion of container 186 and lower bowl 192. It can be seen from this embodiment that container 186 includes a plurality of concentric ribs 264 positioned about the exterior wall 194. This allows a space or gap between the exterior wall 194 of container 186 and housing 182 to allow any water to drain down into the lower bowl 192. The water can then drain through channels 266 into bowl 192. Bowl 192 can include a threaded stud 268, which can be threadedly engaged with a threaded recess 270 in the lower portion of container 186. In preferred embodiments, lower bowl 192 can be provided with a drain relief valve 193. Additionally, lower bowl 192 can be provided with an electronic sensor to sense moisture contained therein or can be made of a clear material through which the water can be visually observed.

Filter assembly 180 provides additional advantages in that it can be used with vacuum side filter applications. In vacuum side applications little fluid is present in the entrance region 188 between filter element 22 and shell wall 182—the fluid at that location is mainly vapor. In a vacuum application, the liquid is generally confined to a zone approximately beneath endcap 220 and in the fluid exiting region 190. Because the opening 200 is below the endcap 220, the liquid is present to flow into container 186 through the inlet 200.

The parent applications provide distinct advantages to current delivery systems. The use of a liquid additive in the container allows the maximum amount of an additive to be included within a filter assembly because the liquid additive can completely fill the internal volume of the container where as solid additives do not. Furthermore, by harnessing the pressure gradient generated within a filter assembly in use, the rate of addition of the additive is much more independent of vibration variation that may occur during use. However, the rate of release of the additive as noted above can be adjustable by varying the length and/or diameters of the capillary tubes leading into and out of the container holding the fuel additive.

The parent applications also provide a method of adding beneficial additives to the liquid only with the liquid flowing through the filter. When the liquid is not flowing through the filter, diffusion of any additive out of the container has been measured to be negligible because of the extremely low molecular diffusion rate. The molecular diffusion rate is described by the binary diffusion coefficient, which in the above-described embodiments with the liquid/additive is on the order of 2e-6 cm2/s between the additive and the liquid phases, and the dynamic fluid pressure gradient is zero when there is no flow so convective transfer is also eliminated.

The parent applications also contemplate modifications as would occur to those skilled in the art. It is also contemplated that the devices and processes embodied in the parent applications can be altered, rearranged, substituted, combined, or added to other processes as would occur to those skilled in the art without departing from the spirit of the parent applications. All patents and patent applications cited in this specification are herein incorporated by reference as if each individual patent or patent application was specifically and individually indicated to be incorporated by reference and set forth in its entirety herein.

Any reference to specific directions, for example, references to up, upper, top, bottom, down, lower, on top of, below, and the like, is to be understood for illustrative purposes only or to better identify or distinguish various components from one another. These references are not to be construed as limiting in any manner to the devices, methods, and/or operations as described herein.

Unless specifically identified to the contrary, all terms used herein are used to include their normal and customary meaning.

Further, while various embodiments of filter assemblies having specific components and structures are described and/or illustrated in the Figures herein, it is to be understood that any selected embodiment of a filter assembly can include one or more of the specific components and/or structures described for other embodiments where possible.

Present Application

FIG. 22 shows a pressure gradient dosing system 300 for a fluid supply system 302. An additive delivery system, for example which may include a housing 304, has a fluid inlet 306 and a fluid outlet 308. A flow passage 310 includes a portion 311 extending through housing 304 from inlet 306 to outlet 308. A first pressure zone 312 along the flow passage communicates with inlet 306, and a second pressure zone 314 along the flow passage communicates with outlet 308. Pressure zone 314 has a lower pressure than pressure zone 312, to be described, such that there is a pressure gradient between pressure zones 312 and 314. An additive reservoir 316 in the housing responds to the pressure gradient to release additive to the flow passage. Additive reservoir 316 has a first port 318 communicating with first pressure zone 312, and a second port 320 communicating with second pressure zone 314. The additive reservoir responds to the noted pressure gradient between pressure zones 312 and 314 to release additive through second port 320 to flow passage 310 at second pressure zone 314. In one embodiment, additive delivery housing 304 is a spin-mounted canister, as noted above, for example having a nut-plate 322 having apertures such as 324 therethrough for incoming fluid flow, and having a central threaded aperture 326 for outgoing flow and for thread mounting to a stud, for example of an internal combustion engine or other fluid supply system mounting attachment. Housing or canister 304 may include a filter element, as above described, or may omit the filter element and instead be a separate housing connected in the fluid supply system at a different location for dosing, for example a remote location convenient to the operator.

Fluid flows from upstream to downstream along flow passage 310, as shown at the arrows in FIG. 22, including from inlet 306 to outlet 308. In the embodiment of FIG. 22, flow passage 310 has one or more pressure reducers therealong creating the noted pressure gradient. The pressure reducers may be provided by restrictors or ports, for example orifices (round or other shape) such as 328, slots, a venturi, capillary tubes, etc., to be described. In the embodiment of FIG. 22, orifices 328 have an upstream side communicating with each of inlet 306, first pressure zone 312, and first port 318. Orifices 328 have a downstream side communicating with each of outlet 308, second pressure zone 314, and second port 320. The pressure gradient is created by fluid flow itself along flow passage 310, without a mechanical dosing injection pump. In the embodiment of FIG. 22, second port 320 has an additive delivery tube 330, for example a capillary or other tube, extending into second pressure zone 314 and both: a) sensing fluid pressure thereat; and b) delivering additive thereto. First port 318 may have a tube, for example as shown in dashed line at 332, which may be a capillary, extending into first pressure zone 312. Tubes 332 and 330 extending into first and second pressure zones 312 and 314, respectively, may have a selective inner diameter and length for a desired application, for example as above described. Capillary tubes 330 and 332 modify and/or regulate the resultant additive discharge flow rate for a given pressure gradient ΔP created by the noted one or more pressure reducers provided by the flow restrictors such as orifices 328. Capillary size controls the flow rate of the additive.

In FIG. 22 additive delivery housing 304 has the noted nut-plate or mounting plate 322 for mounting the housing in the fluid supply system. Additive reservoir 316 is spaced from mounting plate 322 by a space 334 therebetween. Orifices 328 are provided by perforations (round or other shape) in a perforated tube 336 in space 334. Perforated tube 336 extends axially along axis 338 and has an interior radially inwardly thereof and providing second pressure zone 314, and has a exterior radially outwardly thereof and providing first pressure zone 314. In FIG. 22, perforated tube 336 extends axially from mounting plate 322 to additive reservoir 316. Perforated tube 336 has an axially extending annular sidewall 340, and the tube is perforated by the noted one or more orifices 328 through sidewall 340. Perforated tube 336 having the noted one or more orifices 328 provides a pressure reducer in space 334 creating the noted pressure gradient between first and second pressure zones 312 and 314.

FIG. 23 shows another embodiment and uses like reference numerals from above where appropriate to facilitate understanding. The above noted pressure reducer in space 334 is provided by a venturi 342. Venturi 342 has an upstream side communicating with each of inlet 306, first pressure zone 312, and first port 318. Venturi 342 has a downstream side communicating with each of outlet 308, second pressure zone 314, and second port 320.

FIG. 24 shows another embodiment and uses like reference numerals from above where appropriate to facilitate understanding. Tube 344 in space 334 extends axially along axis 338 and has a first axial end 346 at mounting plate 322, and a second axial end 348 spaced from additive reservoir 316 by an axial gap 350 therebetween. Gap 350 provides an orifice or flow restrictor or the like to provide a pressure reducer creating the noted pressure gradient between first pressure zone 312 and second pressure zone 314. Tube 344 may or may not be perforated. If the tube is perforated, the additional perforations or orifices also provide the noted pressure gradient.

FIG. 25 shows another embodiment and uses like reference numerals from above where appropriate to facilitate understanding. Tube 352 in space 334 extends axially along axis 338 and has an axially extending sidewall 354 and an axial end face 356 axially facing additive reservoir 316 and spaced therefrom by an axial gap 358 therebetween. The tube is perforated by one or more orifices 360 through end face 356, which orifices provide a flow restrictor providing a pressure reducer creating the above noted pressure gradient.

FIG. 26 shows another embodiment and uses like reference numerals from above where appropriate to facilitate understanding. Mounting plate 322 has a constrictive face portion 362 facing additive reservoir 316 across space 334 through a gap 364 providing a flow restrictor providing the noted pressure reducer creating the noted pressure gradient thereacross between first pressure zone 312 and second pressure zone 314.

FIG. 27 shows another embodiment and uses like reference numerals from above where appropriate to facilitate understanding. A gasket 366 is provided between and engaging mounting plate 322 and additive reservoir 316 on distally opposite sides of the gasket. The gasket has a passage or channel or port 368 therethrough providing the noted flow restrictor creating the noted pressure gradient thereacross between first pressure zone 312 and second pressure zone 314.

In the various embodiments, at least one capillary, and if desired first and second capillaries 332 and 330, respectively, FIG. 22, may be provided between a respective one of the first and second ports 318, 320 and a respective one of the first and second pressure zones 312, 314. The capillaries may be provided of different sizes to modify/regulate/control the additive flow rate. Flow passage 310 has first and second branches 370 and 372 in parallel, FIG. 22. First branch 370 is a main fluid flow branch. Second branch 372 diverges from the main branch at first pressure zone 312 then passes through additive reservoir 316 then returns to and rejoins main branch 370 at second pressure zone 314. In preferred form, the capillary size is chosen such that the dominant flow is through branch 370, and only miniscule flow is through branch 372, with the latter having little or no impact on the driving pressure gradient created by the pressure reducers or flow restrictors such as 328, 342, 350, 360, 364, 368. In FIGS. 22-27, first and second branches 370 and 372 pass through housing 304.

FIG. 28 shows another embodiment and uses like reference numerals from above where appropriate to facilitate understanding. In this embodiment, first branch 370 is external of housing 304, and second branch 372 passes through housing 304. The noted pressure gradient is created by a pressure reducer 374 provided by a flow restrictor such as a restrictive port, orifice, or the like.

The pressure drop across a flow restrictor such as a port, passage, orifice, slot, opening, venturi, capillary, etc. increases with the square of the flow rate. This in turn provides a pressure gradient driving additive release. The additive release rate may have a non-linear release rate response vs. flow rate. If a more linear relationship is desired for a given application, long skinny capillaries may be desired to provide a linear pressure gradient vs. flow response.

FIG. 29 et seq. show further embodiments and use like reference numerals from above with added postscript letters where appropriate to facilitate understanding.

FIGS. 29-32 show additive reservoir 316a in housing 304a, and biased by spring 376 against nut-plate 322a. Housing 304a has one or more fluid inlets 306a and a fluid outlet 308a. Fluid supply system 302a has a flow passage 310a including a portion 311a extending through housing 304a from inlet 306a to outlet 308a. A first pressure zone 312a along the flow passage communicates with inlet 306a, and a second pressure zone 314a along the flow passage communicates with outlet 308a. Pressure zone 314a has a lower pressure than pressure zone 312a, such that there is a pressure gradient between zones 312a and 314a. Additive reservoir 316a in the housing responds to the pressure gradient to release additive to the flow passage. Additive reservoir 316a has a first port 318a communicating with first pressure zone 312a, and a second port 320a communicating with said second pressure zone 314a. The additive reservoir responds to the noted pressure gradient between pressure zones 312a and 314a to release additive through second port 320a to flow passage 310a at second pressure zone 314a. Housing 304a is a spin-mounted canister, for example having the noted nut-plate 322a having apertures such as 324a therethrough for incoming fluid flow, and having a central threaded aperture 326a for outgoing flow and for thread mounting to a stud, for example of an internal combustion engine or other fluid supply system mounting attachment. Fluid flows from upstream to downstream along flow passage 310a as shown at the arrows in FIG. 29, including from inlet 306a to outlet 308a.

In the embodiment of FIGS. 29-32, flow passage 310a has one or more pressure reducers therealong creating the noted pressure gradient. The pressure reducers are provided by slots or openings 328a, FIGS. 30, 32, between respective tabs or ears 378 extending axially from the rightward axial end of additive reservoir 316a in FIGS. 29, 30 toward nut-plate 322a. Slots 328a provide rectangular openings comparable to orifices 328 of FIG. 22. Slotted openings 328a have an upstream side communicating with each of inlet 306a, first pressure zone 312a, and first port 318a. Slotted openings 328a have a downstream side communicating with each of outlet 308a, second pressure zone 314a, and second port 320a. Second port 320a has an additive delivery tube 330a, for example a capillary or other tube, extending into second pressure zone 314a and delivering additive thereto. Additive reservoir 316a is spaced from mounting plate 322a by space 334a therebetween. The pressure reducer flow restrictors are provided by the noted slotted openings 328a between tabs 378 in space 334a. The tabs also provide a centering function, in addition to providing the noted flow restriction ports or orifices or passages or openings through which primary flow passes and creates the above noted driving pressure gradient between first and second pressure zones 312a and 314a.

In FIGS. 33-38, the axially extending ears or tabs 378 of FIGS. 30-32 are replaced with a ring 380 having a base 381 having ears or tabs 382 extending axially therefrom and defining openings or slots 328b therebetween. Ring 380 provides a separately formed component from the additive reservoir and replaces integral tabs 378. The separate ring 380 enables the use of a common or universal additive reservoir 316a, but affording different flow geometries for differing flow rates, e.g. by differently spaced and/or sized tabs 382 with differing slotted openings 328b therebetween.

In FIGS. 39-42, ring 380 is reversed from the orientation shown in FIGS. 33-38. In FIGS. 39-42, the base of the ring is at mounting nut-plate 322a, and the ears or tabs 382 extend axially leftwardly toward and engage additive reservoir 316a.

FIGS. 43-45 show a ring 384 as an alternate to ring 380. Ring 384 has openings or cut-outs 386 forming slots or openings 328c comparable to slots or openings 328b and 328a, and comparable to openings or orifices 328, to provide the noted pressure reducer flow restrictors creating the noted pressure gradient providing the noted differential pressure between the noted first and second pressure zones. The lands 388 between cut-outs 386 are comparable to the noted ears or tabs 382 and 378. Cut-outs 386 may open toward and axially face additive reservoir 316a as shown in FIGS. 43-45, or alternatively the ring 384 may be reversed such that the cut-outs 386 open toward and axially face mounting nut-plate 322a.

In FIGS. 46-48, ring 384 is replaced by ring 390 in the form of a band having a plurality of apertures 392 extending radially therethrough and providing slots or openings or passages or orifices 328d comparable to openings 328c, 328b, 328a, 328, and providing the noted pressure reducer flow restrictors creating the noted pressure gradient.

FIGS. 49-51 further show the venturi 342 of FIG. 23. The venturi has a central collar 394 received in annular flange 396 on additive reservoir 316a. Collar 394 is connected by a plurality of radial spokes 398 to outer collar 400 which tapers radially outwardly as it extends axially rightwardly in FIG. 49 toward and engaging nut-plate 322a.

It is recognized that various equivalents, alternatives and modifications are possible within the scope of the appended claims.

What is claimed is:

1. A pressure gradient dosing system for a fluid supply system, comprising an additive delivery system having a fluid inlet and a fluid outlet, a flow passage including a portion extending from said inlet to said outlet, a first pressure zone along said flow passage communicating with said inlet, a second pressure zone along said flow passage communicating with outlet, said second pressure zone having a lower pressure than said first pressure zone, such that there is a pressure gradient between said first and second pressure zones, an additive reservoir responsive to said pressure gradient to release additive to said flow passage, wherein:

fluid flows from upstream to downstream along said flow passage, including from said inlet to said outlet;

said flow passage has a pressure reducer therealong creating said pressure gradient;

said additive reservoir has first and second ports, said first port communicating with said first pressure zone, said second port communicating with said second pressure zone;

said flow passage has first and second branches in parallel, said first branch being a main fluid flow branch, said second branch diverging from said main branch at said first pressure zone then passing through said additive reservoir then returning to and re-joining said main branch at said second pressure zone, said second branch flowing around and bypassing said pressure reducer;

said first and second branches diverge upstream of said pressure reducer.

2. The pressure gradient dosing system according to claim 1 wherein:

said pressure reducer comprises one or more flow restrictors;

said one or more flow restrictors have an upstream side communicating with each of said inlet, said first pressure zone, and said first port;

said one or more flow restrictors have a downstream side communicating with each of said outlet, said second pressure zone, and said second port.

3. The pressure gradient dosing system according to claim 2 wherein:

said one or more flow restrictors comprise one or more orifices along said flow passage creating said pressure gradient;

said one or more orifices have an upstream side communicating with each of said inlet, said first pressure zone, and said first port;

said one or more orifices have a downstream side communicating with each of said outlet, said second pressure zone, and said second port.

4. The pressure gradient dosing system according to claim 2 wherein:

said or more flow restrictors comprise a venturi along said flow passage creating said pressure gradient;

said venturi has an upstream side communicating with each of said inlet, said first pressure zone, and said first port;

said venturi has a downstream side communicating with each of said outlet, said second pressure zone, and said second port.

5. The pressure gradient dosing system according to claim 1 wherein said second port comprises an additive delivery tube extending into said second pressure zone and delivering additive thereto.

6. The pressure gradient dosing system according to claim 1 wherein said first and second ports compose respective first and second tubes extending into said first and second pressure zones, respectively, and of selective inner diameter and length for a desired application.

7. The pressure gradient dosing system according to claim 1 wherein said additive delivery system comprises a spin-mounted canister housing.

8. The pressure gradient dosing system according to claim 1 wherein said additive delivery system has a mounting plate for mounting in said fluid supply system, said additive reservoir being spaced from said mounting plate by a space therebetween, said pressure reducer being in said space.

9. The pressure gradient dosing system according to claim 8 wherein said pressure reducer comprises a perforated tube in said space.

10. The pressure gradient dosing system according to claim 9 wherein said perforated tube extends axially and has an interior radially inwardly thereof and providing said second pressure zone, and has an exterior radially outwardly thereof and providing said first pressure zone.

11. The pressure gradient dosing system according to claim 10 wherein said perforated tube extends axially from said mounting plate to said additive reservoir.

12. The pressure gradient dosing system according to claim 10 wherein said perforated tube has a first axial end at said mounting plate, and a second axial end spaced from said additive reservoir by an axial gap therebetween.

13. The pressure gradient dosing system according to claim 10 wherein said perforated tube has an axially extending sidewall, and wherein said tube is perforated by one or more orifices through said sidewall.

14. The pressure gradient dosing system according to claim 10 wherein said perforated tube has an axially extending sidewall, and an axial end face axially facing said additive reservoir and spaced therefrom by an axial gap therebetween, and wherein said tube is perforated by one or more orifices through said end face.

15. The pressure gradient dosing system according to claim 8 wherein said pressure reducer comprises a tube in said space, said tube extending axially and having an interior radially inwardly thereof and providing said second pressure zone, and having an exterior radially outwardly thereof and providing said first pressure zone.

16. The pressure gradient dosing system according to claim 15 wherein said tube extends axially from said mounting plate toward said additive reservoir, said tube having a first axial end at said mounting plate, and a second axial end spaced from said additive reservoir by an axial gap therebetween.

17. The pressure gradient dosing system according to claim 8 wherein said mounting plate has a constrictive face portion facing said additive reservoir across said space through a gap creating said pressure gradient thereacross.

18. The pressure gradient dosing system according to claim 1 comprising at least one capillary extending between one of said first and second ports and a respective one of said first and second pressure zones.

19. The pressure gradient dosing system according to claim 1 comprising a first capillary extending between said first port and said first pressure zone, a second capillary extending between said second port and said second pressure zone.

20. The pressure gradient dosing system according to claim 1 wherein said additive reservoir is in a housing, and wherein both of said first and second branches pass through said housing.

21. The pressure gradient dosing system according to claim 1 wherein said additive reservoir is in a housing, and wherein said first branch is external of said housing, and said second branch passes through said housing.

22. The pressure gradient dosing system according to claim 21 comprising a pressure reducer in said first branch.

23. The pressure gradient dosing system according to claim 8 comprising a biasing member biasing said additive reservoir toward said mounting plate.

24. The pressure gradient dosing system according to claim 23 wherein said additive delivery system comprises a spin-mounted canister housing, said additive reservoir extends axially along an axis between first and second distally opposite axial ends, said mounting plate is at said first axial end and is threaded for thread-mounting in said fluid supply system, said biasing member is at said second axial end and bears axially between said additive reservoir and said spin-mounted canister housing.

25. A pressure gradient dosing system for a fluid supply system, comprising an additive delivery system having a fluid inlet and a fluid outlet, a flow passage including a portion extending from said inlet to said outlet, a first pressure zone along said flow passage communicating with said inlet, a second pressure zone along said flow passage communicating with outlet, said second pressure zone having a lower pressure than said first pressure zone, such that there is a pressure gradient between said first and second pressure zones, an additive reservoir responsive to said pressure gradient to release additive to said flow passage, wherein:
fluid flows from upstream to downstream along said flow passage, including from said inlet to said outlet;
said flow passage has a pressure reducer therealong creating said pressure gradient;
said additive reservoir has first and second ports, said first port communicating with said first pressure zone, said second port communicating with said second pressure zone;
said additive delivery system has a mounting plate for mounting in said fluid supply system, said additive reservoir being spaced from said mounting plate by a space therebetween, said pressure reducer being in said space,
and comprising a gasket between and engaging said mounting plate and said additive reservoir on distally opposite sides of said gasket, said gasket having a passage therethrough creating said pressure gradient thereacross.

26. A pressure gradient dosing system for a fluid supply system, comprising an additive delivery system having a fluid inlet and a fluid outlet, a flow passage including a portion extending from said inlet to said outlet, a first pressure zone along said flow passage communicating with said inlet, a second pressure zone along said flow passage communicating with outlet, said second pressure zone having a lower pressure than said first pressure zone, such that there is a pressure gradient between said first and second pressure zones, an additive reservoir responsive to said pressure gradient to release additive to said flow passage, wherein:
fluid flows from upstream to downstream along said flow passage, including from said inlet to said outlet;

said flow passage has a pressure reducer therealong creating said pressure gradient;

said additive reservoir has first and second ports, said first port communicating with said first pressure zone, said second port communicating with said second pressure zone;

said additive delivery system has a mounting plate for mounting in said fluid supply system, said additive reservoir being spaced from said mounting plate by a space therebetween, said pressure reducer being in said space;

said additive reservoir has a plurality of tabs extending therefrom in said space, said tabs having slotted openings therebetween providing said pressure reducer.

27. The pressure gradient dosing system according to claim 26 wherein said tabs extend axially and define a perimeter having an interior radially inwardly thereof and providing said second pressure zone, and having an exterior radially outwardly thereof and providing said first pressure zone.

28. The pressure gradient dosing system according to claim 27 wherein said tabs extend axially between said additive reservoir and said mounting plate.

29. The pressure gradient dosing system according to claim 27 comprising a ring having a base extending around and defining said perimeter and having said plurality of tabs arcuately spaced from each other around said perimeter and extending axially from said base.

30. The pressure gradient dosing system according to claim 29 wherein said base is at said additive reservoir, and said tabs extend axially from said base toward said mounting plate.

31. The pressure gradient dosing system according to claim 29 wherein said base is at said mounting plate, and said tabs extend axially from said base toward said additive reservoir.

32. The pressure gradient dosing system according to claim 27 comprising a slotted ring having a plurality of cut-outs arcuately spaced from each other by lands therebetween around a perimeter defined by said ring, said lands providing said tabs, said cut-outs forming openings providing said pressure reducer, said slotted ring having an interior radially inwardly thereof and providing said second pressure zone, and having an exterior radially outwardly thereof and providing said first pressure zone.

33. The pressure gradient dosing system according to claim 32 wherein said cut-outs open toward and axially face one of said additive reservoir and said mounting plate.

34. The pressure gradient dosing system according to claim 27 comprising an apertured ring extending along and defining said perimeter, and extending axially between said additive reservoir and said mounting plate, said ring having a plurality of apertures extending radially therethrough and providing said pressure reducer, said ring having an interior radially inwardly thereof and providing said second pressure zone, and having an exterior radially outwardly thereof and providing said first pressure zone.

35. A pressure gradient dosing system for a fluid supply system, comprising an additive delivery system having a fluid inlet and a fluid outlet, a flow passage including a portion extending from said inlet to said outlet, a first pressure zone along said flow passage communicating with said inlet, a second pressure zone along said flow passage communicating with outlet, said second pressure zone having a lower pressure than said first pressure zone, such that there is a pressure gradient between said first and second pressure zones, an additive reservoir responsive to said pressure gradient to release additive to said flow passage, wherein:

fluid flows from upstream to downstream along said flow passage, including from said inlet to said outlet;

said flow passage has a pressure reducer therealong creating said pressure gradient;

said additive reservoir has first and second ports, said first port communicating with said first pressure zone, said second port communicating with said second pressure zone;

said additive delivery system has a mounting plate for mounting in said fluid supply system, said additive reservoir being spaced from said mounting plate by a space therebetween, said pressure reducer being in said space;

said pressure reducer comprises a venturi extending axially in said space and tapering radially outwardly as it extends axially toward said mounting plate.

36. The pressure gradient dosing system according to claim 35 wherein said venturi has a central collar at said additive reservoir, and a plurality of spokes extending radially outwardly from said central collar to an outer skirt, said outer skirt tapering radially outwardly as it extends axially toward said mounting plate, said skirt having an interior radially inwardly thereof and providing said second pressure zone, and having an exterior radially outwardly thereof and providing said first pressure zone.

* * * * *

UNITED STATES PATENT AND TRADEMARK OFFICE
CERTIFICATE OF CORRECTION

PATENT NO. : 7,297,256 B2 Page 1 of 1
APPLICATION NO. : 11/156347
DATED : November 20, 2007
INVENTOR(S) : Ted S. Loftis et al.

It is certified that error appears in the above-identified patent and that said Letters Patent is hereby corrected as shown below:

On the title page:
Item [73] Assignee:

Delete "Fleet Guard, Inc." and substitute therefor --Fleetguard, Inc.--

Signed and Sealed this

First Day of April, 2008

JON W. DUDAS
*Director of the United States Patent and Trademark Office*